(12) United States Patent
Convertino et al.

(10) Patent No.: US 11,757,938 B2
(45) Date of Patent: *Sep. 12, 2023

(54) METHOD, APPARATUS, AND COMPUTER-READABLE MEDIUM FOR DATA PROTECTION SIMULATION AND OPTIMIZATION IN A COMPUTER NETWORK

(71) Applicant: Informatica LLC, Redwood City, CA (US)

(72) Inventors: Gregorio Convertino, Sunnyvale, CA (US); Tianyi Li, Blacksburg, VA (US); Gary Patterson, San Ramon, CA (US); Ranjeet Kumar Tayi, Fremont, CA (US); Shima Kazerooni, Redwood City, CA (US)

(73) Assignee: Informatica LLC, Redwood City, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 16/912,413

(22) Filed: Jun. 25, 2020

(65) Prior Publication Data

US 2021/0112100 A1 Apr. 15, 2021

Related U.S. Application Data

(63) Continuation of application No. 15/948,310, filed on Apr. 9, 2018, now Pat. No. 10,735,471.

(51) Int. Cl.
*H04L 29/06* (2006.01)
*H04L 9/40* (2022.01)
(Continued)

(52) U.S. Cl.
CPC ............ *H04L 63/20* (2013.01); *G06F 16/244* (2019.01); *G06F 16/24578* (2019.01);
(Continued)

(58) Field of Classification Search
CPC ............ G06F 16/24578; G06F 16/244; G06F 16/254; H04L 41/0823; H04L 41/0893; H04L 63/1433; H04L 41/145; H04L 63/20
See application file for complete search history.

(56) References Cited

U.S. PATENT DOCUMENTS

| 10,574,702 | B1 * | 2/2020 | Rickerd | .................. H04L 63/20 |
| 2016/0330219 | A1 * | 11/2016 | Hasan | .................. H04L 63/1408 |
| 2019/0182289 | A1 * | 6/2019 | White | .................. G06F 21/6245 |

* cited by examiner

*Primary Examiner* — Tri M Tran

(74) *Attorney, Agent, or Firm* — Amardeep S. Grewal; Reed Smith LLP

(57) ABSTRACT

A system, method and computer-readable medium for data protection simulation and optimization in a computer network, including grouping data stored in data stores in the computer network into groupings according to an architectural or a conceptual attributes, storing, current values of risk metrics for each grouping, each of the metrics corresponding to sensitive domains, receiving a risk reduction goal corresponding to at least one risk metric in the risk metrics, the at least one risk metric corresponding to at least one sensitive domain in the sensitive domains, determining a simulated value of the at least one risk metric for each grouping in the groupings by simulating application of a protection mechanism to sensitive data in each corresponding data store, the sensitive data corresponding to the at least one sensitive domain, and ranking the groupings based on the at least one simulated value of the at least one risk metric for each grouping.

20 Claims, 53 Drawing Sheets

(51) Int. Cl.
*H04L 41/14* (2022.01)
*H04L 41/0823* (2022.01)
*H04L 41/0893* (2022.01)
*G06F 16/242* (2019.01)
*G06F 16/25* (2019.01)
*G06F 16/2457* (2019.01)

(52) U.S. Cl.
CPC ........ *G06F 16/254* (2019.01); *H04L 41/0823* (2013.01); *H04L 41/0893* (2013.01); *H04L 41/145* (2013.01)

Store

|    | S1 | S2 | S3 | ... | SN |
|----|----|----|----|-----|----|
| P1 | 1  | 1  | 0  |     | 0  |
| P2 | 0  | 0  | 1  |     |    |
| P3 | 1  | 0  | 1  |     | 0  |
| ... |   |    |    |     |    |
| PM | 0  | 0  | 0  |     | 1  |

Policy — 801

Domain

|    | D1 | D2 | D3 | ... | DN |
|----|----|----|----|-----|----|
| P1 | 0  | 1  | 1  |     | 0  |
| P2 | 0  | 1  | 1  |     |    |
| P3 | 1  | 0  | 0  |     | 0  |
| ... |   |    |    |     |    |
| PM | 0  | 0  | 0  |     | 1  |

Policy — 802

Store

|    | S1 | S2 | S3 | ... | SN |
|----|----|----|----|-----|----|
| D1 | 0  | 1  | 0  |     | 0  |
| D2 | 1  | 1  | 1  |     |    |
| D3 | 1  | 0  | 0  |     | 0  |
| ... |   |    |    |     |    |
| DM | 0  | 1  | 0  |     | 1  |

Domain — 803

METHOD, APPARATUS, AND COMPUTER-READABLE MEDIUM FOR DATA PROTECTION SIMULATION AND OPTIMIZATION IN A COMPUTER NETWORK

RELATED APPLICATION DATA

This application is a continuation of U.S. application Ser. No. 15/948,310, filed on Apr. 9, 2018, the contents of which are hereby incorporated by reference in their entirety.

BACKGROUND

In a 2014 study of 700 consumers about brand reputation by Experian and the Ponemon Institute, data breaches were reported as the most damaging occurrence to brand reputation, exceeding environmental disasters and poor customer service. With the ever-growing volume of cyber-attacks on organizations, security analysts require effective visual interfaces and interaction techniques to detect security breaches and, equally importantly, to efficiently share threat information.

In particular, security analysts' at large organizations require effective systems, interfaces, and techniques for conducting data security intelligence, which is a key area at the intersection of big data and cybersecurity analytics.

To support large organizations who manage thousands to tens of thousands of databases, Hadoop, and cloud applications in their environment, security intelligence applications, such as Informatica's Secure@Source, allows information security teams to discover sensitive data across all these disparate data stores, define hierarchies, and provide logical organization (e.g., classification policies, data store groups, departments, locations, etc.) for measuring the risk associated with the sensitive data discovered.

Given the large amount of data in distributed databases and the variety of data and policies that govern each data store, data security analysts face the technical challenge of not being able to measure or quantify what sensitive data is most in need of security protection, what protections would have the greatest impact on enterprise security, and what type of protection schemes and mechanisms would be most effective in improving enterprise security. For example, data stored in a first store of a network database may have completely different data fields, data attributes, and governing security policies than a second store in the network database. This problem grows exponentially in network databases with hundreds or thousands of data stores and data types.

Data security analysts lack tools that will aid in the determination of what data in a distributed network database should be protected and the determination of how best to implement protection schemes on sensitive data. In particular, security analysts do not possess any tools capable of analyzing data stored across numerous data stores in distributed databases and providing guidance regarding the most vulnerable data and data stores, the most effective protection mechanisms for addressing security vulnerabilities or for complying with particular security policies, and the most effective use of existing resources to address vulnerabilities.

Consequently, improvements are needed in systems for data security intelligence assessment in distributed network databases.

BRIEF DESCRIPTION OF THE DRAWINGS

FIG. 8 illustrates matrices that can be used to generate the plurality of groupings according to an exemplary embodiment.

FIG. 32 illustrates a plan selection interface according to an exemplary embodiment.

FIGS. 34A-34B illustrates a plan comparison interface according to an exemplary embodiment.

DETAILED DESCRIPTION

While methods, apparatuses, and computer-readable media are described herein by way of examples and embodiments, those skilled in the art recognize that methods, apparatuses, and computer-readable media for data protection simulation and optimization in a computer network are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As discussed above, improvements are needed in systems for data security intelligence assessment in distributed databases in order to provide data security analysts with the tools required to not only determine sources of vulnerabilities in a distributed database, but also to effectively identify the specific data or data stores that are most in need of protection and identify the specific protection mechanisms that would be most effective in addressing existing vulnerabilities.

Figure 1:
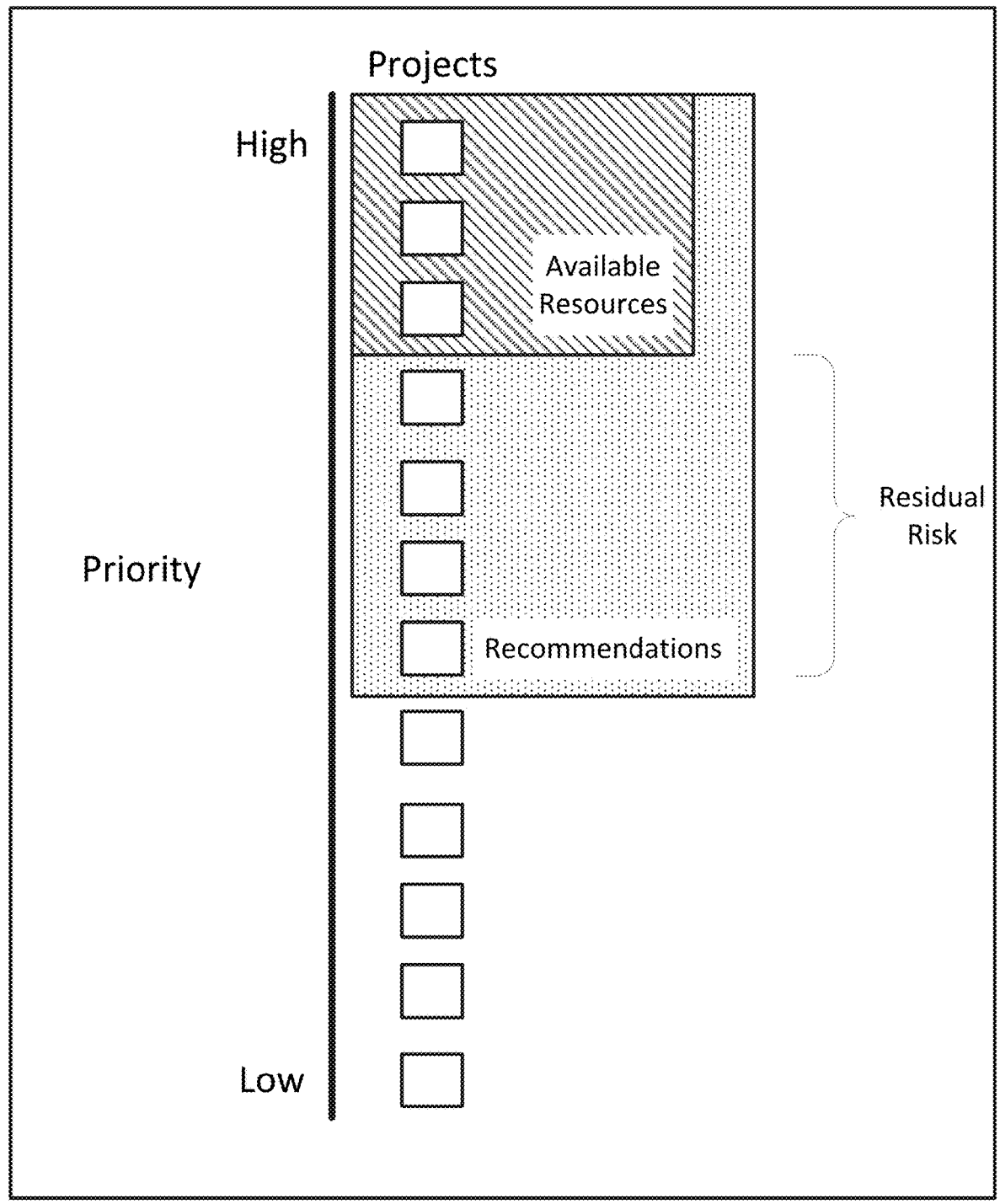
FIG. 1 illustrates a chart showing the trade-offs required to implement enterprise level security protections across a distributed database.

Due to limited resources, both in terms of computational resources (such as processing power, storage space, data characteristics and limitations, available protection mechanisms, etc.) and enterprise resources (such as qualified personnel, budget, location, space, etc.), it is necessary for enterprises to prioritize protections applied to data in a distributed database to achieve maximum impact on enterprise security at minimal costs (both computationally and organizationally). FIG. 1 illustrates a chart 100 showing the trade-offs required to implement enterprise level security protections across a distributed database. As shown in the chart, resources are frequently only available for the highest priority security projects, leaving lower priority projects unaddressed and vulnerable.

Given the limited resources (both computational and organizational) available for addressing security vulnerabilities, it is critical that security analysts accurately identify not only what data is most in need of protection, but also how to most effectively protect that data.

Applicant has discovered a method, apparatus, and computer-readable medium that solves the existing problems in the data security intelligence field through the simulation of data protection mechanisms on data stores in a distributed network database. In particular, the novel systems and methods disclosed herein extract data from data stores or data fields in a distributed network and apply transformations to the extracted data that simulate the application of protection mechanisms. The simulated values of the extracted data are then analyzed to assess the security impact of particular protection mechanisms on the relevant data. This approach allows not only for a deterministic solution to the problem of what data to protect, but also to the problem of how best to protect the data.

Figure 2:
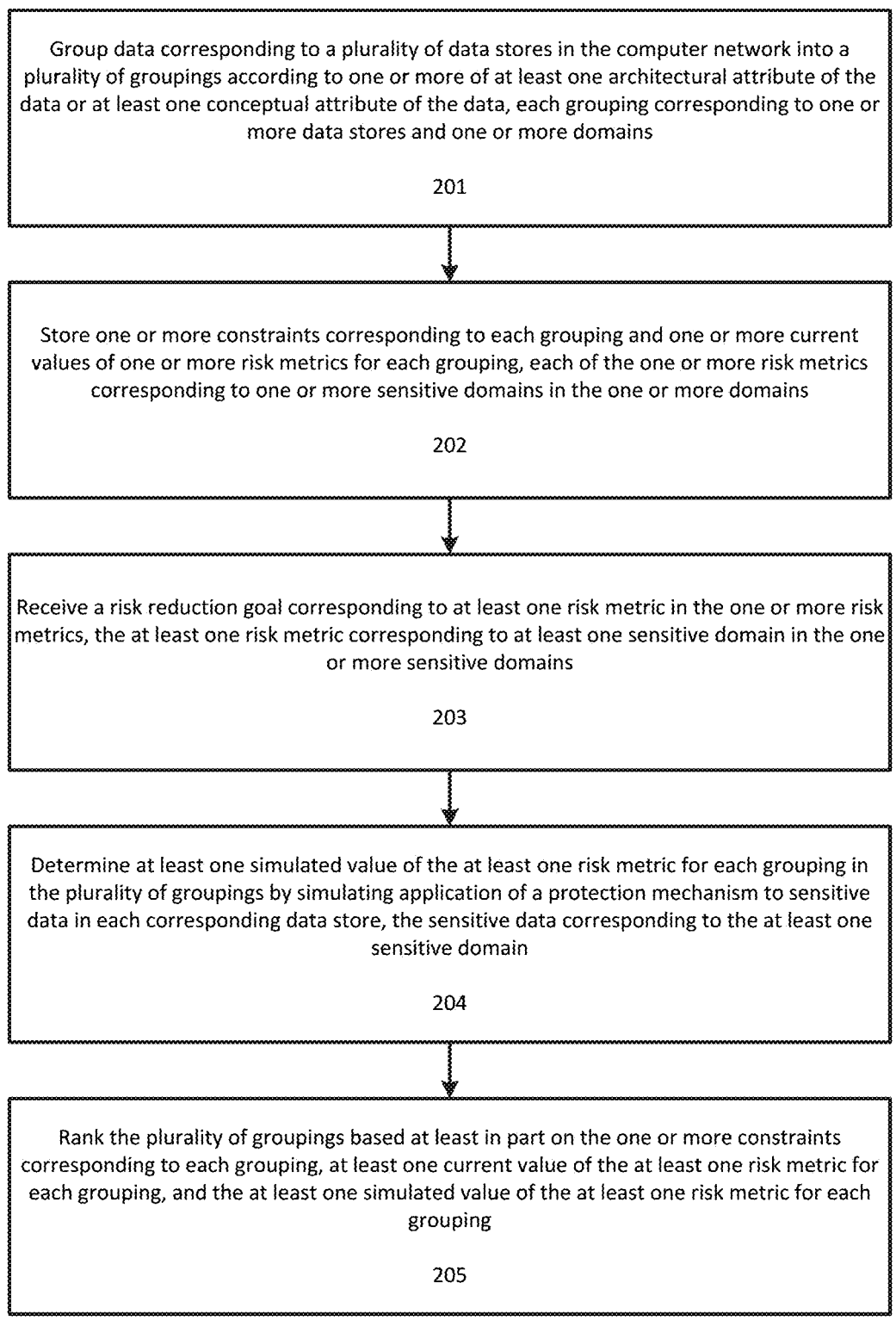
FIG. 2 illustrates a flowchart for data protection simulation and optimization in a computer network according to an exemplary embodiment.

FIG. 2 illustrates a flowchart for data protection optimization in a computer network according to an exemplary embodiment. At step 201 data corresponding to a plurality of data stores in the computer network is grouped into a plurality of groupings according to one or more of at least one architectural attribute of the data or at least one conceptual attribute of the data, with each grouping corresponding to one or more data stores and one or more domains.

A data store is a database, memory, or other physical storage medium that stores data and includes, at a minimum, a set of fields (for a structured database such as a relational database) or files (for an unstructured database such as a NoSQL database). While the description and figures in this specification refer to "fields," it is understood that in an unstructured database, the disclosed operations can be performed on "files." Data can include the actual data present in the memory of a particular store or events (user activity, user activity anomalies) occurring over the data in a particular store and corresponding to the data store. For example, data corresponding to a data store can include user access information for that data store.

Figure 3:
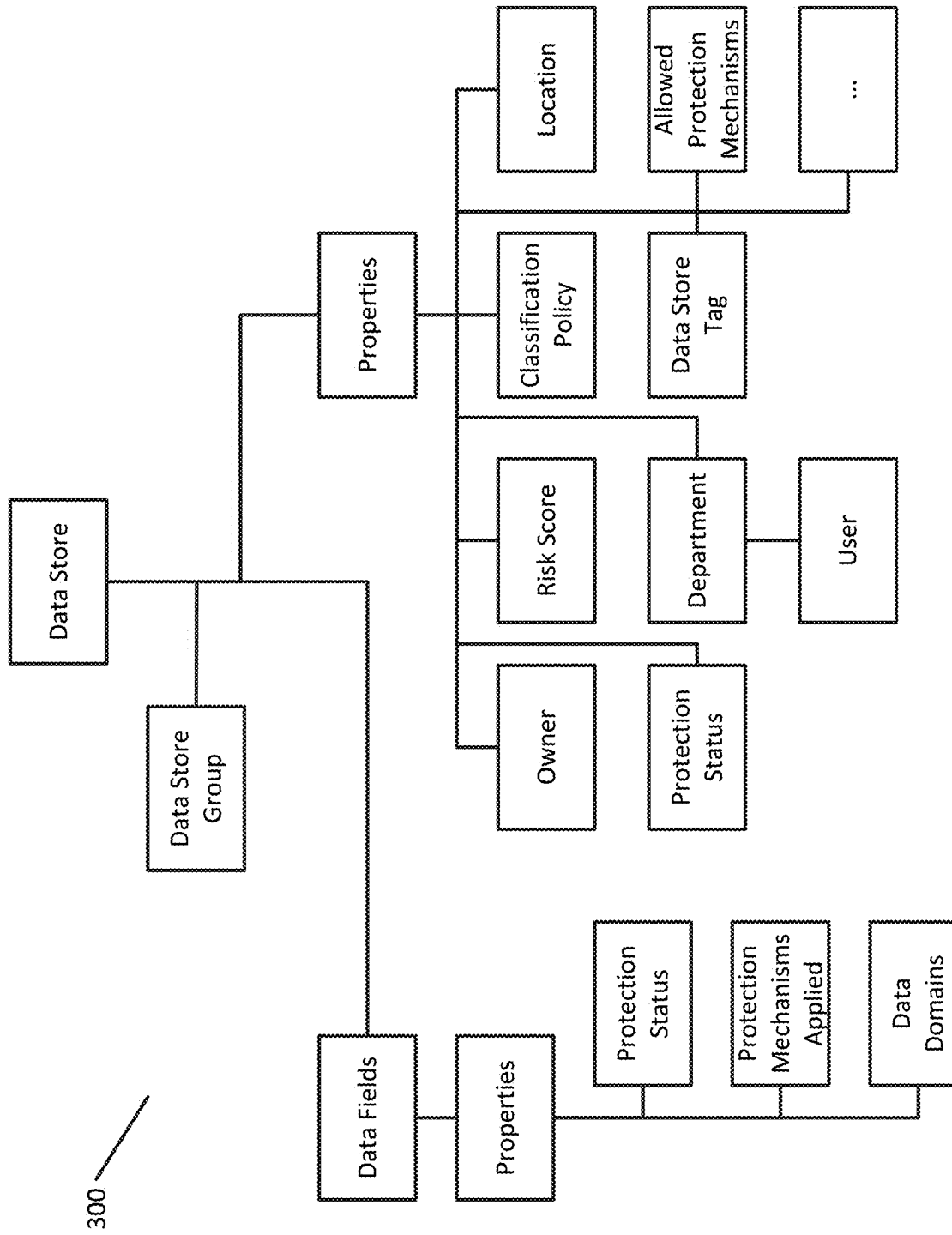
FIG. 3 illustrates a data store data model of a data store according to an exemplary embodiment.

FIG. 3 illustrates a data store data model 300 of a data store according to an exemplary embodiment. As shown in the data store data model 300, the data store can include data regarding the data domains, a particular group associated with the data store, data owners, risk scores, location, department, users in a department, tags, protection status, field level protection status, data fields, etc. In a structured database, data fields can refer to data columns and can include sensitive data fields in the data store. For example, a field "Social Security Number" in a particular data store can be categorized as a sensitive field. Similarly, data domains can refer to a "type" of field can include sensitive domains. In this case, the domain could be a "Social Security Number" domain that occurs as a field (column) in multiple tables in the data store.

Of course, the data store data model 300 shown in FIG. 3 is only one example of a data store, and other data stores are possible. For example, in an unstructured database, data fields and all attributes or data pertaining to data fields can be replaced with data files. Data files can include sensitive data files, such as a birth certificate or copy of a passport or credit card. In an unstructured database, the domain can refer to a type of file.

Figure 4:
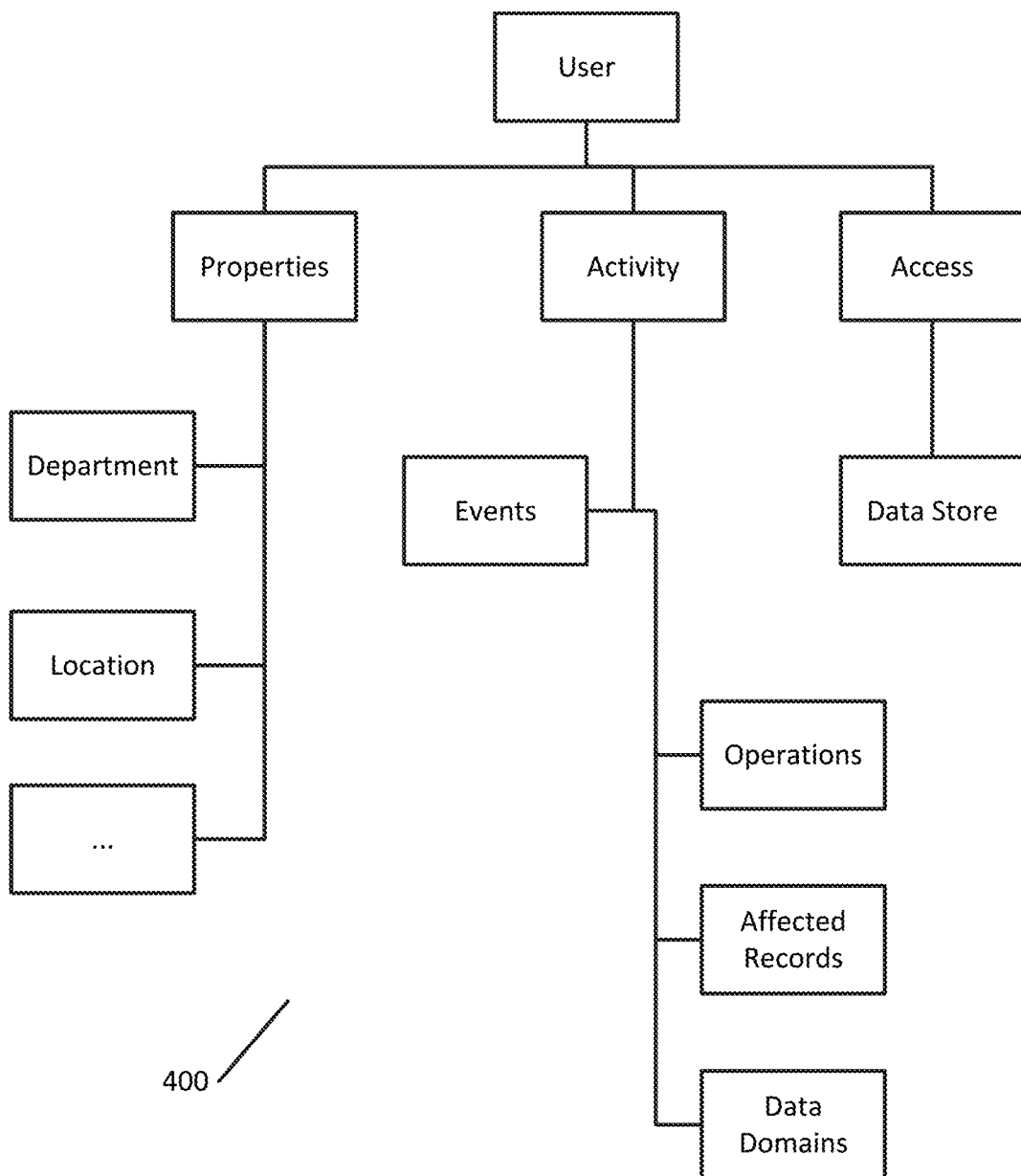
FIG. 4 illustrates a user data model corresponding to a user of the distributed network database according to an exemplary embodiment.

FIG. 4 illustrates a user data model 400 corresponding to a user of the distributed network database according to an exemplary embodiment. As discussed above, any data in the user data model can also correspond to a particular data store. This is indicated in the user data model 400 as the "data store" attribute under the "access attribute." Additional information in the user data model includes user activity information, such as events, operations, affected records, data domains accessed or modified, and/or properties, such as the user department, location, etc. The user data model 400 is a model of user whose data is tracked in a data security system, which can be a data security risk management system such as Informatica's Secure@Source.

Additional data that can correspond to data stores includes security policies. Security policies are IF-THEN constructs that define what type of data is governed by the security policy and what risk is associated with the type of data. Attributes of a security policy can include severity.

Figure 5:
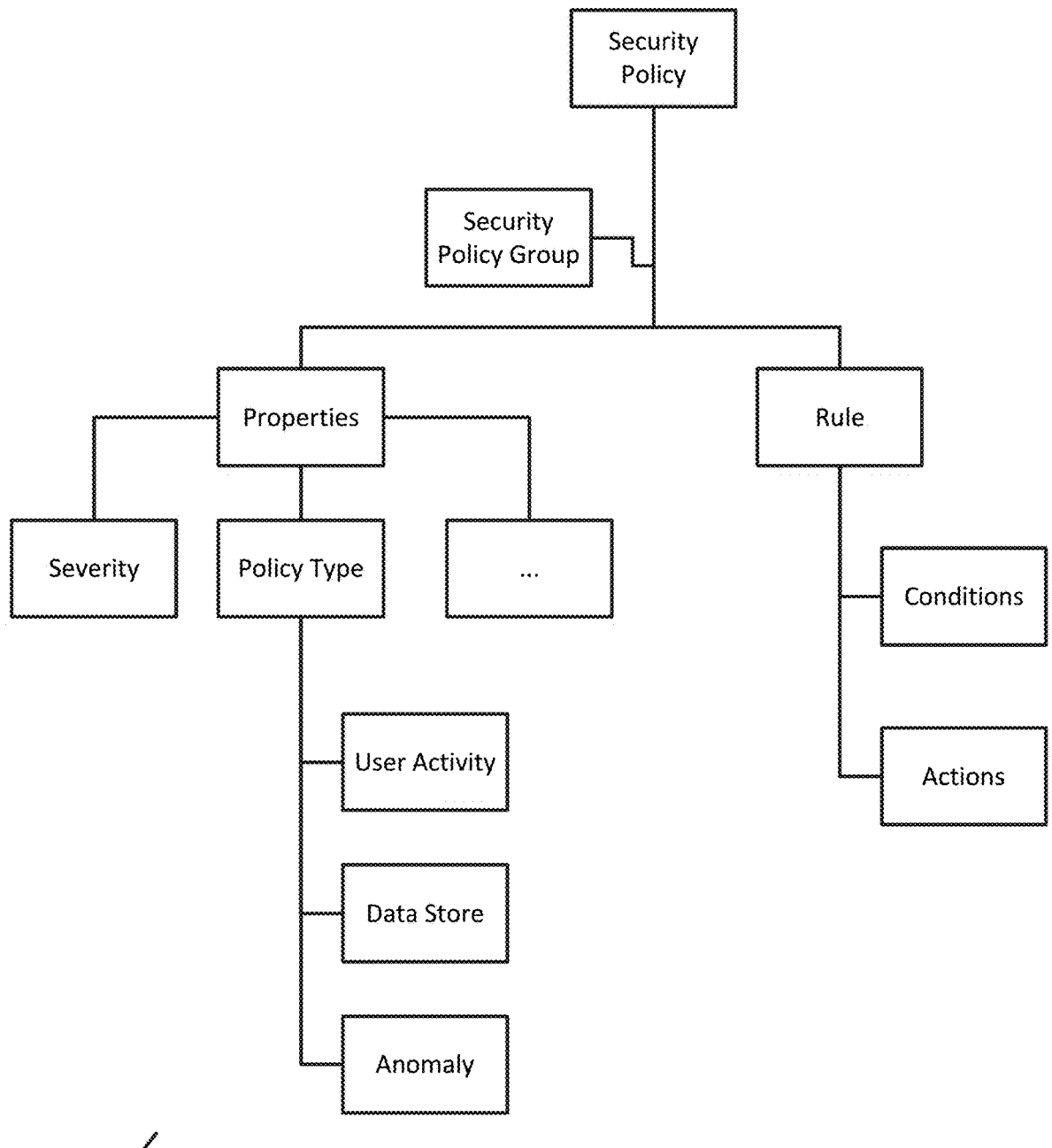
FIG. 5 illustrates a security policy data model of a security policy according to an exemplary embodiment.

FIG. 5 illustrates a security policy data model 500 of a security policy according to an exemplary embodiment. As shown in the security policy data model 500, the security policy can include a policy group, rules (including conditions and actions), and properties, such as severity, policy type, user activity, data stores, and anomalies (exceptions to the security policy). Security policies can quantify risk metrics based upon classifications.

Additional data that can correspond to data stores include classification policies. Classification policies define the type of sensitive data of an organization. A classification policy is a category of sensitive fields or domains that should be protected. An example of a classification policy would be a policy that requires that all Social Security Number fields in particular data stores in a certain location be stored in an encrypted format. Another example would be a Payment Card Industry policy that categorizes as sensitive fields any fields that contain credit card data.

Figure 6:
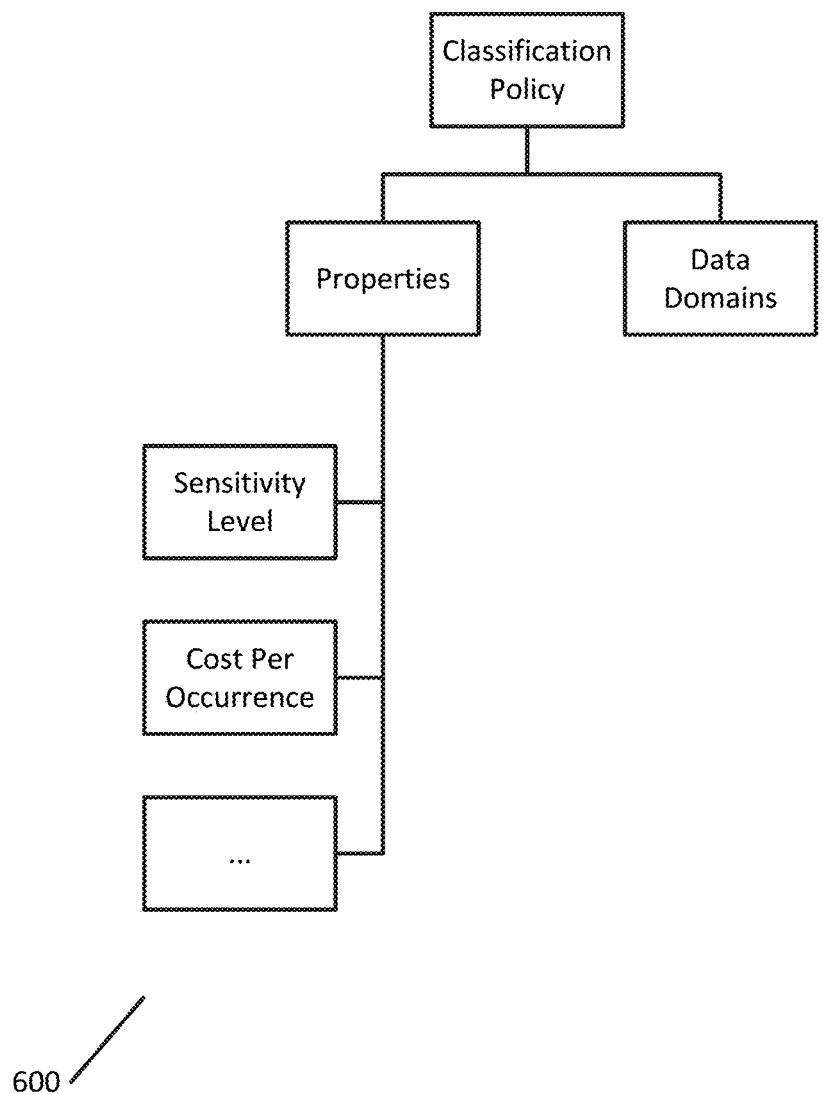
FIG. 6 illustrates a classification policy data model of a classification policy according to an exemplary embodiment.

FIG. 6 illustrates a classification policy data model 600 of a classification policy according to an exemplary embodiment. As shown in FIG. 6, the classification policy data model 600 can include the data domains governed by the classification policy and the properties of the classification policy, such as sensitivity level and cost per occurrence, which is monetary penalty associated with each occurrence of non-compliance with the classification policy.

As discussed with reference to step 201 of FIG. 2, the data corresponding to a plurality of data stores in the computer network is grouped into a plurality of groupings according to one or more of at least one architectural attribute of the data or at least one conceptual attribute of the data. These attributes can be ascertained from a specification or schema of the distributed network database accessible to the system.

Architectural attributes include attributes pertaining to how the data is stored. For example, architectural attributes include the table (or folder or set of files) storing the data, the data store storing the data, a location of the data or a data store that stores the data, a department or line of business associated with the data or a data store that stores the data, access rights (such as data owner or data user) associated with the data or a data store that stores the data, or some other grouping based upon some characteristic of how, where, or why the data is stored in a particular data store.

Conceptual attributes include attributes pertaining to how the data is used or classified. For example, conceptual attributes include a type of data, a characteristic of the data, a data domain associated with the data, a tag associated with the data, a set of domains associated with the data, a particular policy associated with the data, or some other grouping associated with the data, such as a policy sensitivity level.

Figure 7:
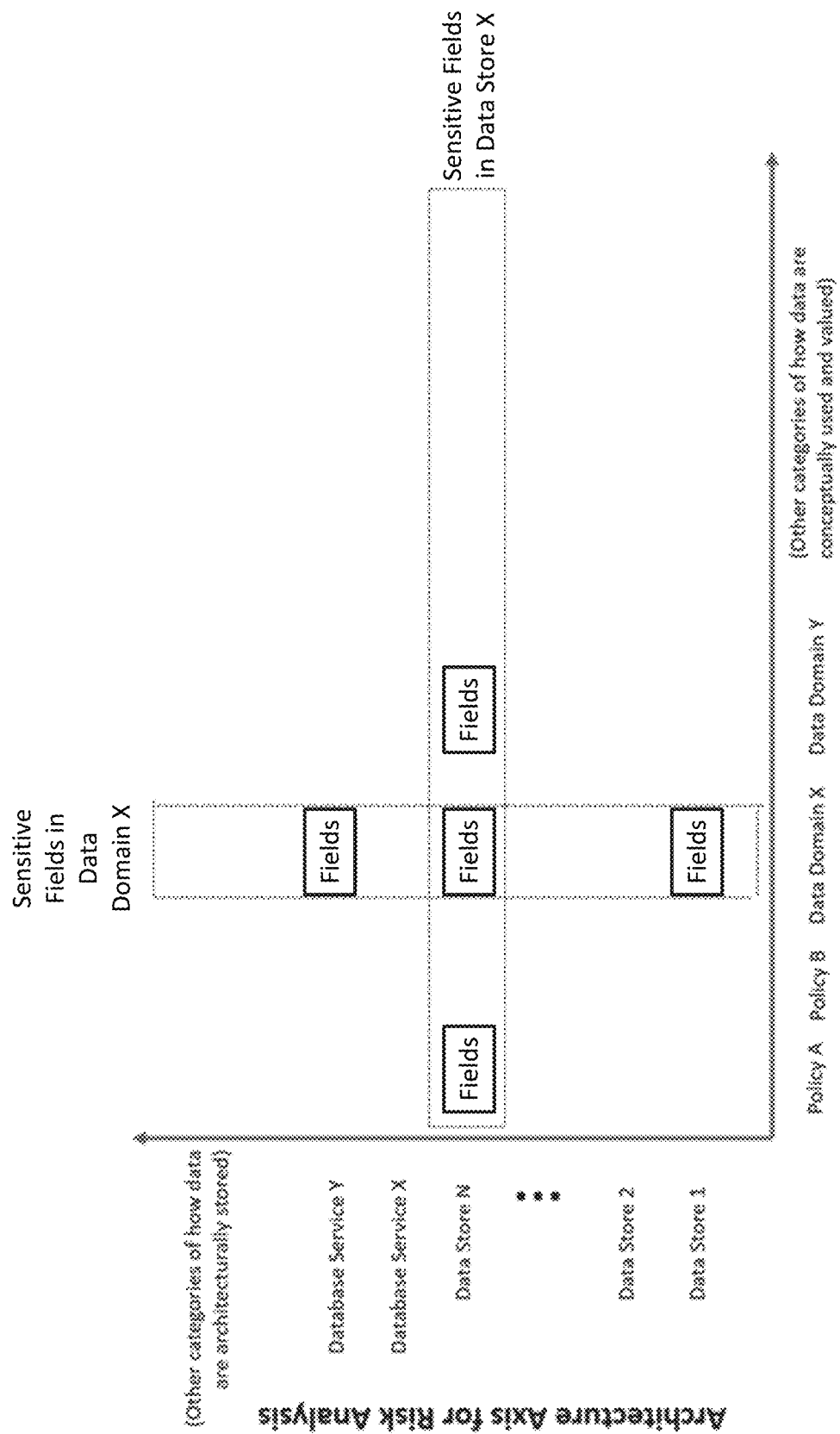
FIG. 7 illustrates an orthogonal chart 700 defined by architectural and conceptual attributes according to an exemplary embodiment.

FIG. 7 illustrates an orthogonal chart 700 defined by architectural and conceptual attributes according to an exemplary embodiment. As shown in chart 700, the architectural attributes are shown on the vertical (Y) axis and conceptual attributes are shown on the horizontal (X) axis.

Data groupings can be defined based on an architectural attribute, a conceptual attribute, or both an architectural and a conceptual attribute. An example of grouping data based on an architectural attribute is grouping data in the database according to data stores. An example of grouping data based on a conceptual attribute is grouping data in the database according to data domains. An example of grouping data based on both an architectural attribute and a conceptual attribute is grouping data in the database according to domain X and data stores. In this case, each grouping would correspond to the data on different data stores (Data Store 1, Data Store 2, etc.) that included domain X. For each grouping of data the system retrieves the set of fields, including sensitive fields, within the grouping. With reference to the policy conceptual attribute, any grouping based upon policy will identify the appropriate domains associated with the particular policy and then perform the grouping based upon those domains. FIG. 7 is for illustration only, and groupings can be based on conceptual or architectural attributes not shown in FIG. 7, such as locations or departments.

Regardless of how the data is grouped, each grouping will correspond to one or more domains and one or more data stores. For example, if the data was grouped according to domain, each domain group would have an associated set of data stores that include that domain, and vice versa.

FIG. 8 illustrates matrices that can be used to generate the plurality of groupings according to an exemplary embodiment. The system can constructs the orthogonal space of field groupings as described with respect to FIG. 7, with a specific focus on data store on architectural axis and data domain and policy on conceptual axis as default. Both axes are expandable to incorporate more groupings as more information is input to the system and the system is updated.

To organize the data in orthogonal space, it is necessary to manipulate the data structure that is provided to the system by a given risk management system (e.g., Secure@Source). The following implementation allows for this organization by representing policy, domain, and data store using truth tables.

The system populates three matrices, a policy-store matrix 801, a policy-domain matrix 802, and a domain-store matrix 803. These are the most frequent field groupings identified by data security analysts. These matrices are described below.

Policy-Store matrix 801: for each cell (p,s), the value at is 1 if store s contains data that are governed by policy p.

Policy-Domain matrix 802: for each cell (p,d), the value is 1 if policy p governs domain d, else it is 0.

Domain-Store matrix 803: for each cell (d,s), the value is 1 if domain d is associated to sensitive fields in store s, else it is 0.

Using the three matrices, any selection of one or more conceptual attributes, one or more architectural attributes, or some combination of the two can be used to identify the appropriate grouping or groupings, including the domain(s) corresponding to each grouping and the relevant data stores corresponding to each grouping.

Figure 9:
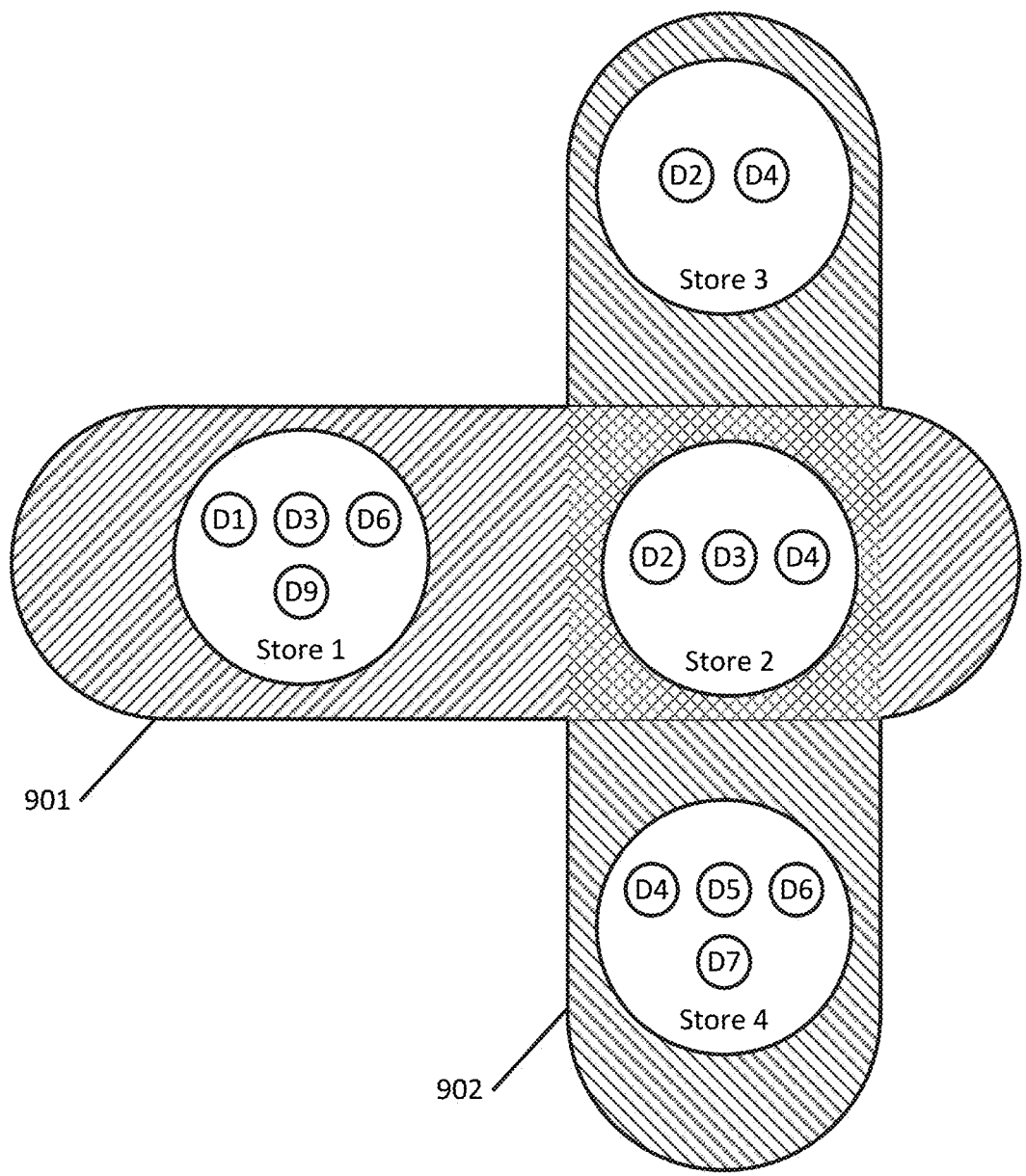
FIG. 9 illustrates an example of two groupings according to an exemplary embodiment.

FIG. 9 illustrates an example of two groupings according to an exemplary embodiment. Grouping 901 includes any data stores that include the domain D3 and grouping 902 includes any data stores that include the domain D4. As shown in FIG. 9, grouping 901 includes Store 1 and Store 2, and grouping 902 includes Store 3, Store 2, and Store 4 (with Store 2 being part of both groupings).

Returning to FIG. 2, at step 202 one or more constraints corresponding to each grouping and one or more current values of one or more risk metrics for each grouping are identified and stored, with each of the one or more risk metrics corresponding to one or more sensitive domains in the one or more domains.

Constraints can include resources available for protection of that grouping, such as computational resources or organizational resources, such as money, time, people, systems, etc.

Constraints can also include compatibility of the resources, such as the compatibility of certain protection mechanisms or techniques with data stores or domains in the grouping, compatibility of organization resources with data stores or domains in the grouping, or compatibility of computational resources with data stores or domains in the grouping.

Constraints can also include, for each grouping, a quantity of a resource available to the one or more corresponding data stores, a compatibility of a protection mechanism with the corresponding one or more data stores, a compatibility of a resource with the one or more corresponding data stores, a hardware configuration of the one or more corresponding data stores, or a software configuration of the one or more corresponding data stores.

Constraints can also include the available protection mechanisms in each customer system, their applicability to the data stores, configuration parameters, and price of protection (e.g., computational resources, dollars, time, or other resources required).

The one or more risk metrics can include risk factors, such as sensitivity of data (data type, e.g., assigned via policy), cost of data (data type, e.g., assigned via policy), impression (volume-weighted user activity, e.g., Select from 3 columns=>3*100 impressions), lineage attributes (e.g., number of targets), protection status (prior level of protections applied).

The one or more risk metrics can also include impression metrics, such as sensitive fields (volume of data), number of records (volume of data), user access (rights for user activity on the data).

The one or more risk metrics can also include one or more quantitative risk metrics and one or more qualitative risk metrics.

Quantitative risk metrics can include metrics such as risk score (an aggregate risk score for the grouping based upon the corresponding data stores), protection status (of sensitive fields within the data stores of the grouping), data risk cost (computed by policy penalty, data volume), protection expense (costs, either organizational or computational, for implementing a particular protection), data value (a metric expressed at the level of field or file that measures monetary value based on the number of records), or any other quantitative risk metrics.

Qualitative risk metrics can include a policy compliance status. For example, for each data store in the grouping, the data store compliance status is an ordinal variable with possible values of not compliant, in-progress, fully compliant. In this case, after a user takes actions to comply with, for example the General Data Protection Regulation (GDPR) policy then the relevant stores' compliance status will be updated accordingly.

Qualitative risk metrics can also include a sensitivity level of data in the data stores of each grouping. For example, given a large set of stores that can be protected, if the user is interested in selecting the stores with highest sensitivity level, then they could use this metric to rank the stores.

The one or more risk metrics can also include, for each grouping, a risk score corresponding to the one or more corresponding data stores, a protection status corresponding to the one or more corresponding data stores, a data risk cost corresponding to the one or more corresponding data stores, a protection cost corresponding to implementation of a protection mechanism on the one or more corresponding data stores, a policy compliance status indicating compliance of the corresponding one or more data stores with a policy, or a sensitivity level indicating a sensitivity of data stored on the one or more data corresponding stores.

Figure 10:
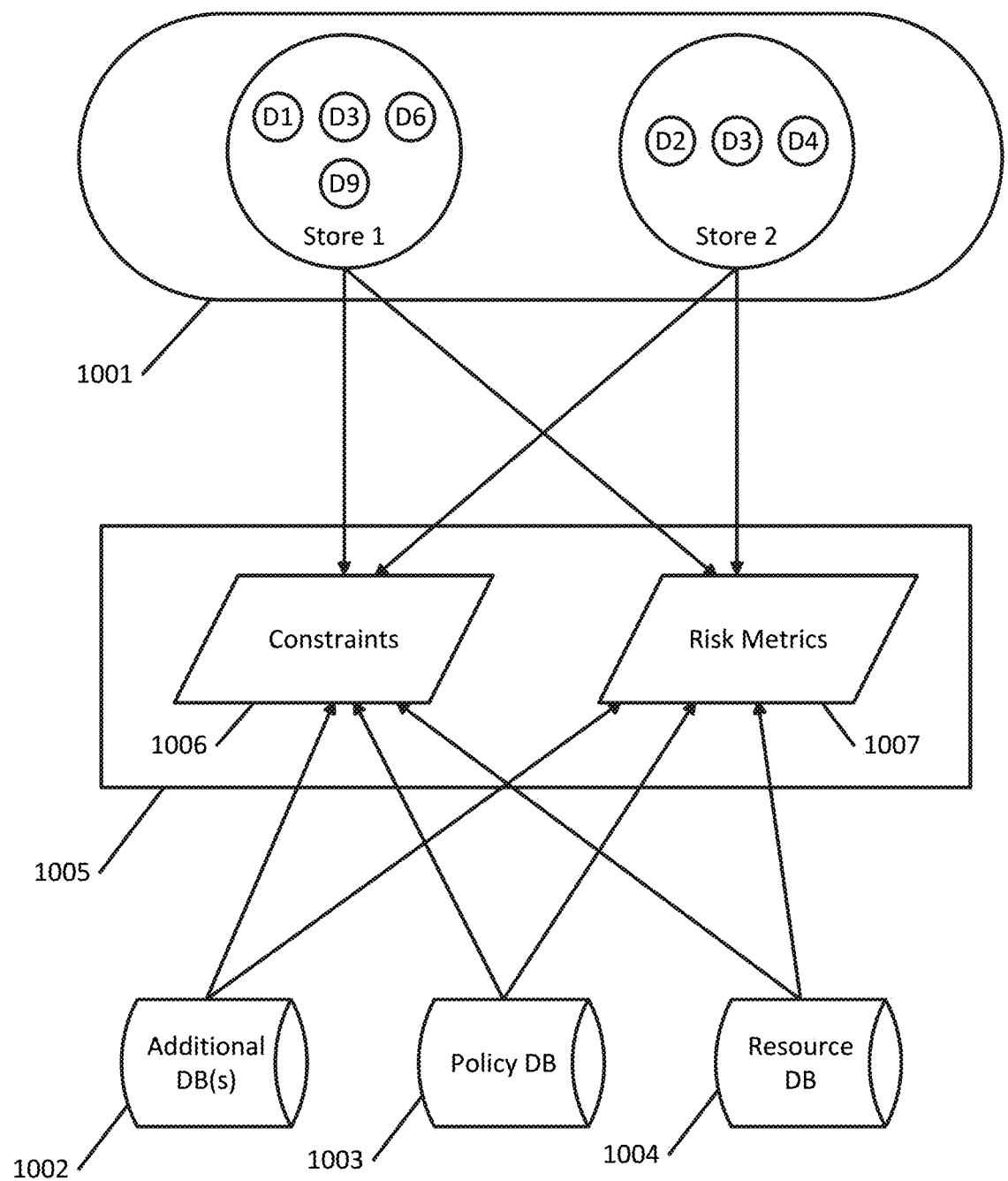
FIG. 10 illustrates a system diagram for retrieving and storing constraints and risk metrics according to an exemplary embodiment.

FIG. 10 illustrates a system diagram for retrieving and storing constraints and risk metrics according to an exemplary embodiment. As shown in FIG. 10, constraints 1006 and risk metrics 1007 can be stored on a storage medium 1005. Storage medium 1005 can be part of a server connected to the distributed network database, a client device connected to the server, or part of a data store that is in the distributed network database.

Constraints 1006 and risk metrics 1007 can be retrieved from the stores in a particular grouping, such as grouping 1001. Constraints 1006 and risk metrics 1007 can also be retrieved from one or more databases, such as a policy database 1003 that stores information regarding policies governing the domains and data stores in the network, a resource database that stores constraint information regarding the domains and data stores in the network, or one or more additional databases 1002. Additional databases 1002 can include, for example, a risk assessment database stores risk metrics corresponding to data stores and domains on the network.

Constraints 1006 and risk metrics 1007 can also be identified and stored in other ways. For example, the system can interface with an existing risk tracking system to retrieve and store the data, or the system can rely on the data stored in the risk tracking system, in which case medium 1005 can be part of the risk tracking system.

Returning to FIG. 2, at step 203 a risk reduction goal corresponding to at least one risk metric in the one or more risk metrics is received, with the at least one risk metric corresponding to at least one sensitive domain in the one or more sensitive domains. Receiving a risk reduction goal can include receiving a selection of at least one qualitative risk metric in a plurality of qualitative risk metrics, receiving a selection of at least one quantitative risk metric in a plurality of quantitative risk metrics, and/or receiving an identification of at least one policy in a plurality of policies, each policy corresponding to one or more of: a qualitative risk metric or a quantitative risk metric.

The risk reduction goal can be quantitative or qualitative. For example, a quantitative risk reduction goal can be to reduce a risk metric or reduce a risk metric by a user-specified, default, or system-specified amount. A qualitative goal can be to comply with certain security or classification policies governing certain domains and/or data stores.

Figure 11:
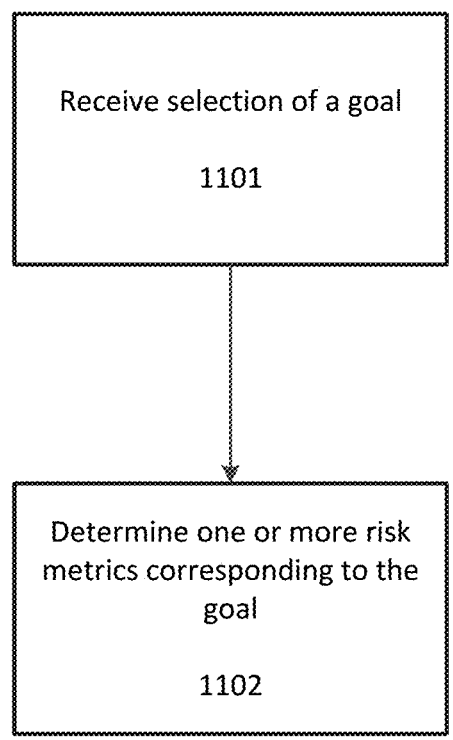
FIG. 11 illustrates a flowchart for receiving a risk reduction goal according to an exemplary embodiment.

FIG. 11 illustrates a flowchart for receiving a risk reduction goal according to an exemplary embodiment. At step 1101 a selection of a goal is received. As will be discussed further below, this selection can be received through a user interface in a variety of ways. The risk reduction goal can also be received from the system, based on a default risk reduction goal (such as reduce overall risk score, reduce data protection cost, etc.) or based on current areas of high risk identified by the system. For example, if a risk metric corresponding to a particular grouping is deemed above a certain threshold (as set by a policy), then an initial goal can be set by the system to reduce the risk metric for that grouping.

At step 1102 one or more risk metrics corresponding to the goal are determined. If the goal is received as a risk metric, then this step simply designates the risk metric specified in goal as the appropriate risk metric corresponding to the goal. However, goals can also be defined in broader terms, such as compliance with a particular policy, in which case one or more risk metrics corresponding to that policy are identified, the current values of those risk metrics are determined, and a reduction of those risk metrics is set as a target. The one or more risk metrics corresponding to the goal can be received from a user or determined based upon the goal.

The one or more risk metrics corresponding to the goal can be quantitative or qualitative. For example, quantitative risk metrics corresponding to the goal can include risk score (#), protection status (%), data risk cost ($), protection expense ($), etc. Qualitative risk metrics corresponding to the goal can include a policy compliance status, policy sensitivity level, etc.

Steps 1101 and 1102 can include, for example, selecting a default goal to be a comply policy of high sensitivity level and representing the goal with both quantitative and qualitative metrics.

Figure 12:
FIG. 12 illustrates an interface for receiving a goal according to an exemplary embodiment.

FIG. 12 illustrates an interface 1200 for receiving a goal according to an exemplary embodiment. As shown in interface 1200, a goal can be set as combination of different policies, by having a user select an importance associated with compliance with each policy. The user selections can then be weighted and used to determine the appropriate risk metrics corresponding to each policy with a non-zero weighting.

Figure 13:
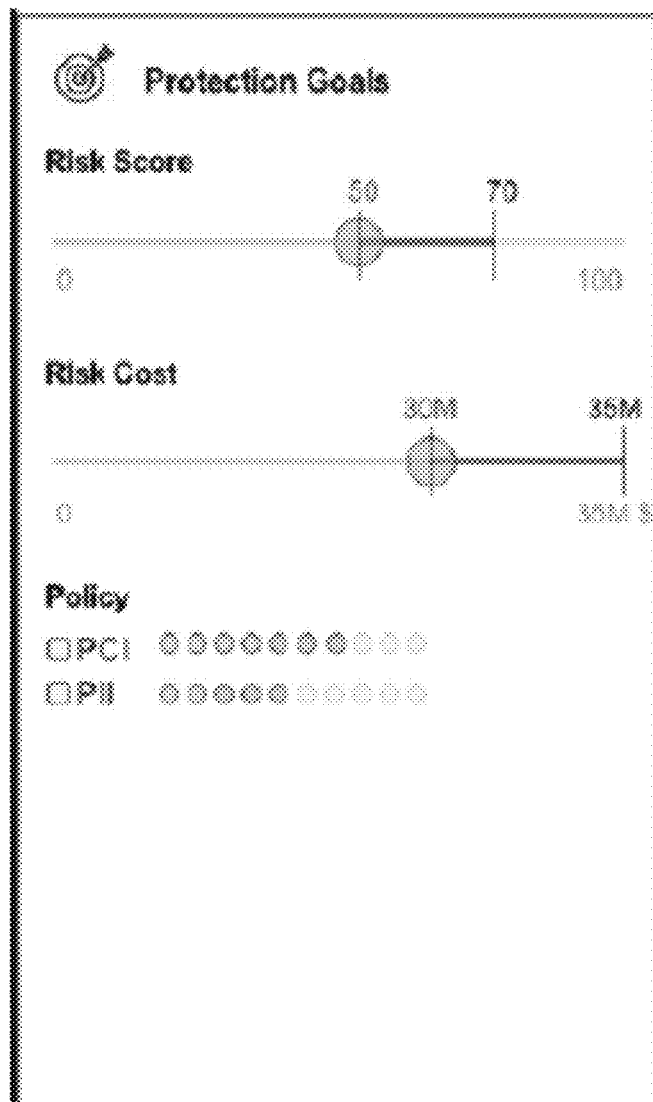
FIG. 13 illustrates another interface for receiving a goal according to an exemplary embodiment.

FIG. 13 illustrates another interface 1300 for receiving a goal according to an exemplary embodiment. As shown in FIG. 13, a user can specify a desired target risk metric or a desired target risk metric range. The risk metrics shown in interface 1300 include risk score and risk cost, but can be any of the risk metrics discussed herein. The interface 1300 also allows a user select one or more policies they would like to comply with. The selection of policies can automatically result in the determination of appropriate risk metrics and target values of risk metrics, based upon the selected policies.

Figure 14:
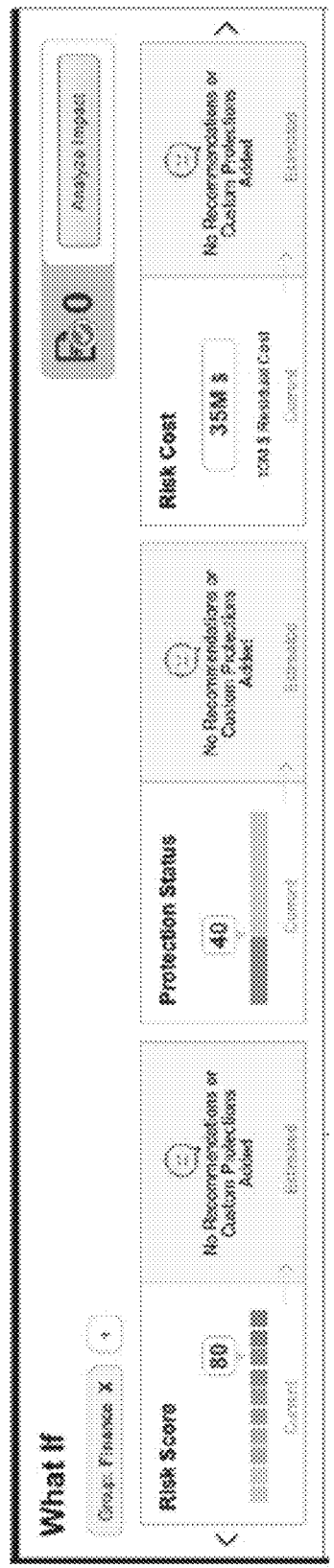
FIG. 14 illustrates another interface showing various risk metrics that can be selected, tracked, and displayed as part of the disclosed process.

FIG. 14 illustrates another interface 1400 showing various risk metrics that can be selected, tracked, and displayed as part of the disclosed process. As shown in FIG. 14, the risk metrics risk score, protection status, and risk cost are all determined and displayed. The values of these metrics shown in interface 1400 can be computed at a network wide level, meaning the aggregate values for all groupings of data.

Returning to FIG. 2, at step 204 at least one simulated value of the at least one risk metric is determined for each grouping in the plurality of groupings by simulating application of a protection mechanism to sensitive data in each corresponding data store, the sensitive data corresponding to the at least one sensitive domain.

Figure 15:
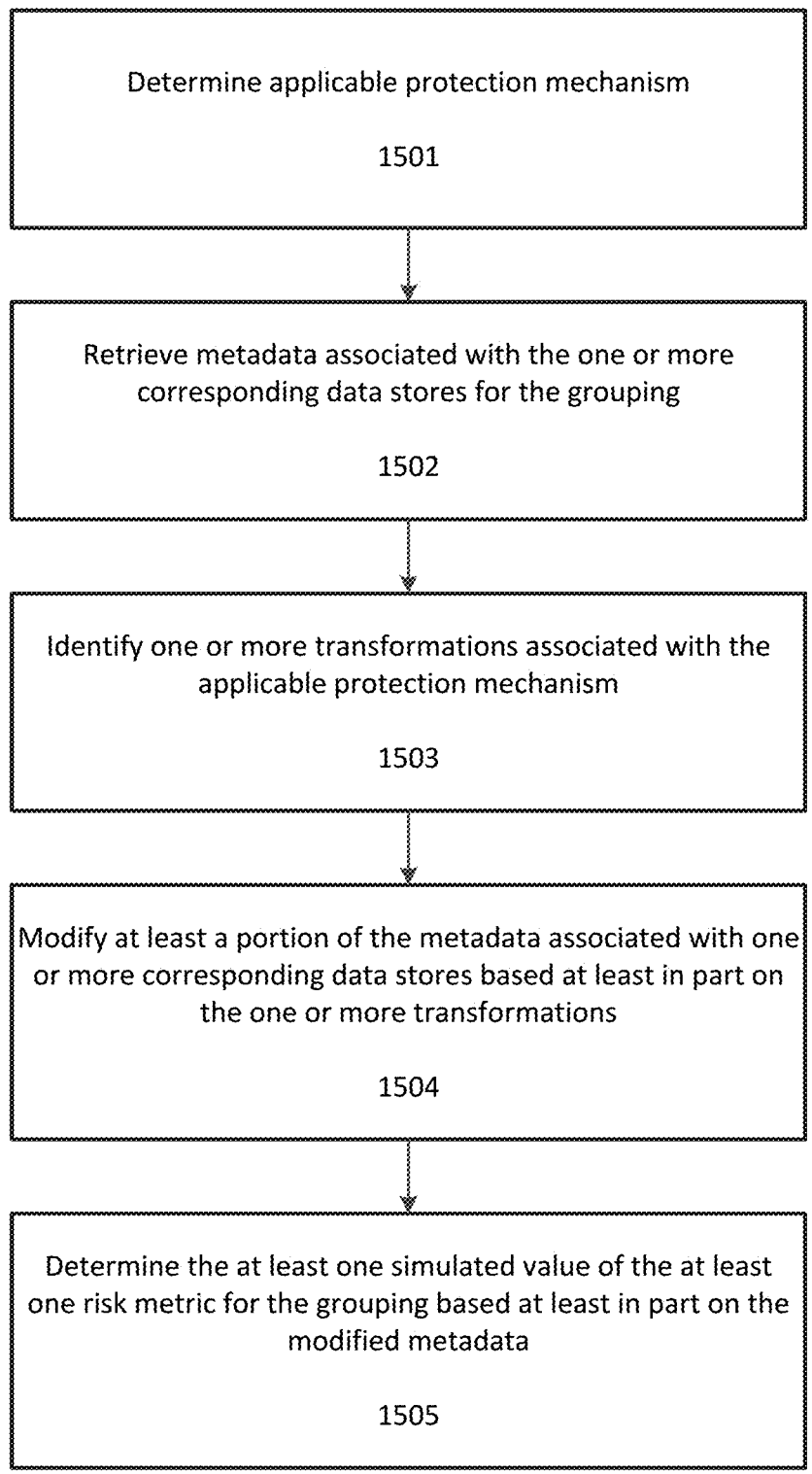
FIG. 15 illustrates a flowchart for determining at least one simulated value of the at least one risk metric for each grouping in the plurality of groupings by simulating application of a protection mechanism to sensitive data in each corresponding data store according to an exemplary embodiment.

FIG. 15 illustrates a flowchart for determining at least one simulated value of the at least one risk metric for each grouping in the plurality of groupings by simulating application of a protection mechanism to sensitive data in each corresponding data store according to an exemplary embodiment.

The process shown in FIG. 15 can be repeated for each grouping in the plurality of groupings of data (for example, if different protection mechanisms are to simulated for each grouping) or can be performed for all groupings at the same time.

At step 1501 an applicable protection mechanism is determined. Protection mechanisms define a technique or method used to protect sensitive data, and can include, for example, encryption, data masking, access controls, obfuscation, or any other type of data transformation that makes access to the data more difficult for an unauthorized or unintended user.

Figure 16:
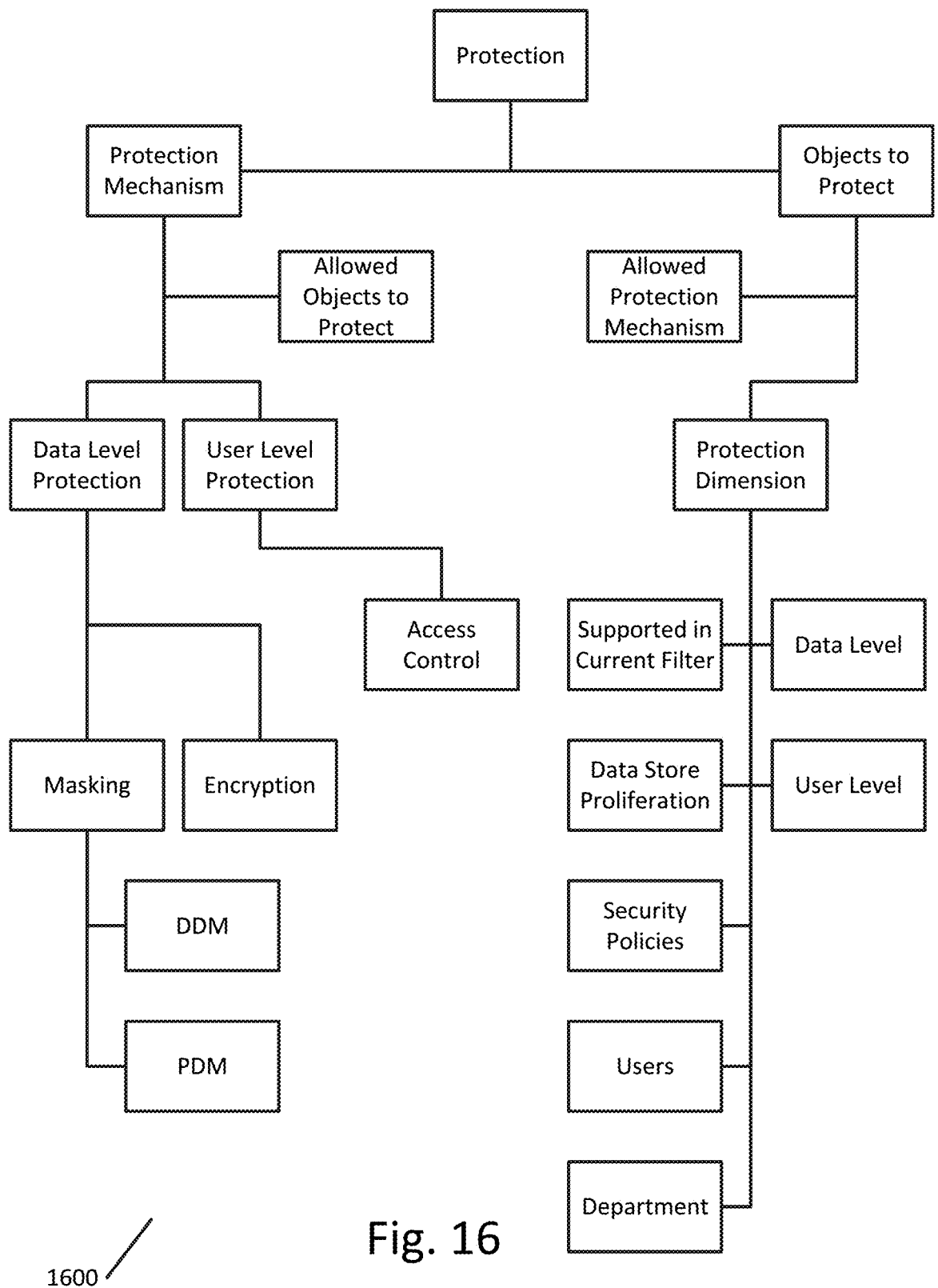
FIG. 16 illustrates a protection data model according to an exemplary embodiment.

FIG. 16 illustrates a protection data model 1600 according to an exemplary embodiment. As shown in FIG. 16, the protection mechanism is one part of the protection data model 1600. Another part of the protection model specifies what data to protect ("objects to protect"), and includes data regarding allowed protection mechanisms and protection dimensions. Protection dimensions indicate the level of protections applied to the data, such as the data level (e.g., a particular data store, domain, or field), a user level associated with the protections, whether the protection is applicable to filters, data store proliferation, security policies, users, departments, etc. For example, if the protection dimension includes data store proliferation, then the protection will extend to subsequent data stores which receive the protected data from a protected data store or domain.

Protection data model 1600 also defines the allowed objects to protect for a particular protection mechanism, data level protection techniques such as masking and encryption, and user level protection techniques such as access control lists.

Figure 17:
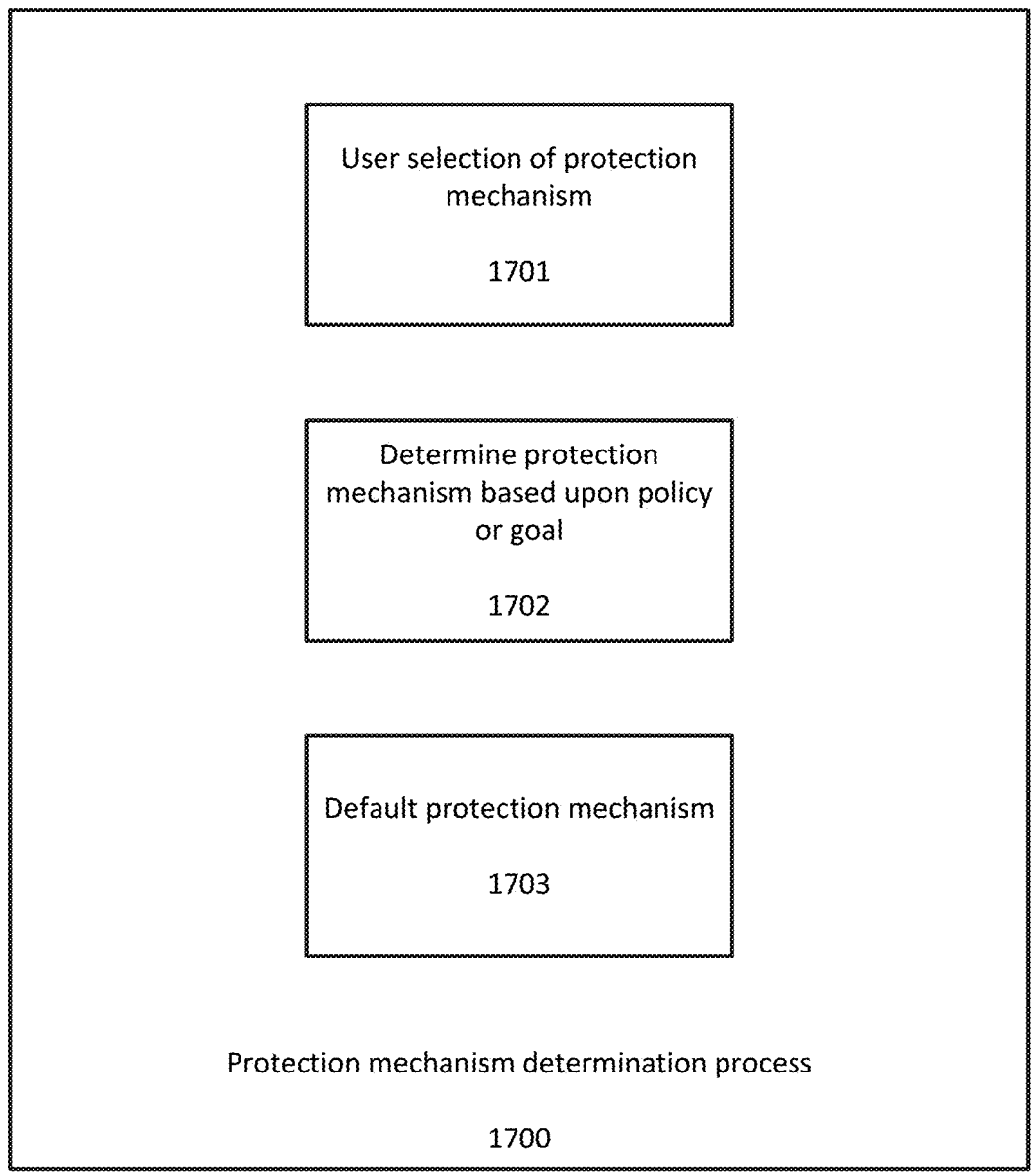
FIG. 17 illustrates a chart of the protection mechanism determination process according to an exemplary embodiment.

FIG. 17 illustrates a chart 1700 of the protection mechanism determination process according to an exemplary embodiment. At step 1701 the protection mechanism can be selected by the user, for example, through a user interface that provides the user with a choice between protection mechanisms.

At step 1702, the protection mechanism can be determined based upon a policy or goal. For example, if the goal is minimize a risk score associated with a particular data store, then an encryption protection mechanism can be determined to offer strongest protection and the greatest risk reduction.

At step 1703 a default protection mechanism can be determined. The default protection mechanism can be set by a user, can be standard to a particular implementation of the system, can be set by an administrator, and/or can be determined based upon characteristics of the domains and/or data stores in a particular grouping. For example, if certain types of data values, data stores, or domains, can achieve greater risk reduction at lower resource cost using a certain protection mechanism over other protection mechanisms, then that protection mechanism can be set as the default for those types of data values, data stores, or domains.

One or more of steps 1701, 1702, and 1703 can be used to determine the protection mechanism to simulate. For example, a default protection mechanism can be set and can then be modified or otherwise replaced based upon user selections.

Figure 18:
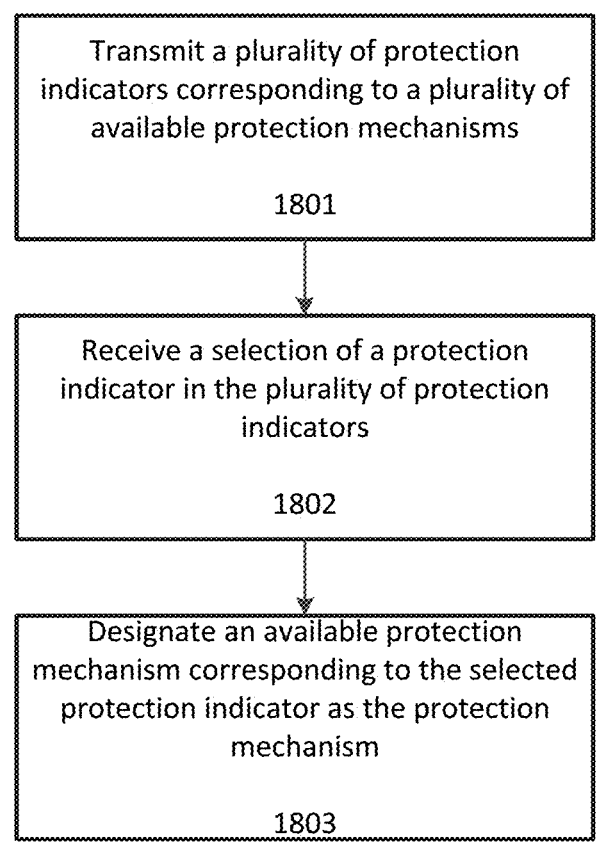
FIG. 18 illustrates a flowchart for receiving a selection of a protection mechanism according to an exemplary embodiment.

FIG. 18 illustrates a flowchart for receiving a selection of a protection mechanism according to an exemplary embodiment. At step 1801 a plurality of protection indicators corresponding to a plurality of available protection mechanisms are transmitted. The protection indicators can be transmitted, for example, in a user interface of a display at a user terminal.

At step 1802 a selection of a protection indicator in the plurality of protection indicators is received. This selection can be received from a user, through a user interface. Additionally, the selection can be received for each grouping, so that user may designate a different protection mechanism for each grouping.

At step 1803 an available protection mechanism corresponding to the selected protection indicator is designated as the protection mechanism.

Figure 19:
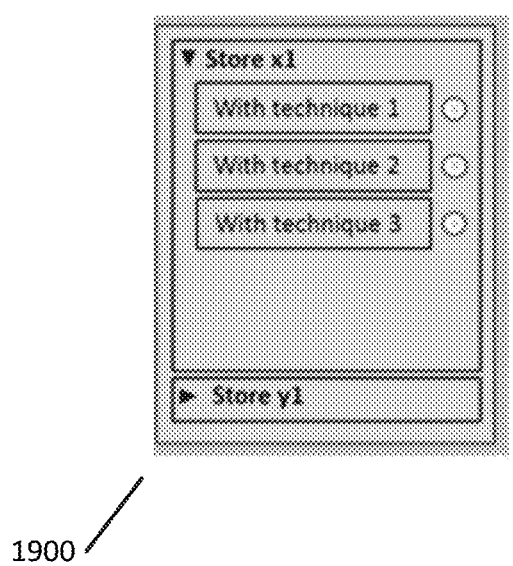
FIG. 19 illustrates an interface for receiving a selection of a protection mechanism according to an exemplary embodiment.

FIG. 19 illustrates an interface for receiving a selection of a protection mechanism according to an exemplary embodiment. As shown in interface 1900, the user is given the option of selecting a protection mechanism between three possible protection techniques to apply to data store x1. The user can also select a protection mechanism for data store y1 by selecting that store to open up a corresponding selection interface.

Returning to FIG. 15, at step 1502 metadata associated with the one or more corresponding data stores for the grouping is retrieved. The metadata can include all of metrics and constraints previously discussed, such as the risk metrics, and can also include any information that is used to compute risk metrics or constraints. For example, the metadata can include a number of sensitive domains in a particular store, a number of sensitive fields, any applicable policies for the stores in the domain, any data risk cost or risk score associated with data in the grouping, etc.

Figure 20A:
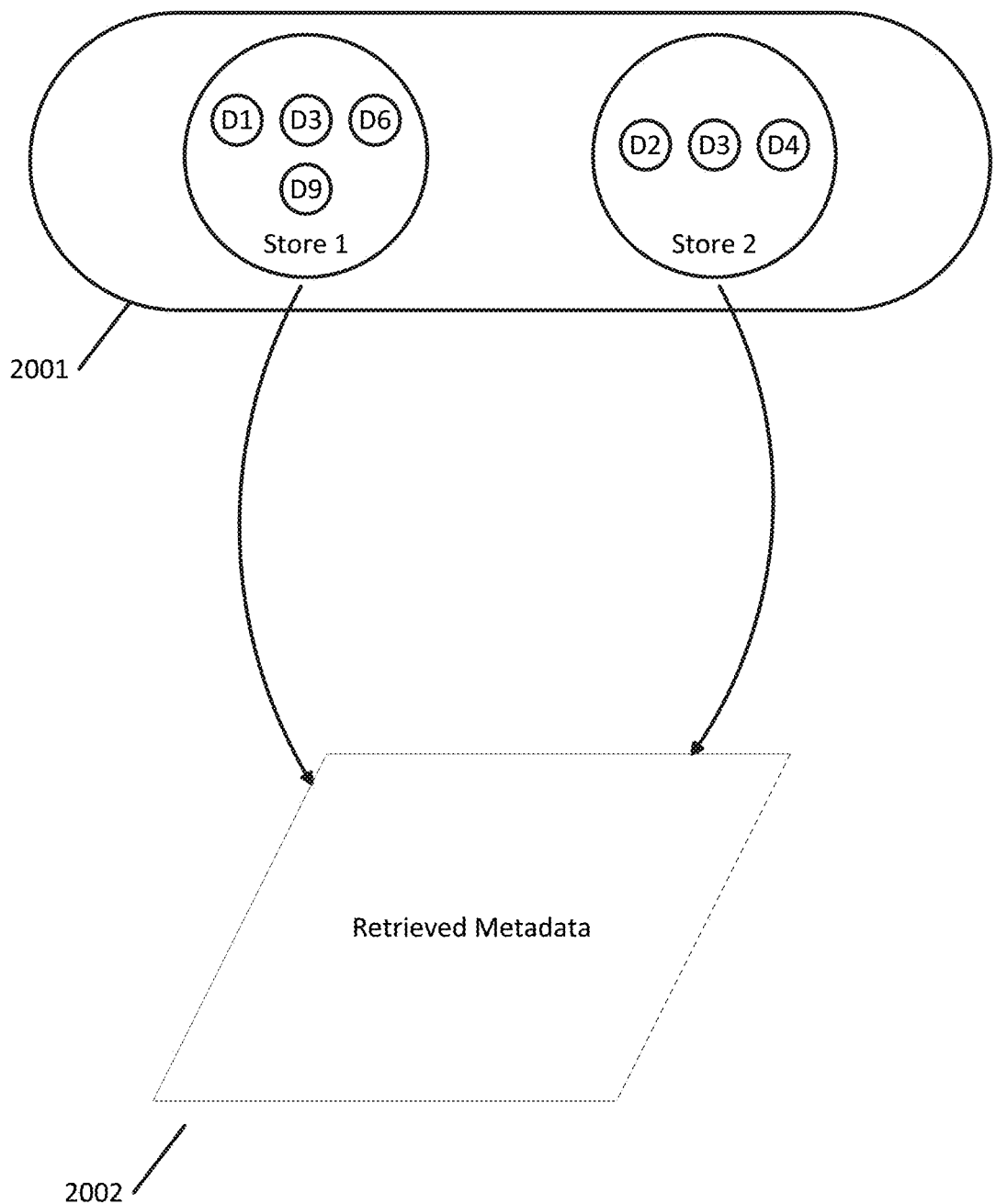
FIG. 20A illustrates a system chart for retrieving metadata according to an exemplary embodiment.

This metadata can be retrieved in various ways. For example, FIG. 20A illustrates a system chart for retrieving metadata according to an exemplary embodiment. Each data store can be queried over the network to collect the relevant metadata for a particular grouping. As shown in FIG. 20A, Store 1 and Store 2 in grouping 2001 are queried to retrieve metadata 2002 corresponding to the grouping 2001. That metadata, can include, for example, information about the domains in Store 1 (D1, D3, D6, D9) and information about the domains in Store 2 (D2, D3, D4). Querying the data stores can include querying a specified area of memory of each data store that is configured to store the metadata. Querying the data stores can also include analyzing the data on each data store to independently generate the relevant metadata.

Figure 20B:
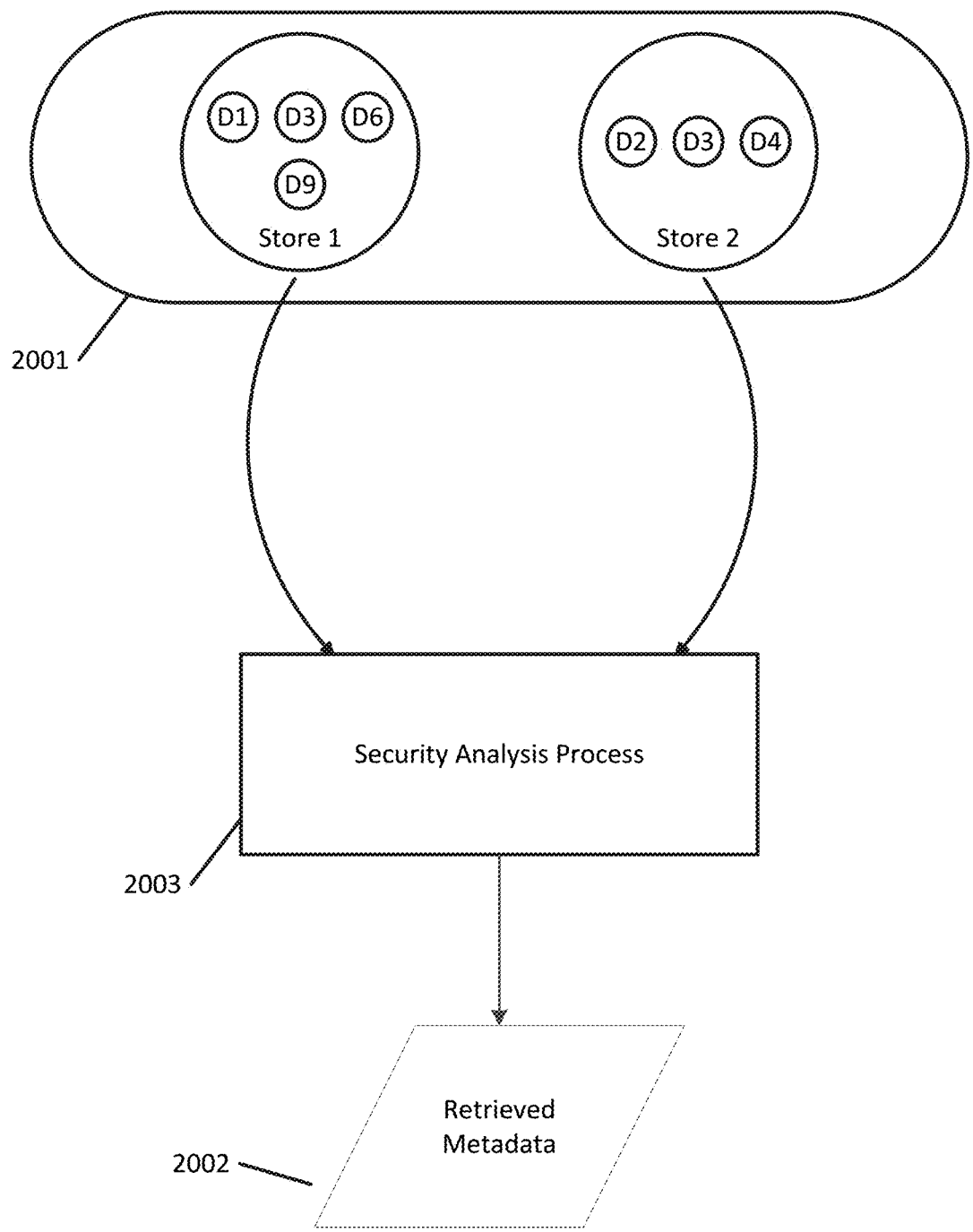
FIG. 20B illustrates another system chart for retrieving metadata according to an exemplary embodiment.

FIG. 20B illustrates another system chart for retrieving metadata according to an exemplary embodiment. FIG. 20B is similar to FIG. 20A but includes an additional component, the security analysis process 2003. Security analysis process 2003 can be a risk assessment and management program or tool (such as Secure@Source) which retrieves or collects metadata regarding data stores in the network. For example, security analysis process 2003 can compile metadata regarding the data stores in the network on a regular basis, as part of enterprise risk tracking. The metadata 2002 that is used for the simulation of the protection mechanism on a particular grouping can then be retrieved from the security analysis process 2003 rather than directly from the data stores in the network.

Returning to FIG. 15, at step 1503 one or more transformations associated with the applicable protection mechanism are determined. Each protection mechanism can have one or more associated transformations that correspond to the changes in data or metadata (corresponding to one or more data stores) that would occur if the protection mechanism were applied to one or more data stores.

Figure 21:
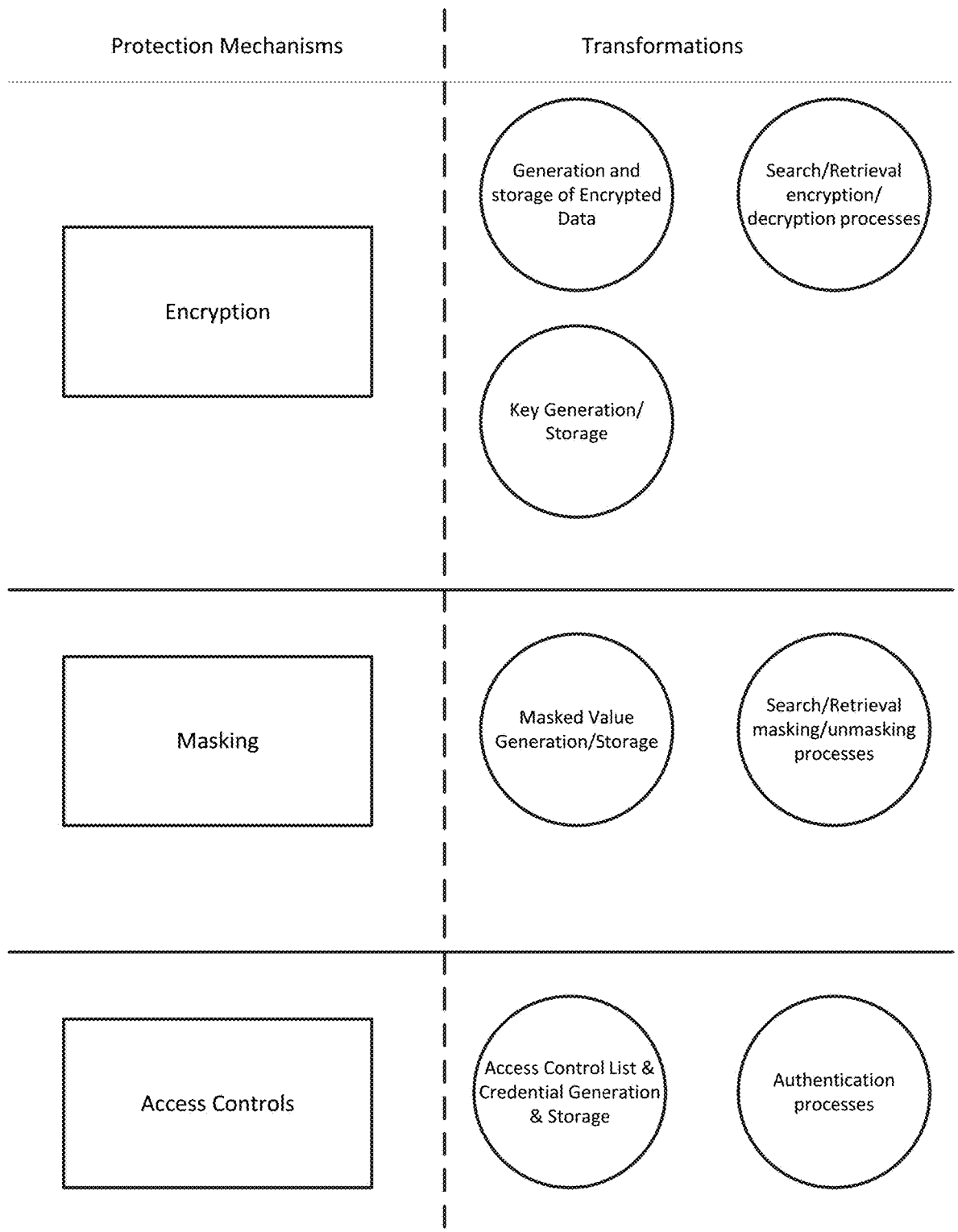
FIG. 21 illustrates a chart showing transformations associated with four different protection mechanisms.

For example, FIG. 21 illustrates a chart 2100 showing transformations associated with four different protection mechanisms. As shown in chart 2100, the masking protection mechanism has a transformation associated with masked value generation and/or storage and another transformation associated with the search/retrieval masking and unmasking processes. Each of these transformations indicate changes in the data or metadata of a data store that would occur if the protection mechanism were applied. For example, the encryption protection mechanism has a transformation corresponding to generation and storage of encrypted data. This transformation can define, for example, the change in storage size (either in absolute value or percentage terms) of a single record in a single field when a certain type of encryption is applied to the record. The transformation can also define, for example, the computational cost (in terms of processing resources, time, energy, etc.) of generating the encrypted record from the single record. Similarly, the access controls protection mechanism includes an authentication processes transformation. This transformation can define, for example, the cost (either computational, time, or other type of cost) of requiring authentication in order to access particular sensitive field.

The transformations corresponding to each protection mechanism can define transformations that, if applied to data or metadata corresponding to a data store or multiple data stores, will transform the data or metadata to reflect how the data in the data store or multiple data stores would look if the protection mechanism were applied. This can include, for example, changes to risk metrics that would occur if the protection mechanism were applied (such as reduced vulnerability, risk score), changes to computational costs or other costs (such as processor usage, storage space, data protection cost, etc.).

Referring to FIG. 20, the encryption protection mechanism includes multiple associated transformations. These transformations indicate changes to the data or metadata corresponding to a data store that would occur if encryption were applied to that data store. For example, encryption would require additional storage to hold encrypted data, so metadata corresponding to a storage size of all sensitive fields would be transformed to indicate a larger size that reflects the impact of encryption. Similarly, searching encrypted data can require a decryption process, so a corresponding transformation could modify the data access times associated with sensitive fields in a particular data store. Many variations are possible and these examples are not intended to be limiting.

Referring to FIG. 15, at step 1504 at least a portion of the metadata associated with the one or more corresponding data stores for a grouping is modified based at least in part on the one or more transformations. This step can also include checking constraints corresponding to each grouping in order to ensure that the selected mechanism can be implemented on the data stores of a particular grouping and in order to assess how the constraint affects the application of the protection mechanism to the data stores of the grouping. For example, the data stores in a particular grouping can have a constraint of limited storage space. If the protection mechanism is encryption, then the encrypted size of the sensitive fields would need to be checked to make sure that it does not cause the data stores to exceed the limited storage space. If so, then a determination can be made that a particular protection mechanism cannot be utilized on a data store or data stores of the grouping.

Figure 22:
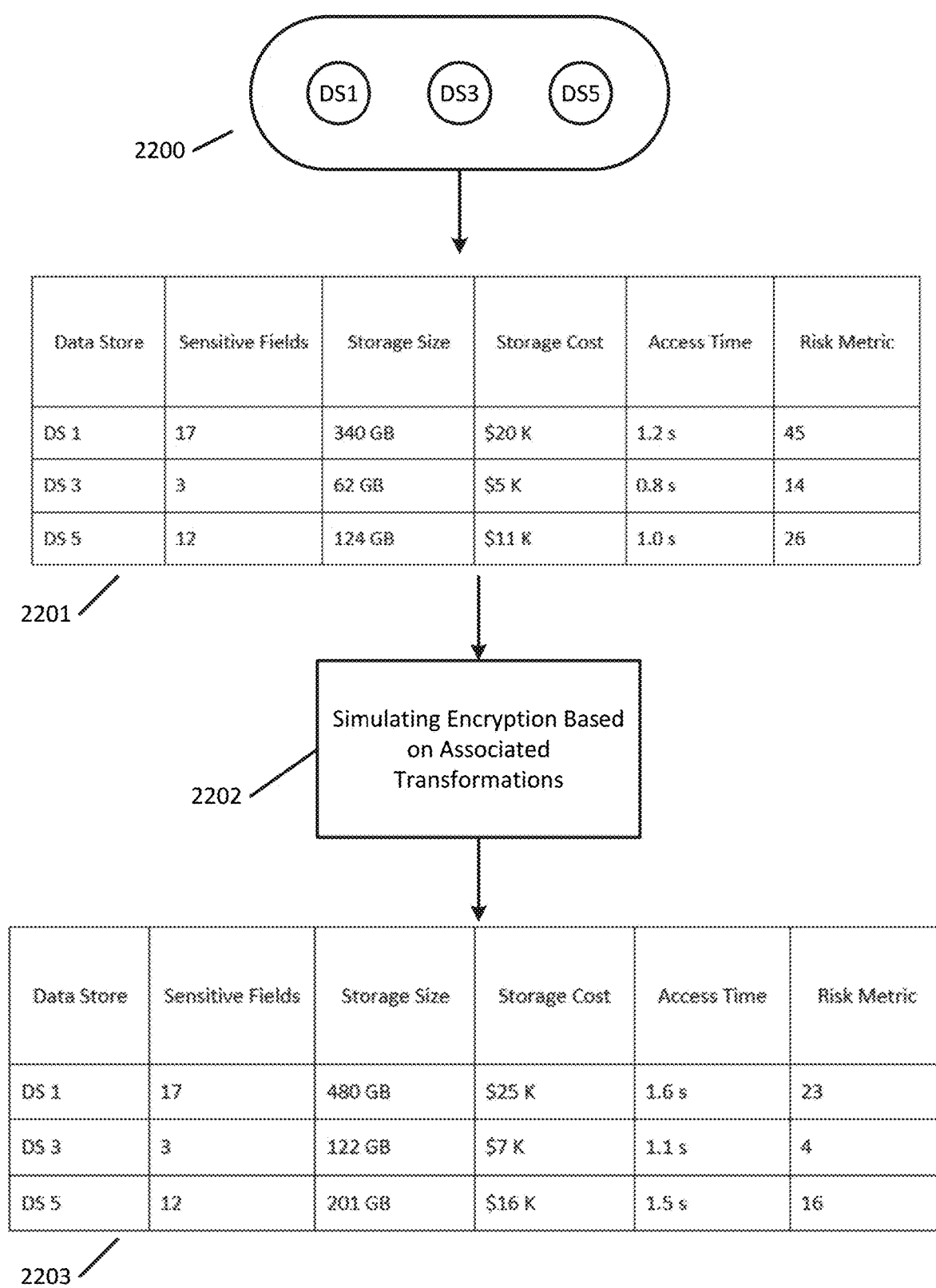
FIG. 22 illustrates an example of simulating application of a protection mechanism to a grouping according to an exemplary embodiment.

FIG. 22 illustrates an example of simulating application of a protection mechanism to a grouping according to an exemplary embodiment. Grouping 2200 includes data stores DS1, DS3, and DS5. Table 2201 illustrates the metadata corresponding to the grouping 2200. As shown in table 2201, metadata corresponding to each data store in the grouping 2200 can be tracked. This includes, for example, the number of sensitive fields, the storage size of the sensitive fields, the storage cost, the access time (which can be an average access time required to access records in the sensitive fields), etc.

Table 2201 also includes a risk metric, which is determined based upon the data or metadata for each store. The risk metric can be an aggregate risk metric, such as an overall risk score, or one or more of the risk metrics discussed previously.

All of this metadata can be determined dynamically based upon analysis of the data stores, or can be retrieved either from the data stores themselves (if they are configured to track this information) or from a risk monitoring system that tracks and/or interfaces with the data stores on the network.

At step 2202 the protection mechanism of encryption is simulated on the data stores of grouping 2200. As discussed, this is performed by applying one or more transformations corresponding to the encryption protection mechanism to the data or metadata corresponding to the data stores in the grouping. The application of the transformations to each data store can be based upon the characteristics, constraints, metadata, or other attributes of the data store. For example, if data of certain type on a first data store can be stored in masked form more easily than data of a different type on a second data store, then the application of a transformation corresponding to a masking protection mechanism would result in different results depending on whether the transformation was applied to the first data store or the second data store. The characteristics, constraints, metadata, or other attributes of the data store can be retrieved directly from the data stores or from other monitoring or risk assessment applications, as discussed earlier.

Table 2203 illustrates the transformed/modified metadata corresponding to the data stores in grouping 2200 after the transformations associated with the encryption protection mechanism have been applied. As shown in table 2203, the transformations result in increased storage size, storage cost, and access time. These modified values of metadata are generated by applying the appropriate transformations to the original metadata to, in effect, simulate the application of the protection mechanism to the data stores of a grouping.

Returning to FIG. 15, at step 1505 the at least one simulated value of the at least one risk metric for the grouping is determined based at least in part on the modified metadata. This can include determining simulated values of risk metrics for each data store in the grouping.

For example, table 2203 illustrates the simulated values of risk metrics for data stores DS1, DS3, and DS5 based upon the modified metadata generated by applying transformations corresponding to the encryption protection mechanism. In the case of risk metrics that rely on other data or metadata (such as number of unprotected fields), the simulated risk metrics can be determined by applying transformations to the other data or underlying metadata (such as by reducing the number of unprotected fields if protection is to be applied to some fields) and then recalculating the risk metric for the modified data or metadata using the simulated metadata. This allows for the determination of a simulated risk metric that reflects the risk after the application of a protection mechanism to data in the data stores of a particular grouping has been simulated.

Returning to FIG. 2, at step 205, the plurality of groupings are ranked based at least in part on the at least one simulated value of the at least one risk metric for each grouping. For example, the grouping with the lowest simulated value of the at least one risk metric can be ranked first, with groupings having progressively higher simulated values of the at least one risk metric can be ranked in descending order.

The groupings can also be ranked based at least in part on the one or more constraints corresponding to each grouping and/or the at least one current value of the at least one risk metric for each grouping. For example, the constraints can be used to filter out groupings that contain data stores that are incompatible with a selected protection mechanism. Additionally, the current values of the at least one risk metric can be used to compute a net change in value (delta) of the at least one risk metric for each grouping and this delta value can then be used to rank the groupings. This allows users to identify the application of the protection mechanism having the greatest impact.

Of course, in addition to values of risk metrics, groupings can be ranked according to a number of criteria. For example, groupings can also be ranked based upon a user's interaction history, which can be interpreted as a preference. In this case, the system can store a preference matrix used to rank groupings based upon a user's previous selections.

As discussed earlier, groupings can be based upon one or more of stores, domains, policies (or any other architectural or conceptual attributes). The system and method disclosed herein can therefore use one or more risk metrics to measure the impact of applying a protection to a grouping based on a variety of possible groupings, such as a store-based grouping, a domain-based grouping, and/or a policy based grouping.

The example processes below illustrate how various risk metrics (either current or simulated) can be computed when using policy-based groupings and used to rank the groupings.

Ranking Groupings by Protection Status
For Each Grouping:
(1) Retrieve the fields contained in this grouping;
(2) Count the number of unprotected fields;

$$\text{The protection status of this grouping} = \frac{\text{\# unprotected fields}}{\text{\#total fields}}. \quad (3)$$

Ranking Groupings by Data Risk Cost
For Each Grouping:
(1) Retrieve the data stores that contain fields contained in this grouping;
(2) For each table in the data store;
  (A) Retrieve the governing policy with the highest cost per row value;
  (B) The data risk cost of this table=highest cost per row*(#rows in table);
(3) The data risk cost of each data store=Σ(data risk cost of table i in the store);

(4) The data risk cost of this grouping=Σ(data risk cost of the data stores).

Ranking Groupings by Protection Expense
For Each Grouping:
(1) Retrieve the data stores that contain fields contained in this grouping;
(2) Retrieve the expense per row value for the data store and the protection technique;
  (A) For each table in the data store;
  (B) The protection expense of this table=expense per row*(#rows in table);
(3) The protection expense of each data store=Σ(protection expense of table i in the store);
(4) The protection expense of this grouping=Σ(protection expense of the data stores).

Ranking Groupings by Risk Score
For policies, the risk score can be computed for each policy in each data store, and then aggregated across data stores as follows:
For Each Policy:
(1) Retrieve the data stores that contain fields governed by this policy;
(2) For each store found;
  (A) Compute risk score for this policy in this data store;
(3) Aggregate risk scores of data stores to get the risk score for this policy.
Policies can then be ranked based on the per-policy risk scores computed.

For Groupings Other than Policy
For Each Grouping:
(1) Retrieve the fields contained in this grouping and the data stores where the fields reside;
(2) Determine the risk factor value accordingly;
(3) Aggregate the risk factor value by the given function to get the risk score for this grouping.

Figure 23:
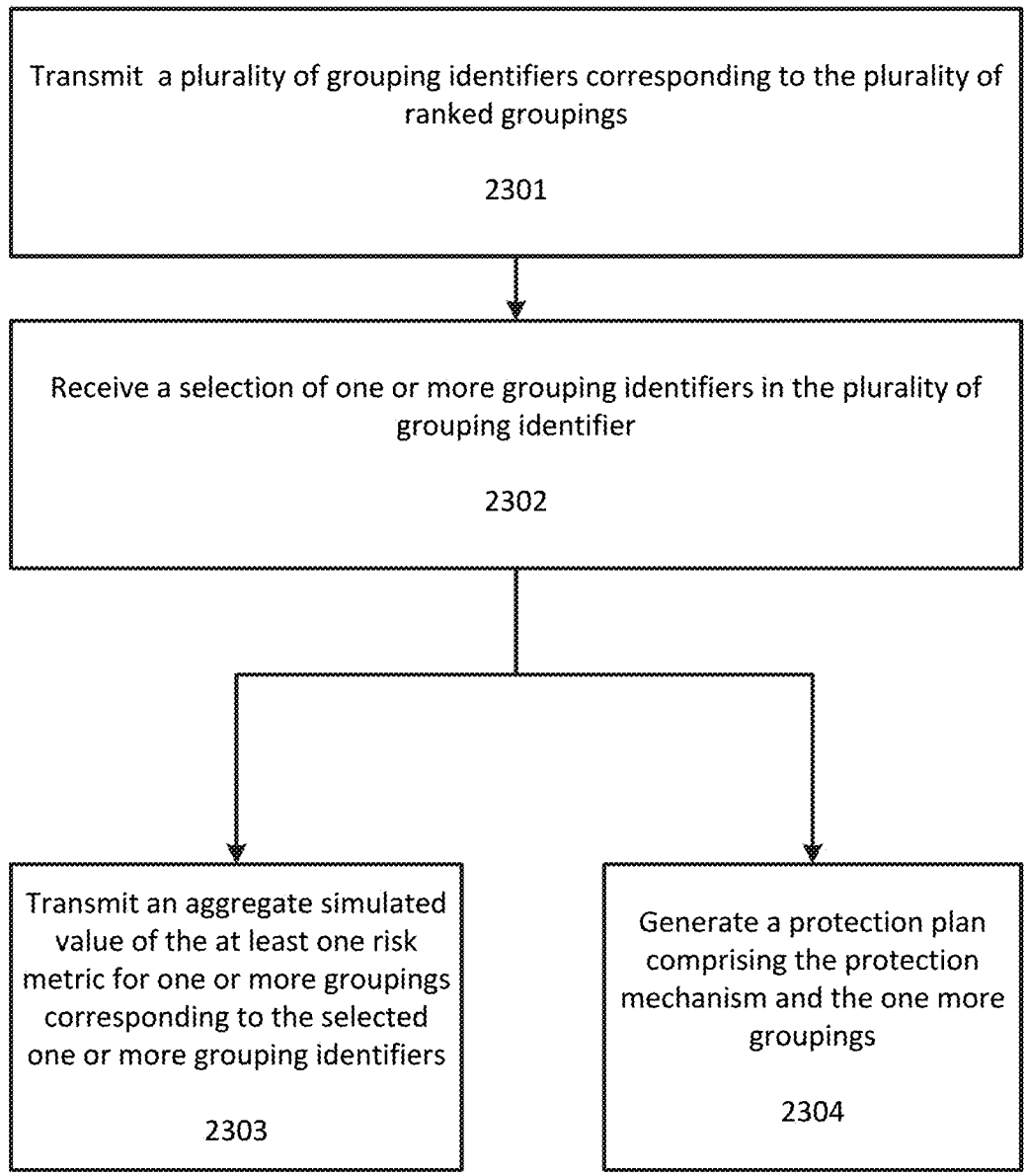
FIG. 23 illustrates a flowchart for processing the ranked groupings according to an exemplary embodiment.

Once the groupings have been ranked, the results can be transmitted to the user for further processing based on user inputs. FIG. 23 illustrates a flowchart for processing the ranked groupings according to an exemplary embodiment.

At step 2301 a plurality of grouping identifiers corresponding to the plurality of ranked groupings are transmitted. The grouping identifiers can be transmitted to a user in a user interface, as will be discussed below, and can be presented within the interface based upon the determined rankings.

This step can include identifying a set of groupings in the plurality of ranked grouping that have at least one simulated value of at least risk metric that falls within a risk threshold set by a value specified in the risk reduction goal. The risk threshold is determined based on the value specified in the risk reduction goal. For example, if the risk metric is "risk score" and the value is "20," then the risk threshold would be any risk scores that are less than or equal to 20. This step can then include transmitting a set grouping identifiers corresponding to the set of groupings, wherein the set of grouping identifiers are ordered according to a ranking of the set of groupings in the plurality of ranked groupings.

At step 2302 a selection of one or more grouping identifiers in the plurality of grouping identifiers can be received. This selection can be received based upon a user input, such by a user clicking on the grouping identifier in a user interface or otherwise selecting the one or more grouping identifiers.

At step 2303 an aggregate simulated value of the at least one risk metric for one or more groupings corresponding to the selected one or more grouping identifiers is transmitted. This aggregate value can indicate the simulated risk metric for all of the users selections.

Additionally, at step 2304 a protection plan is generated comprising the previously determined protection mechanism (or multiple protection mechanisms) and the one more groupings. The protection plan can be transmitted to a workflow management system that is configured to assign one or more tasks to one or more users based at least in part on the protection plan. For example, the workflow management system can implement a division of labor for the protection of the different groupings. This can include creating a task per grouping and assigning the task to the relevant stakeholders or data owners.

Figure 24A:
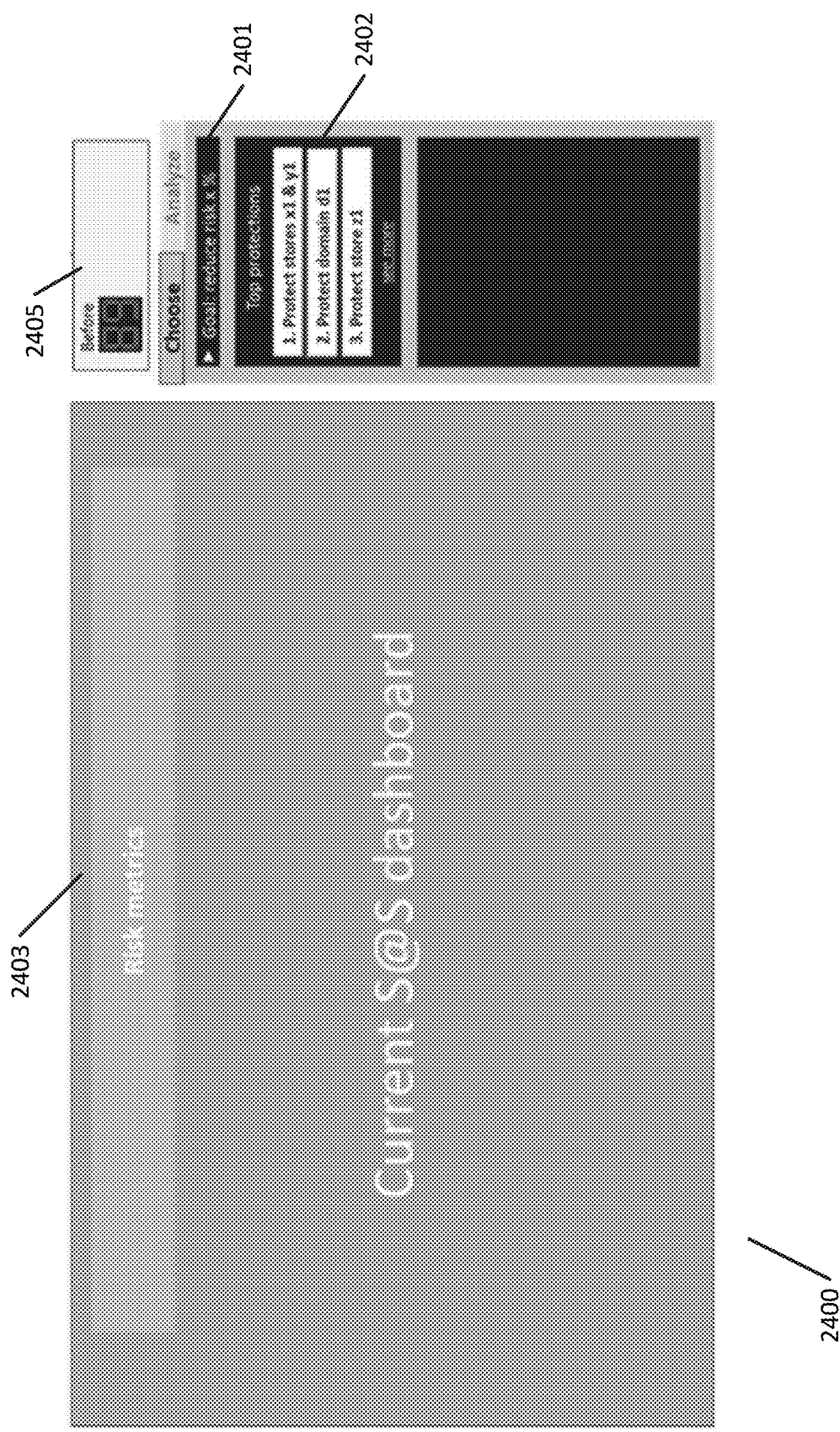
FIGS. 24A-24D illustrate a user interface for data protection optimization in a computer network according to an exemplary embodiment.
Figure 24B:
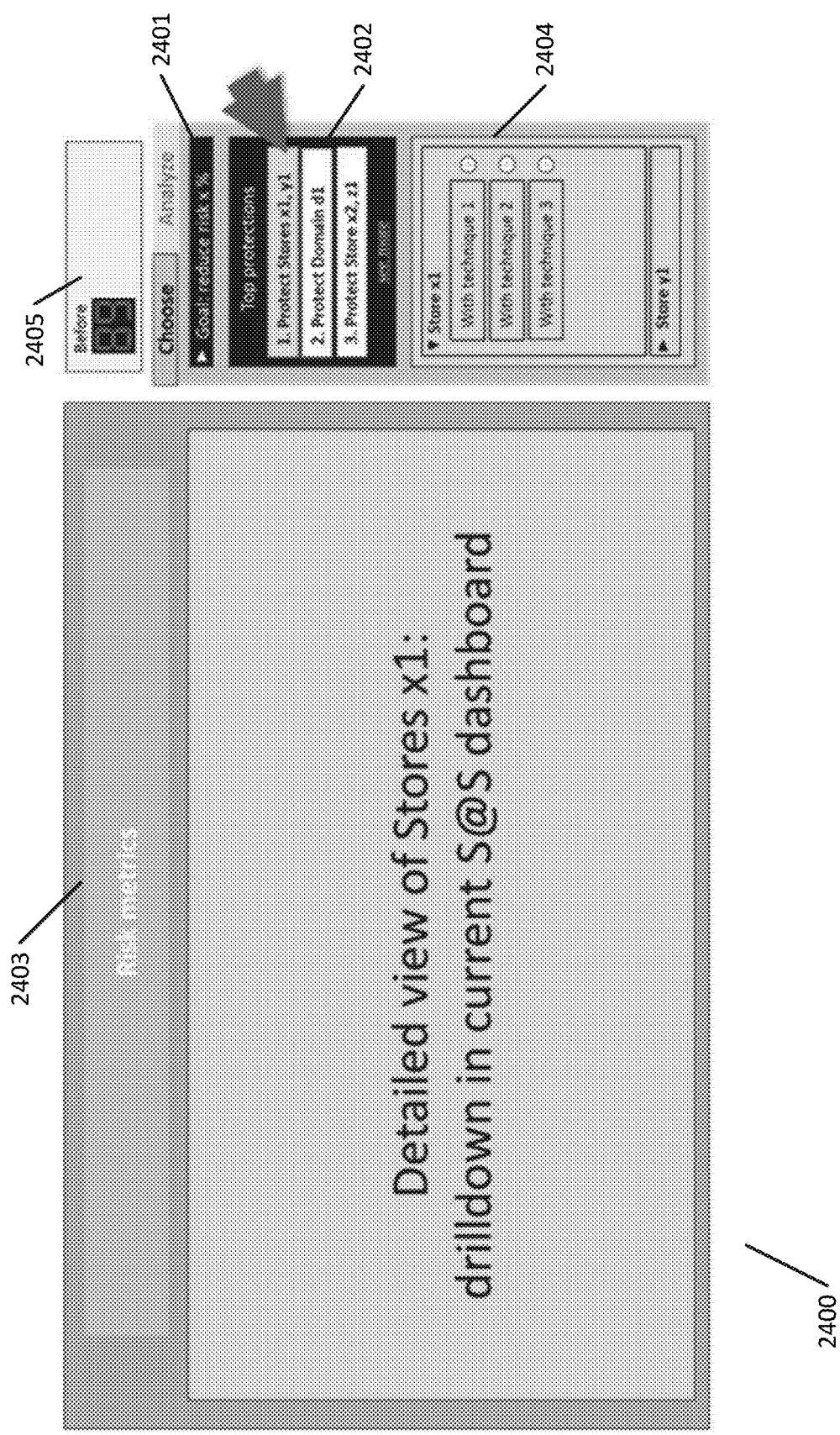
Figure 24C:
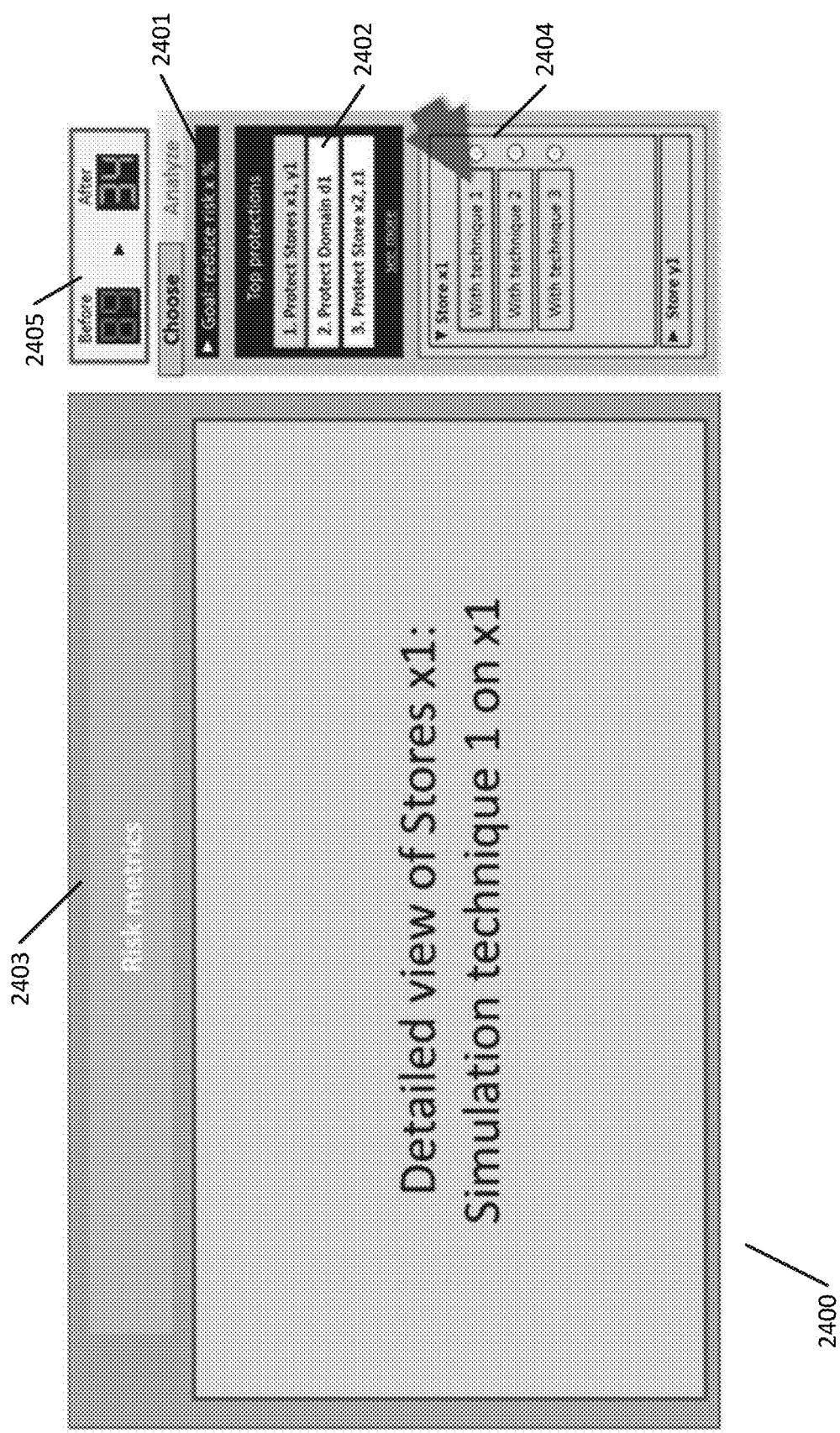

FIGS. 24A-24C illustrate a user interface for data protection optimization in a computer network according to an exemplary embodiment. For clarity, many of the described user interfaces illustrate the display and selection of groupings for protection and assume the application of a default protection mechanism (either universally or to each grouping). It is understood that the protection mechanism can be selected by the user or determined using of the techniques described herein.

As shown in FIG. 24A, interface 2400 includes goal selection interface 2401 that allows a user to select or input a particular goal. Interface 2400 also includes recommended groupings interface 2402 that displays the top ranked groupings (referred to as "top protections") based upon the selected goal (reduce risk %). One or more current risk metrics (either grouping specific or enterprise wide) can also be displayed in risk metric interface 2405. Additionally, interface 2400 can incorporate a risk management or tracking dashboard 2403 (such as Secure@Source) that tracks and displays existing risk metrics for data stores across the network.

Figure 24D:
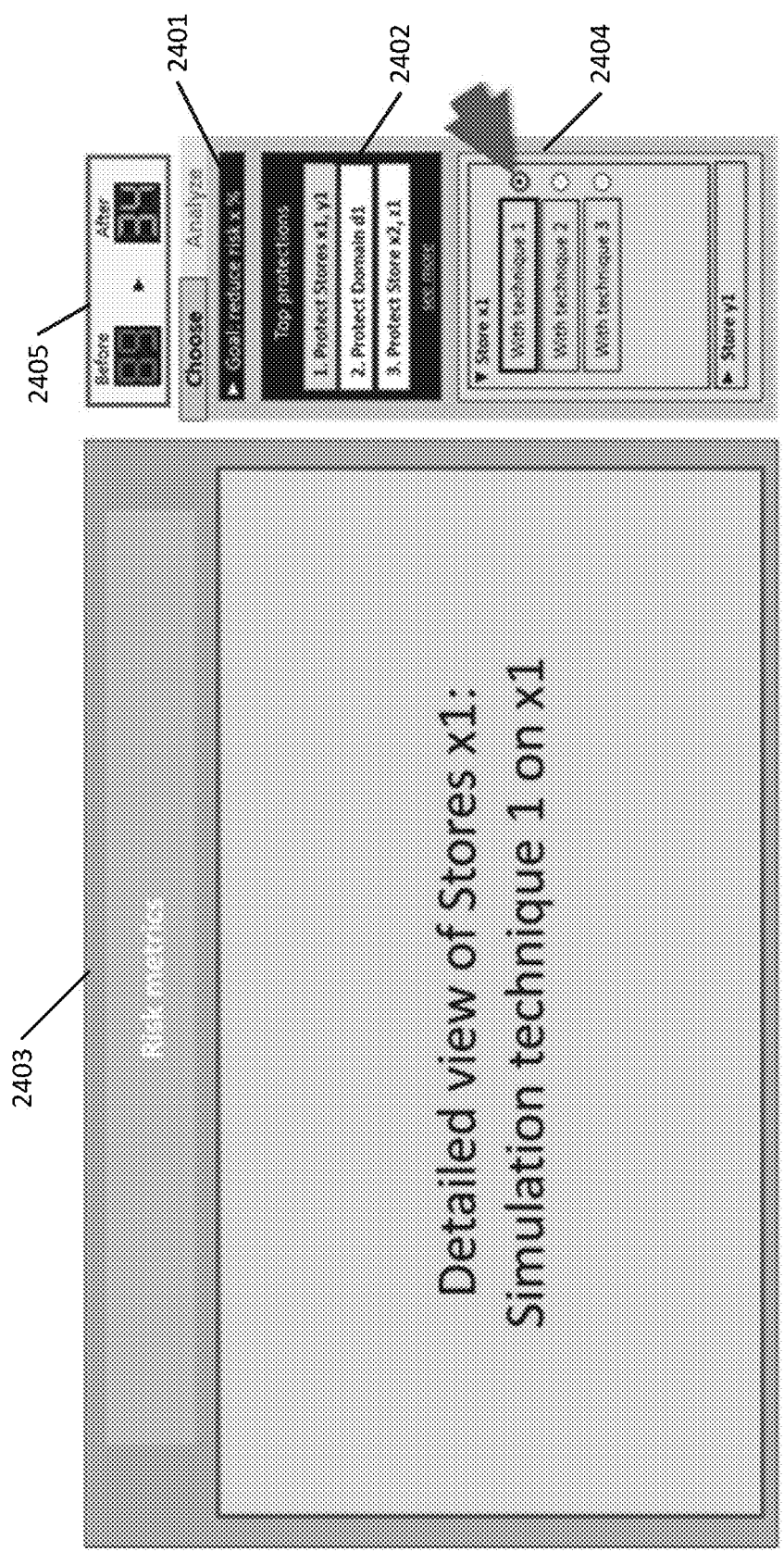

FIG. 24B illustrates the interface 2400 after the user has selected a grouping in the recommended groupings interface 2402. As shown, the user has selected the grouping of data stores x1 and y1, resulting in the display of information about this grouping being shown in dashboard 2403. This also results in the display of protection mechanism selection interface 2404 which displays possible protection mechanisms (referred to as "techniques") for protecting the selected grouping. A FIG. 24C illustrates the interface 2400 after preview of a protection mechanism ("technique 1") in the protection mechanism selection interface 2404. Preview can be initiated by selecting the text of a protection mechanism or hovering over a protection mechanism using the pointing device. As shown, this results in updating of the dashboard 2403 to show the simulation of technique 1 on store x1. Additionally, risk metric interface 2405 is updated to display at least one simulated value of the risk metric based on the selected groupings and protection mechanism. FIG. 24D illustrates the interface 2400 after the user has selected the protection mechanism "technique 1."

Figure 25A:
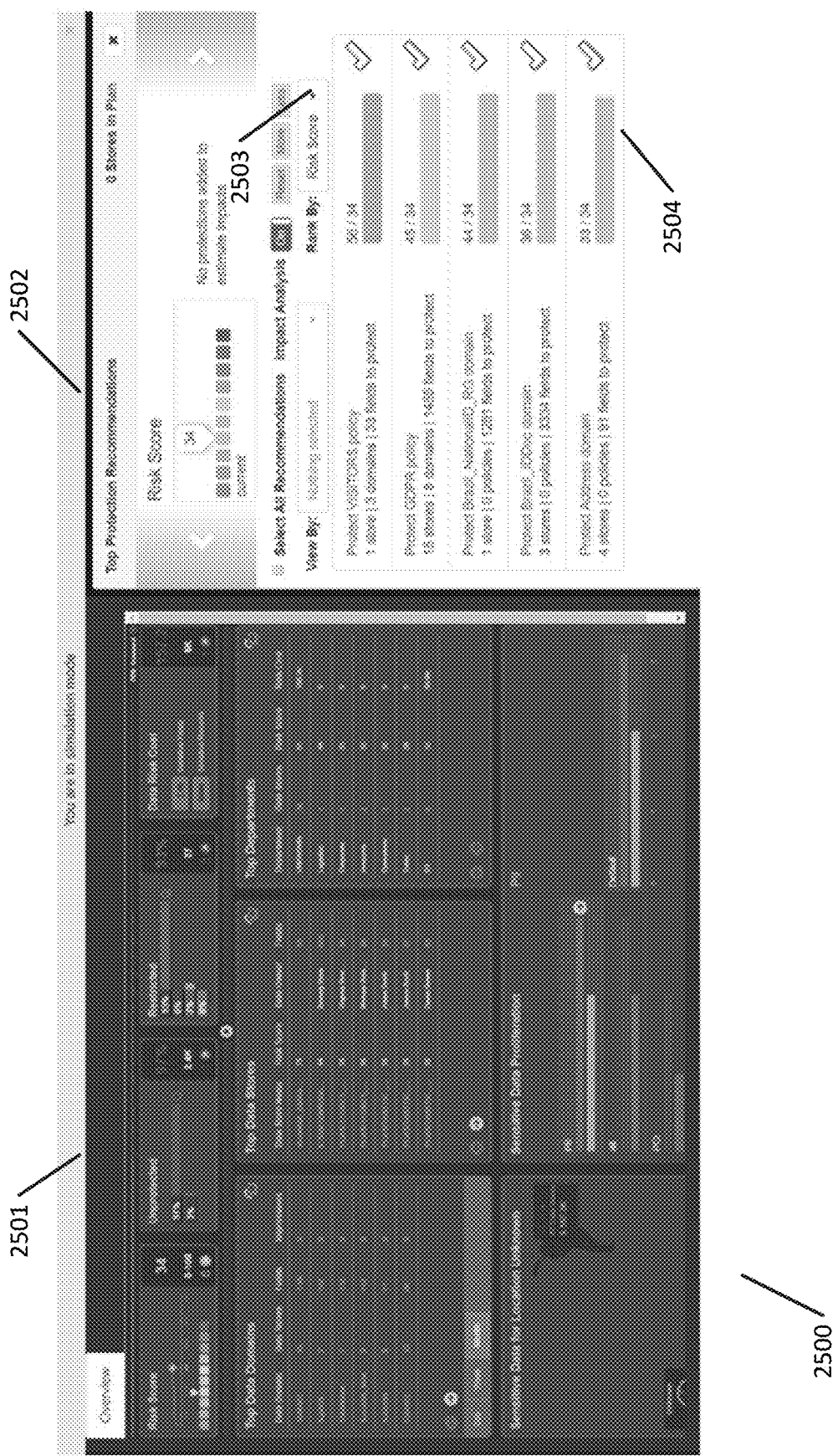
FIGS. 25A-25B illustrate another user interface for data protection optimization in a computer network according to an exemplary embodiment.
Figure 25B:
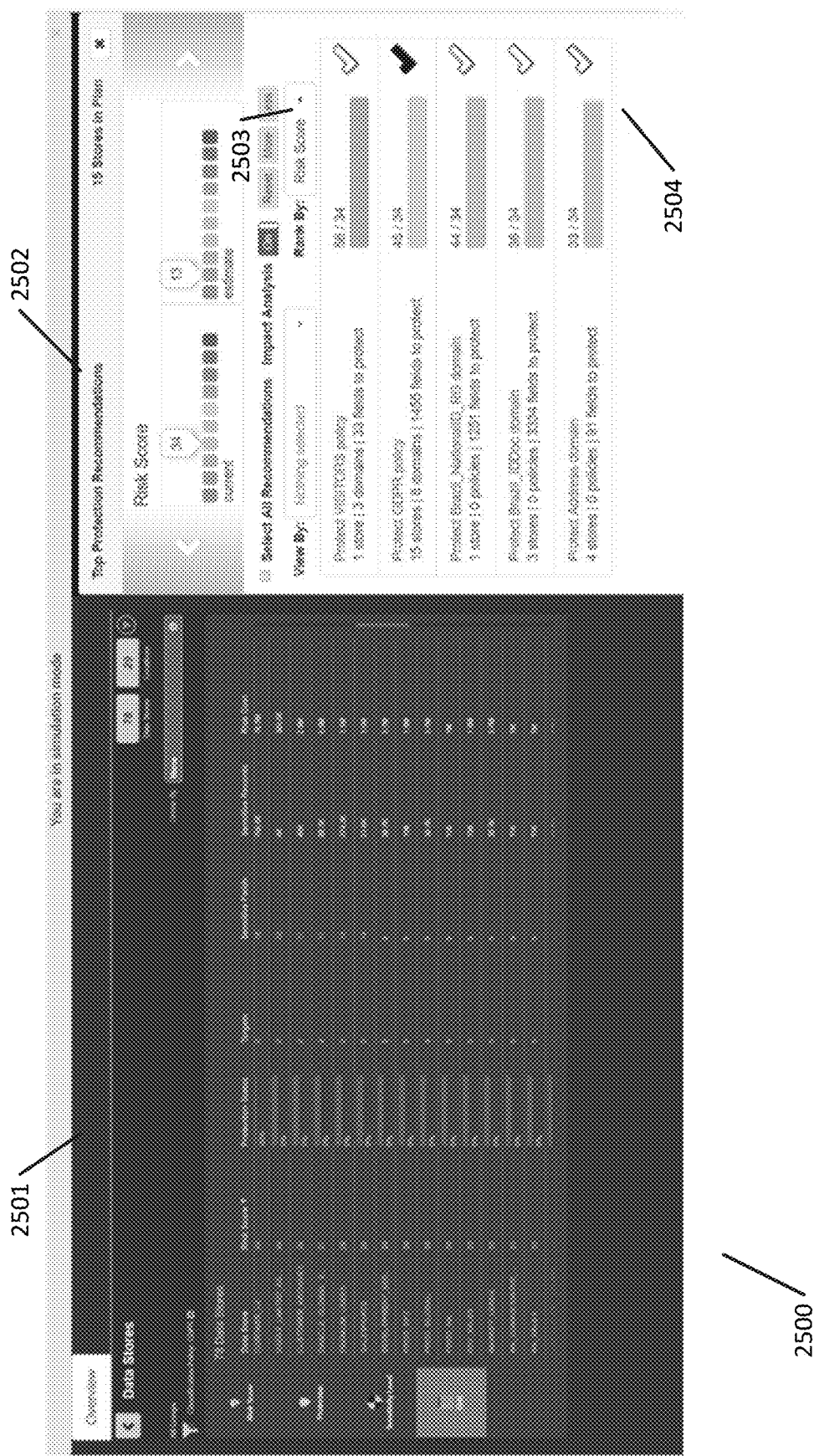

FIGS. 25A-25B illustrate another user interface for data protection optimization in a computer network according to an exemplary embodiment. Interface 2500 in FIG. 25A includes a dashboard 2501 displaying information about the network of data stores, such as various risk metrics, top data stores, top departments, top data domains, sensitive data proliferation, and other aggregated network information.

Interface 2500 also include a protection interface 2502 listing the top-ranked groupings 2504 for protection. As shown in interface 2502, the groupings 2504 are ranked according to a risk score metric 2503, from highest risk score to lowest, and include domain-based groupings and policy-based groupings. Of course, groupings can be ranked according to any risk metric previously discussed. Each grouping also includes information about number of stores, applicable policies, and the number of fields to protect, as well as the Protection interface includes a current value of a risk metric, which can be across the entire database or network of data stores.

FIG. 25B illustrates the interface 2500 after the user has selected grouping "Protect GDPR Policy" in the ranked list of groupings 2504. As shown in the figure, this results in the dashboard 2501 updating to display information about the selected grouping, including a listing of data stores in the grouping and corresponding risk metrics.

Figure 26:
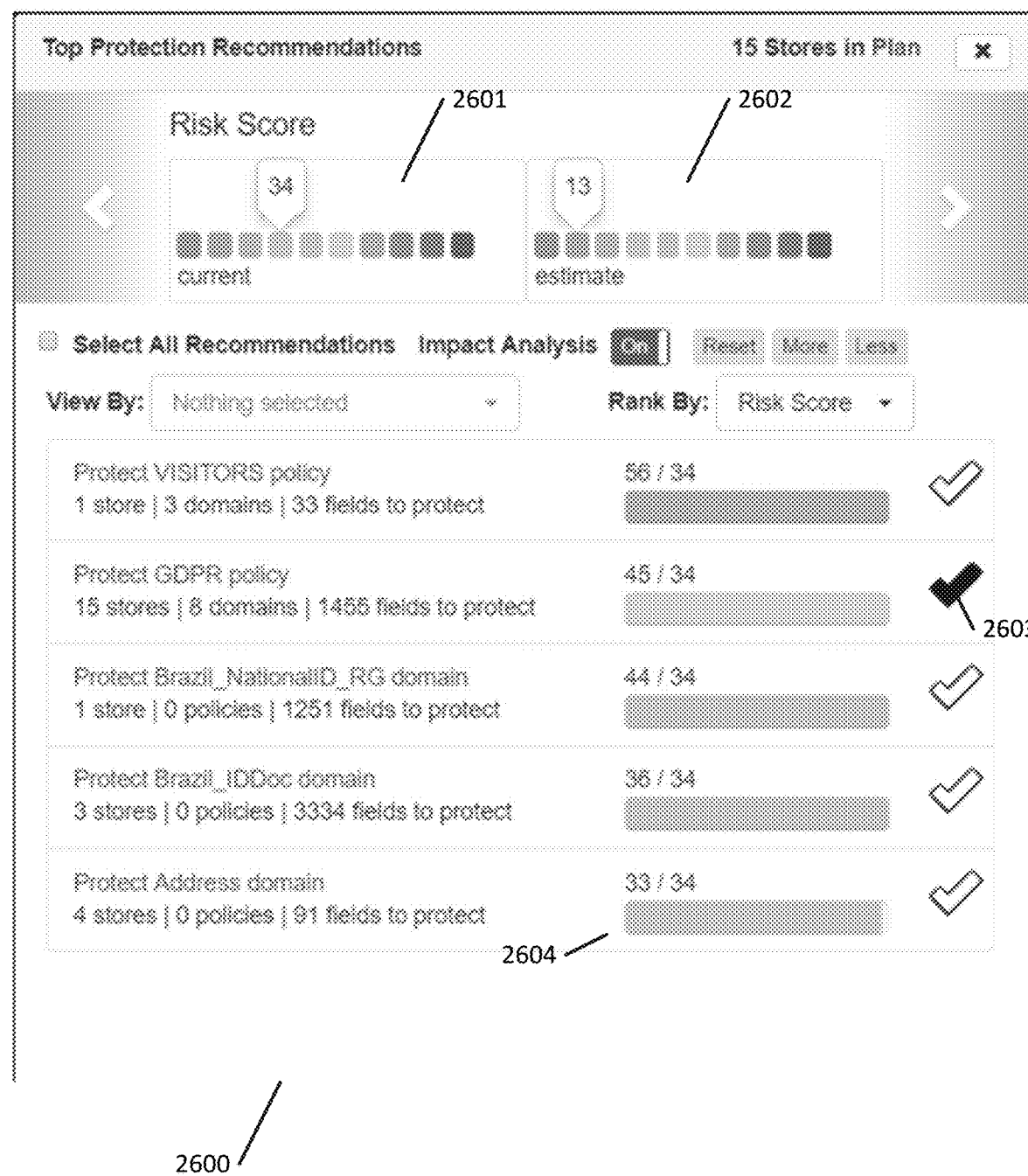
FIG. 26 illustrates a protection recommender interface according to an exemplary embodiment.

FIG. 26 illustrates a protection recommender interface according to an exemplary embodiment. Protection recommender interface 2600 is similar to protection interface 2502 in FIGS. 25A-25B. Recommender interface 2600 includes a current risk metric value 2601 (which can be a current risk metric across the enterprise or the current risk metric for a selected grouping) and a simulated value of the risk metric 2602 that is based on the selection 2603 of a grouping for protection in the ranked list of groupings 2604.

Figure 27A:
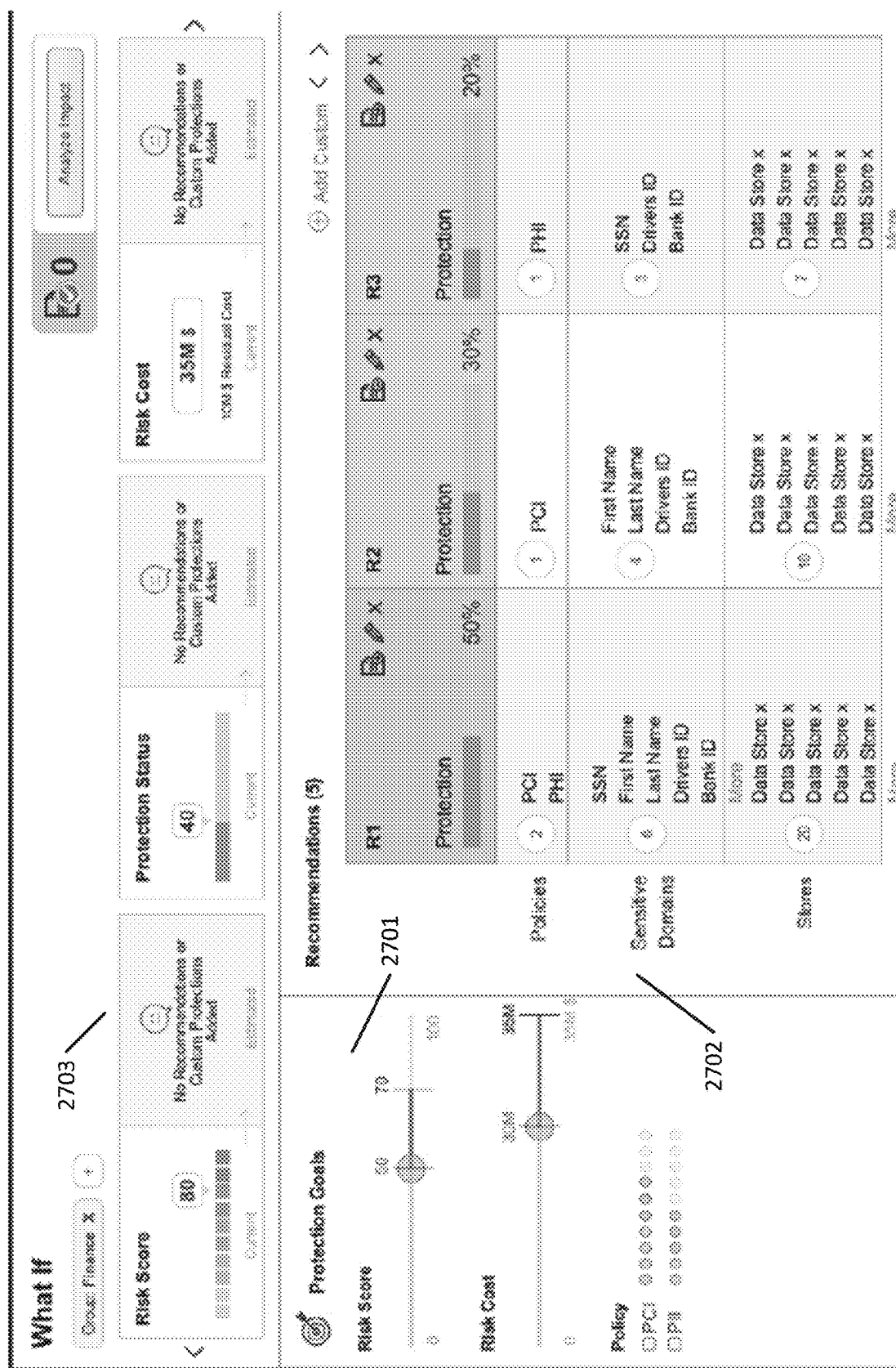
FIGS. 27A-27D illustrate another user interface for data protection optimization in a computer network according to an exemplary embodiment.

FIGS. 27A-27D illustrate another user interface for data protection optimization in a computer network according to an exemplary embodiment. As shown in FIG. 27A, interface 2700 includes a goal selection interface 2701 that allows users to specify goals as target values of risk metrics as well as policies for compliance. Interface 2700 also includes a top carousel interface 2703 showing current global (enterprise and network wide) risk metrics, as well as a recommendation interface 2702 listing recommended groupings for protections. Each recommendation appears as a column in recommendation interface. Additionally users can view additional metrics in carousel interface 2703 by clicking left or right arrows or by otherwise scrolling left-to-right or right-to-left.

Figure 27B:
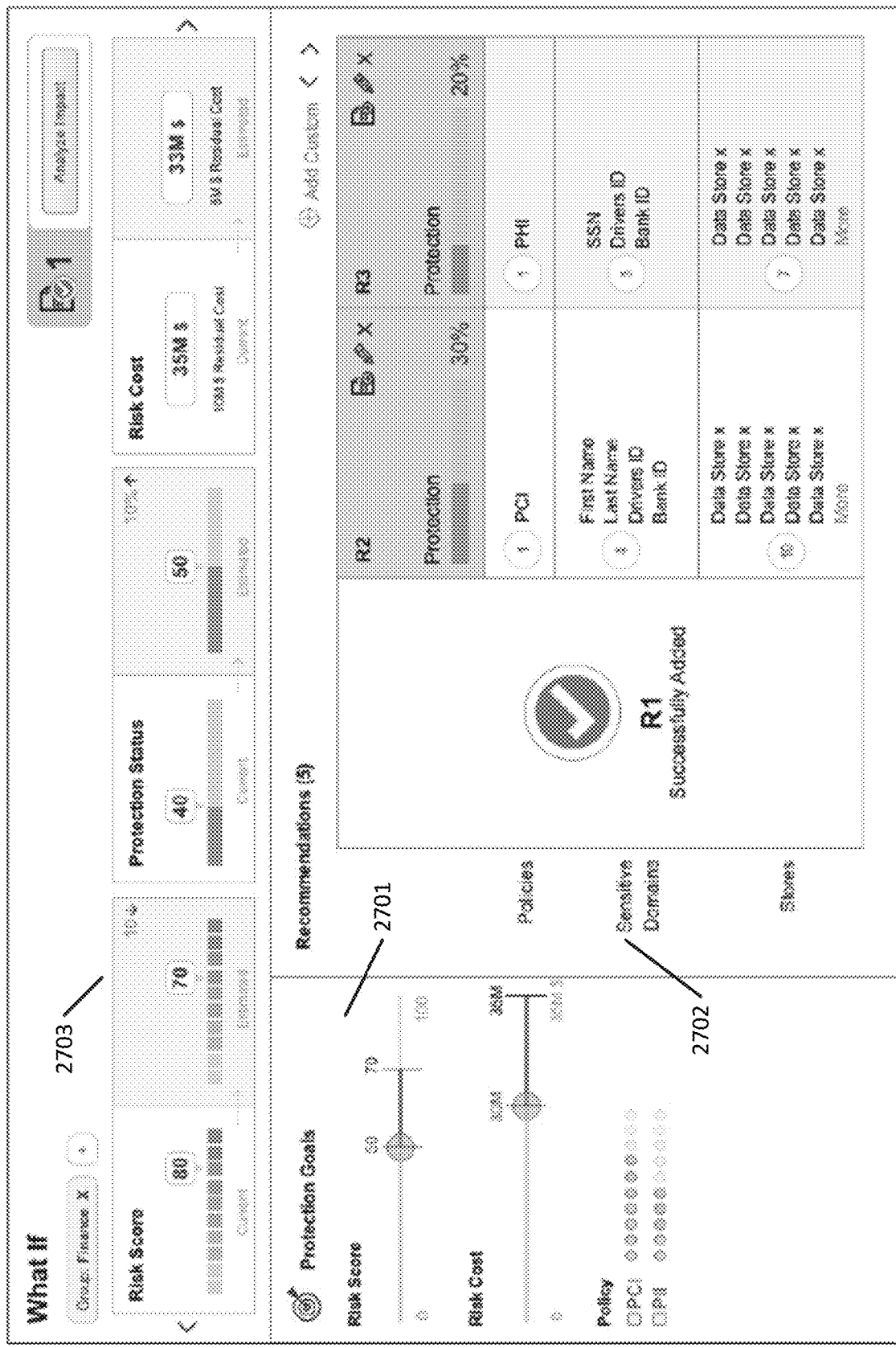

FIG. 27B illustrates the interface 2700 after user selection and acceptance, by a user, of recommendation R1 in recommendation interface 2702. The global metrics in carousel interface 2703 are updated to show new global simulated metrics in addition to current metrics, to allow a user to assess the impact that selection of recommended grouping R1 for protection would have on overall enterprise security. Additionally, goal selection interface 2701 can updated to illustrate how much selection of R1 contributes to the selected goal expressed in the goal selection interface 2701. As shown in top right corner of interface 2700, the selected recommendation can be added to a protection plan (indicating 1 recommendation is currently in the plan).

Figure 27C:
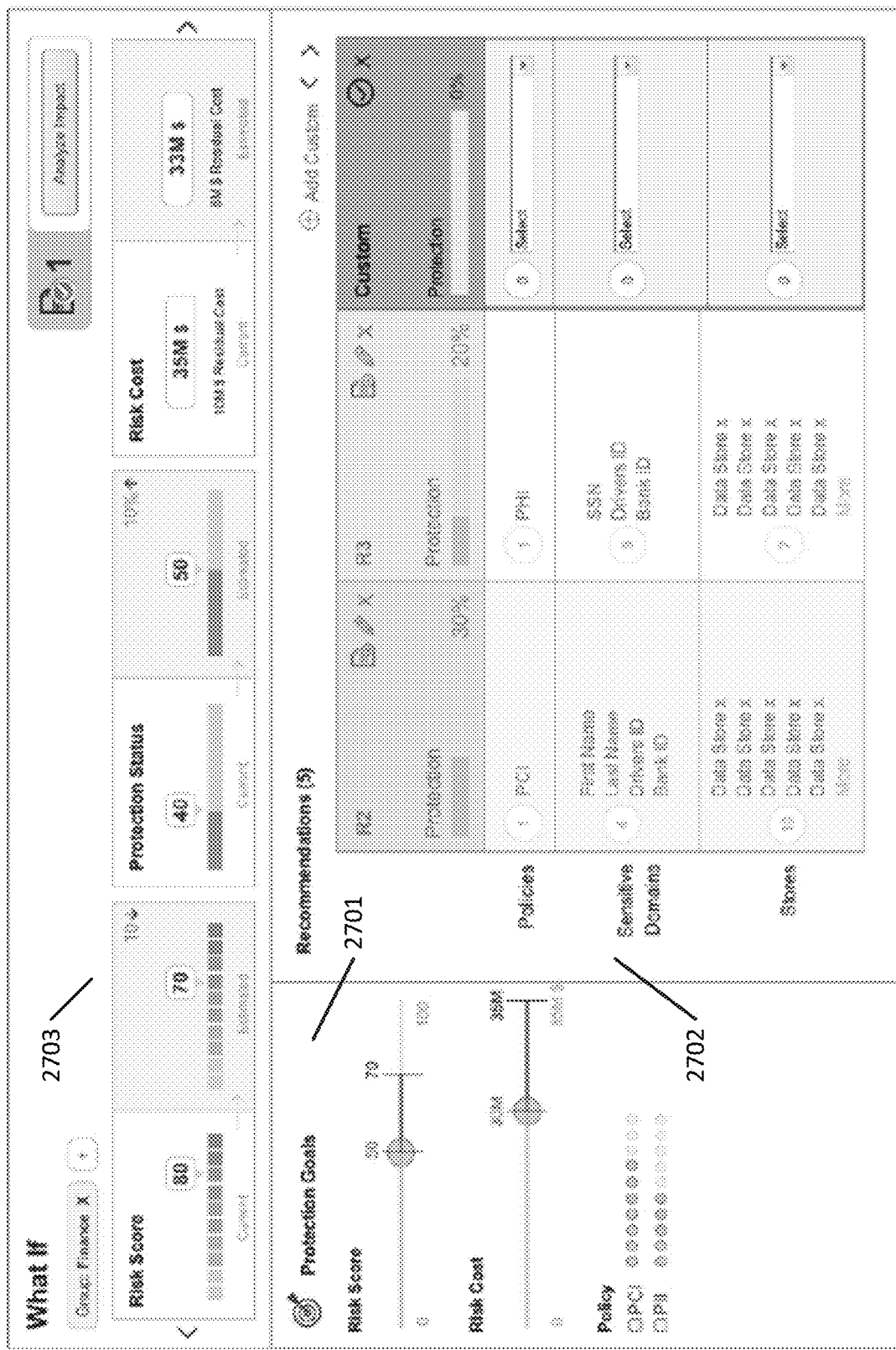

FIG. 27C illustrates interface 2700 after the user has selected a custom grouping for protection in recommendation interface 2702. The user can specify a custom protection action on the bottom right (in place of a recommendation) by selecting parameters such as policies, data domains, and stores of interest. In response, the system will display at the top carousel 2703 expected impact and on the goal selection interface 2701, how much this custom protection contributes to the selected goal.

Figure 27D:
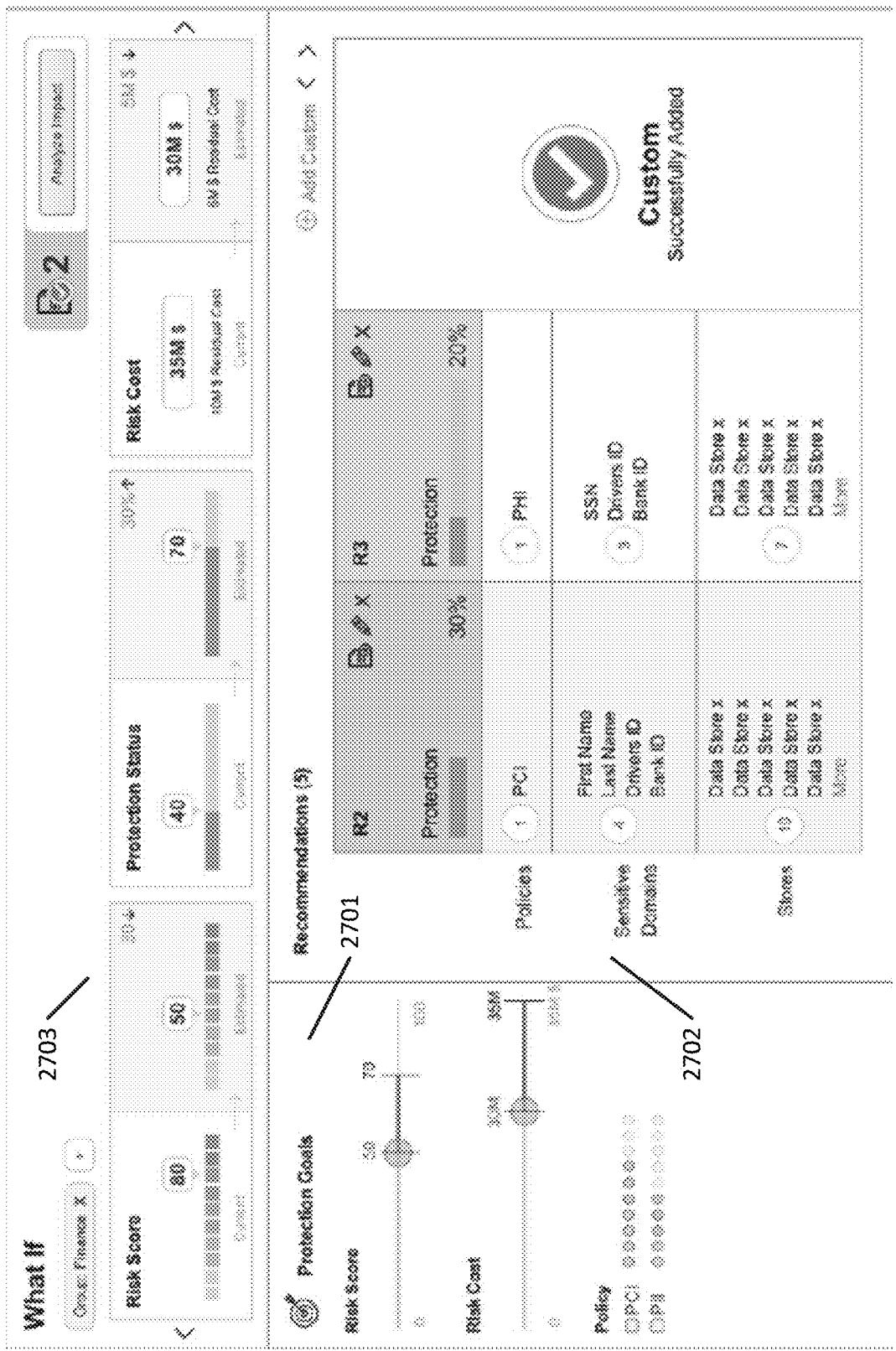

FIG. 27D illustrates the interface 2700 after the user has added the custom grouping to the protection plan. As shown in the top-right corner, protection plan now includes 2 groupings (protections) selected by the user. As shown in the figure, the user has accepted the custom protection action on the bottom right by selecting parameters such as policies, data domains, and stores of interested. The user has then selected the checkbox at the top, in FIG. 27C to "Add to Protection Plan." As a result, the simulated metrics at the top are updated to display the simulated values for the total of two actions (groupings for protection) added to the plan. The user can click on the "Analyze Impact" button at the top tight to move to an impact analysis section interface of the system.

Figure 28:
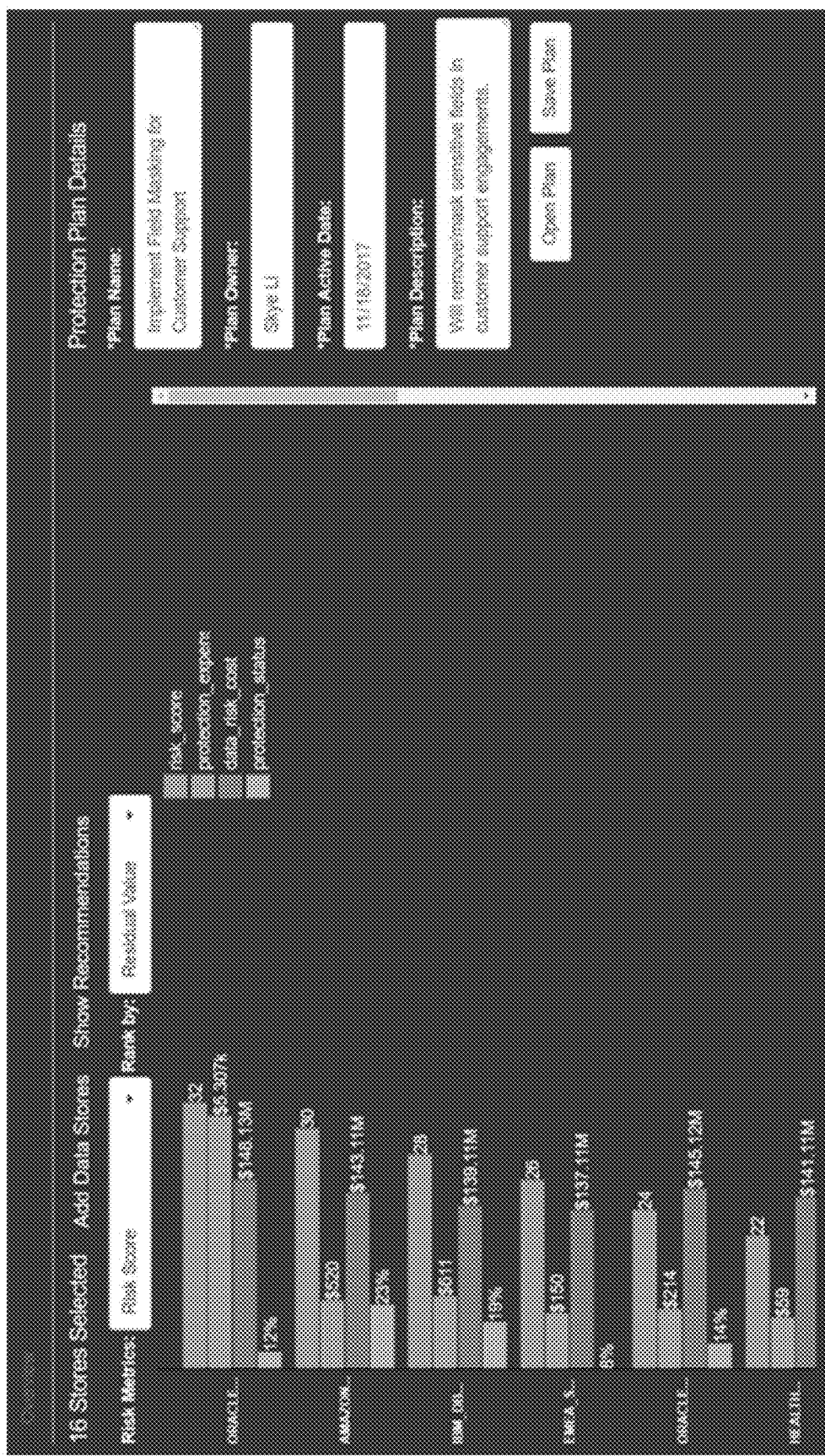
FIG. 28 illustrates an impact analysis interface according to an exemplary embodiment.

FIG. 28 illustrates an impact analysis interface 2800 according to an exemplary embodiment. A shown in interface 2800, the impact of selecting certain groupings for protection is shown using multiple risk metrics across multiple data stores. In this case, the metrics are represented as a bar chart, where each bar is a data store to be protected. The horizontal bars of different color represent different metrics. Here the figure indicates the stores sorted by risk score. The user can save this set of stores as a Protection Plan after providing name, owner, active plan date, description, and clicking the Save Plan button.

Figure 29:
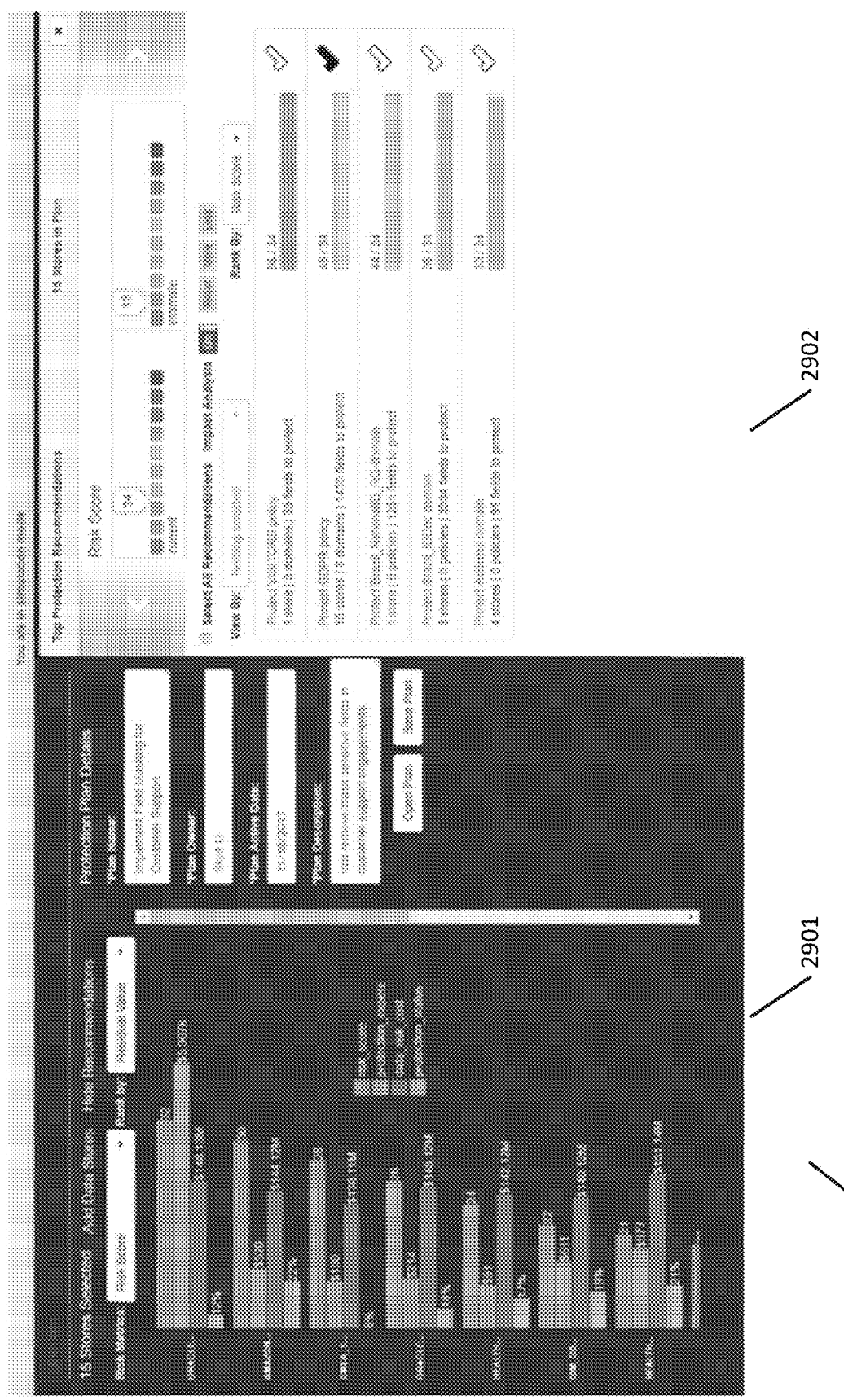
FIG. 29 illustrates an impact analysis and recommendation interface according to an exemplary embodiment.

FIG. 29 illustrates an impact analysis and recommendation interface 2900 according to an exemplary embodiment. The interface of 2900 of FIG. 29 is similar to previous interfaces, but illustrates the simultaneous use of the impact analysis interface 2901 and the protection recommender interface 2902. As user can open recommender interface 2902, for example, by interacting with the impact analysis interface 2901.

Figure 30A:
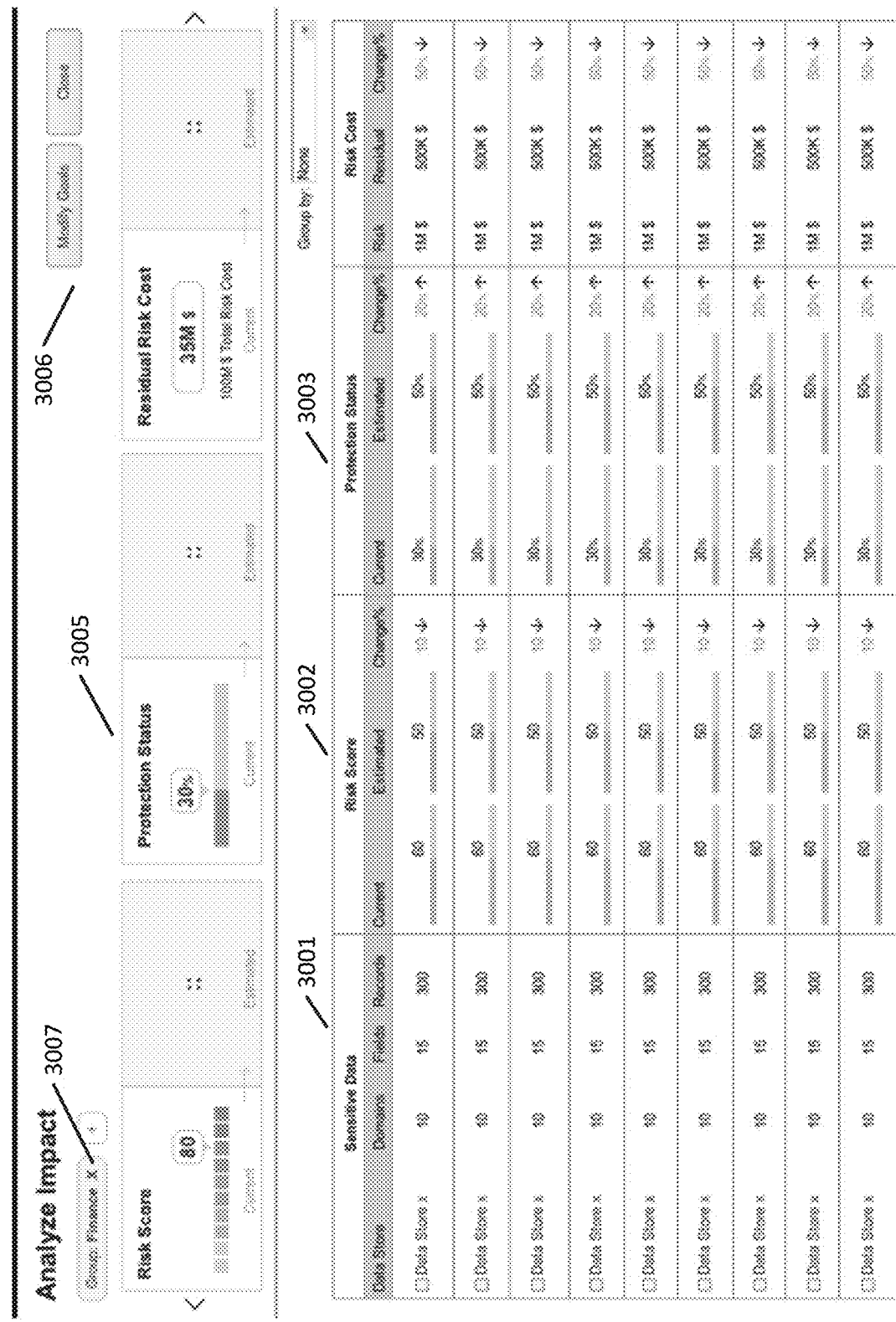
FIGS. 30A-30D illustrate another user interface for data protection optimization in a computer network according to an exemplary embodiment.

FIGS. 30A-30D illustrate another user interface for data protection optimization in a computer network according to an exemplary embodiment. As shown in FIG. 30A, interface 3000 also allows for impact analysis and includes filters 3007 to limit analysis to a particular department or group, selectable data stores 3001, and a listing of various data store risk metrics (both current and simulated) in each of the data stores, represented as columns 3002, 3003, and 3004. Interface also includes global risk metrics shown in carousel interface 3005, and goal selection button 3006. Interface 3000 allows a user to select specific stores for protection and view the impact of the protection on the risk metrics for those stores, as well as at the enterprise or network level.

Figure 30B:
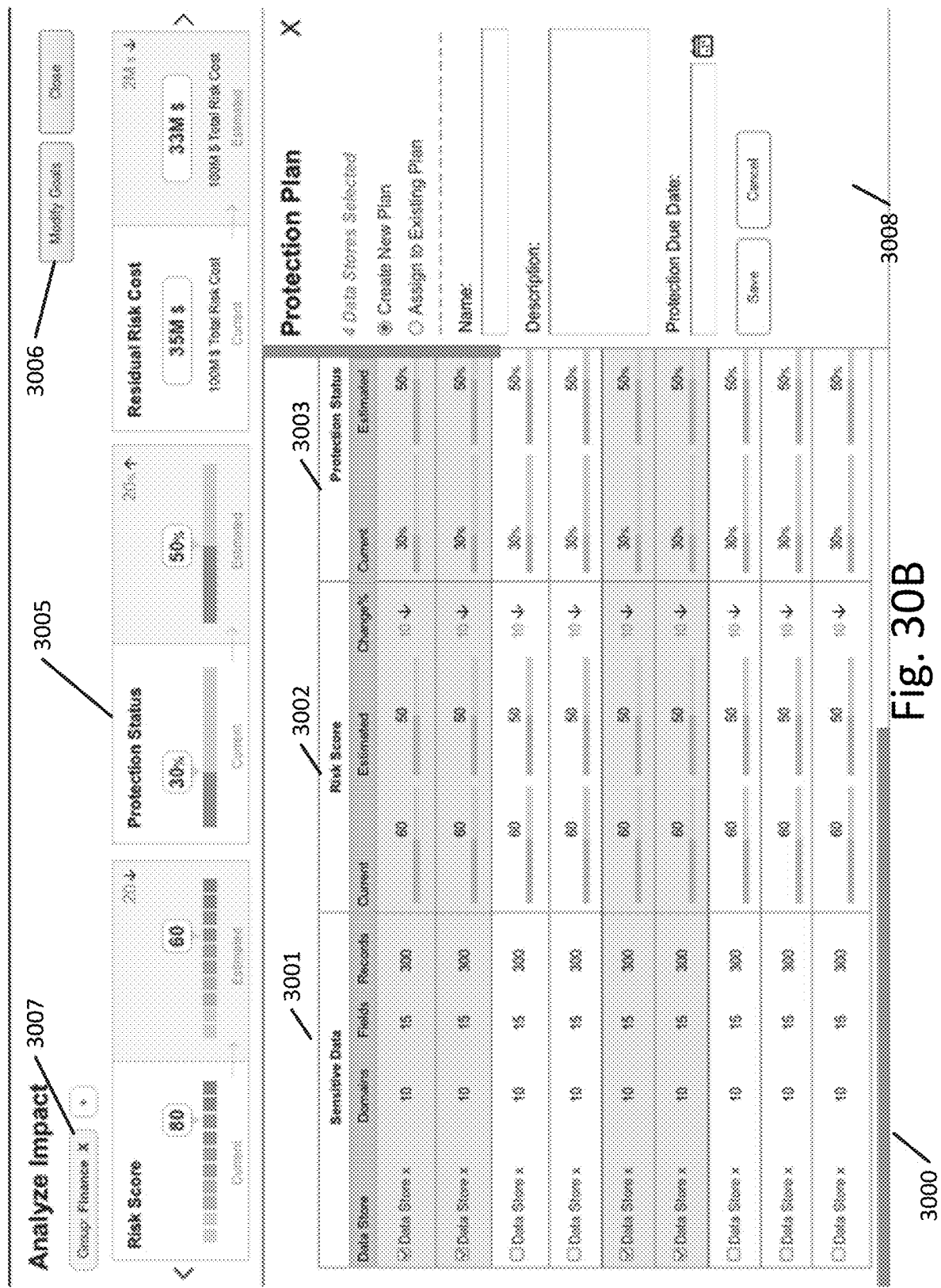

FIG. 30B illustrates the interface 3000 after the selection of data stores in selectable data stores 3001. As shown in interface 3000, the global metrics 3005 are updated to indicate the simulated changes in the global risk metrics, and the rows corresponding to selected data stores are highlighted or otherwise visually differentiated to indicate the selections. Plan interface 3008 also allows the user to create a new protection plan based on the selection or to add the selection to an existing plan.

Figure 30C:
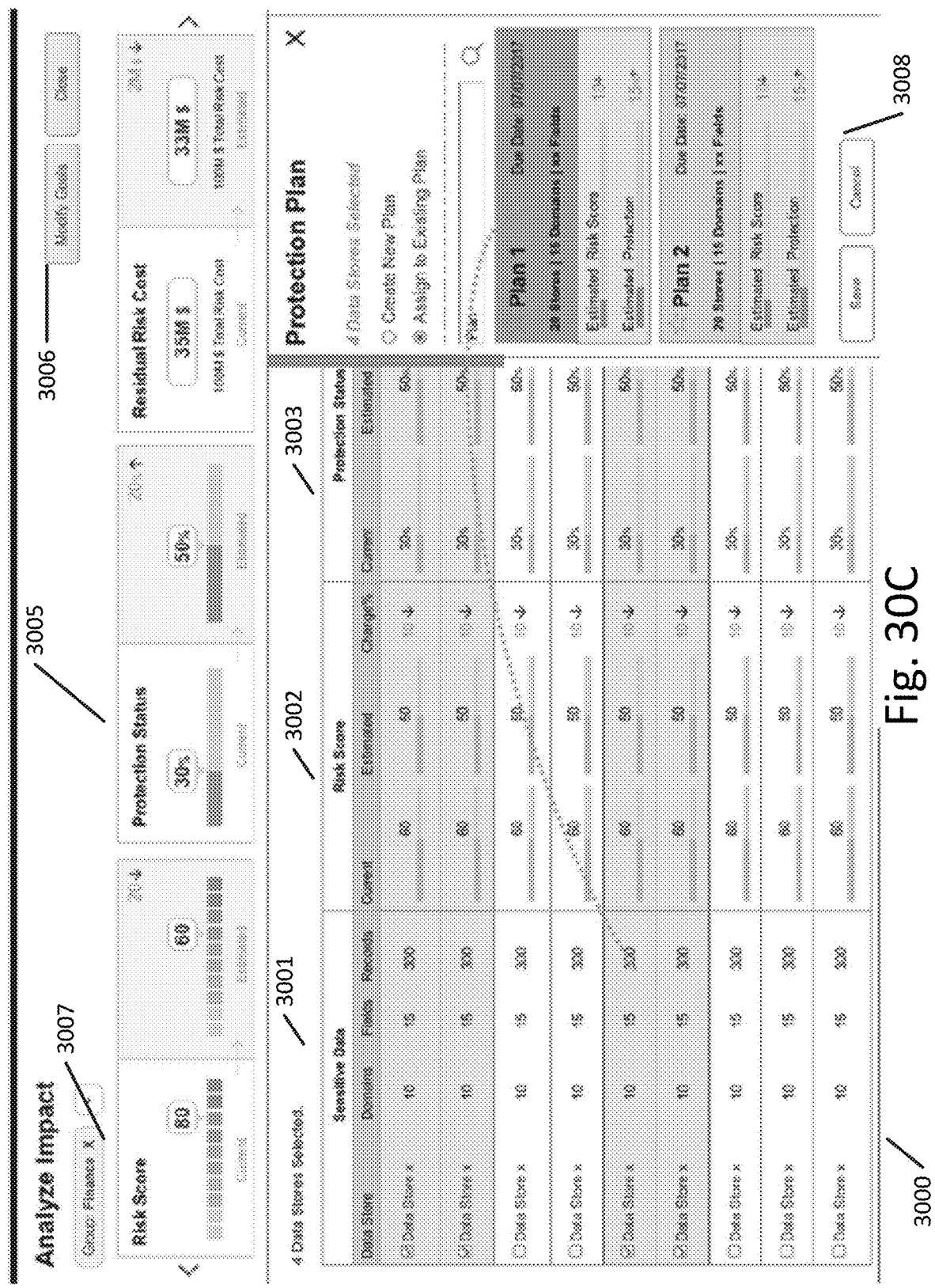

FIG. 30C illustrates the interface 3000 after the user has selected "Assign to existing plan" in the plan interface 3008 and dragged the selected data stores to Plan 1 in the existing plans. Plan 1 would then be updated to reflect the addition of the data stores (including updating the simulated risk metrics).

Figure 30D:
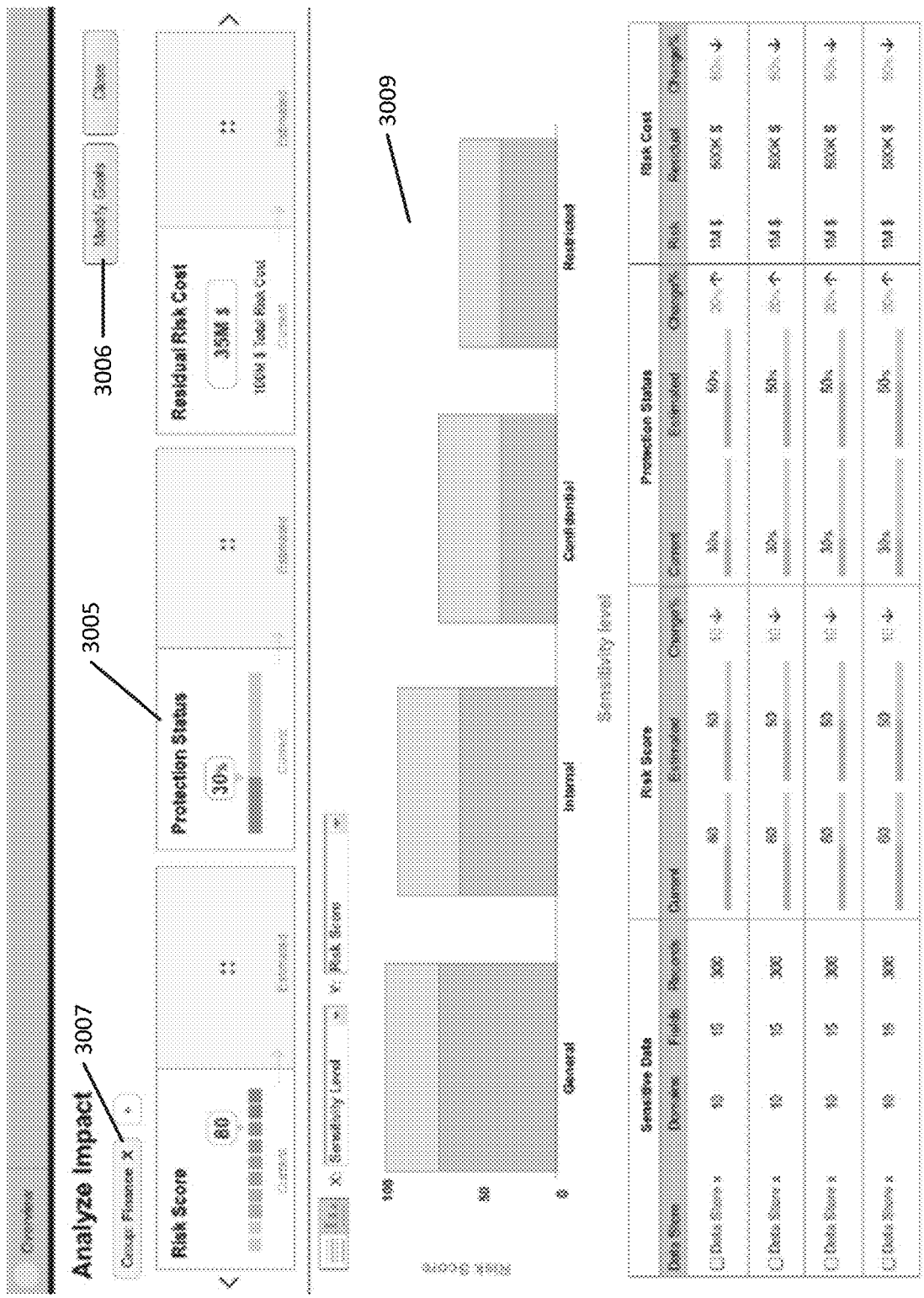

FIG. 30D illustrates the interface 3000 with another sub-interface 3009 which allows the user to view graphics and charts of the risk scores corresponding to different categories of data, in this case, by sensitivity level.

Figure 31A:
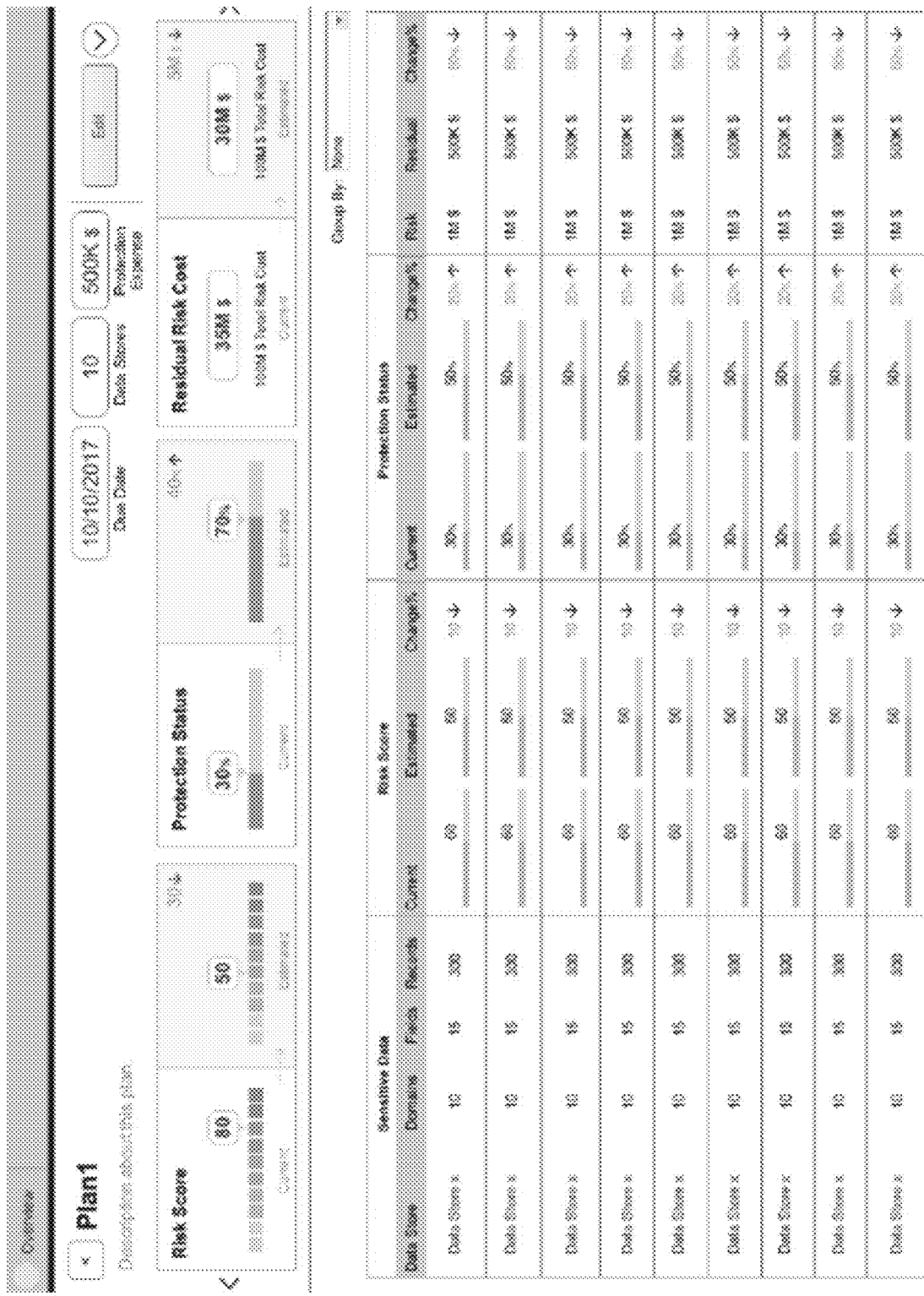
FIGS. 31A-31B illustrate a plan interface according to an exemplary embodiment.
Figure 31B:
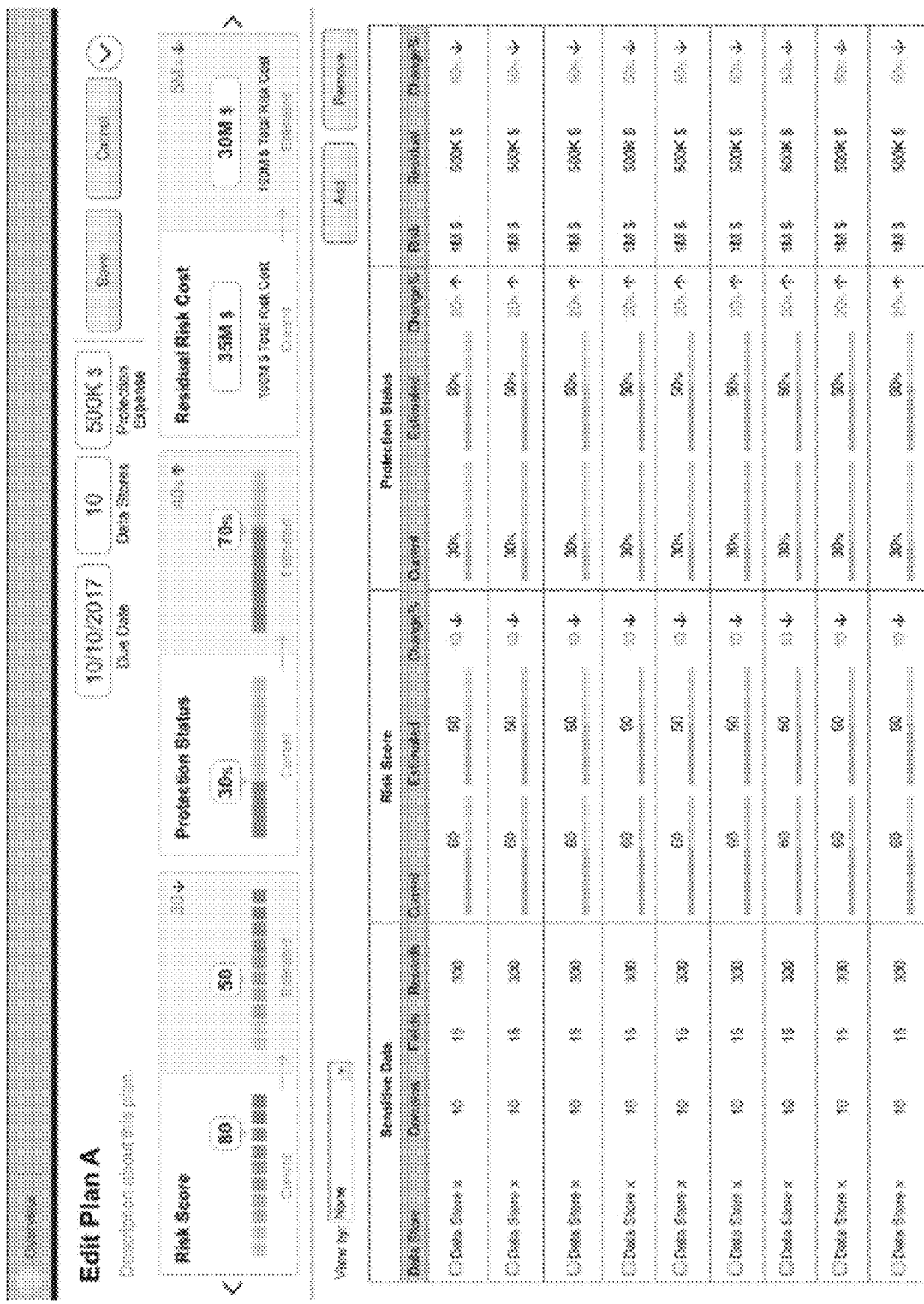

FIGS. 31A-31B illustrate a plan interface 3100 according to an exemplary embodiment. As shown in FIG. 31A, plan interface 3100 summarizes all information about the plan, including selected groupings (including data stores) for protection, impact of protections as measured by simulated risk metrics and current risk metrics, due dates, total number of stores, constraints, and any other information pertaining to a plan. FIG. 31B illustrates the plan interface 3100 in editing mode, which allows for inputs and selection of certain data stores.

Figure 32:
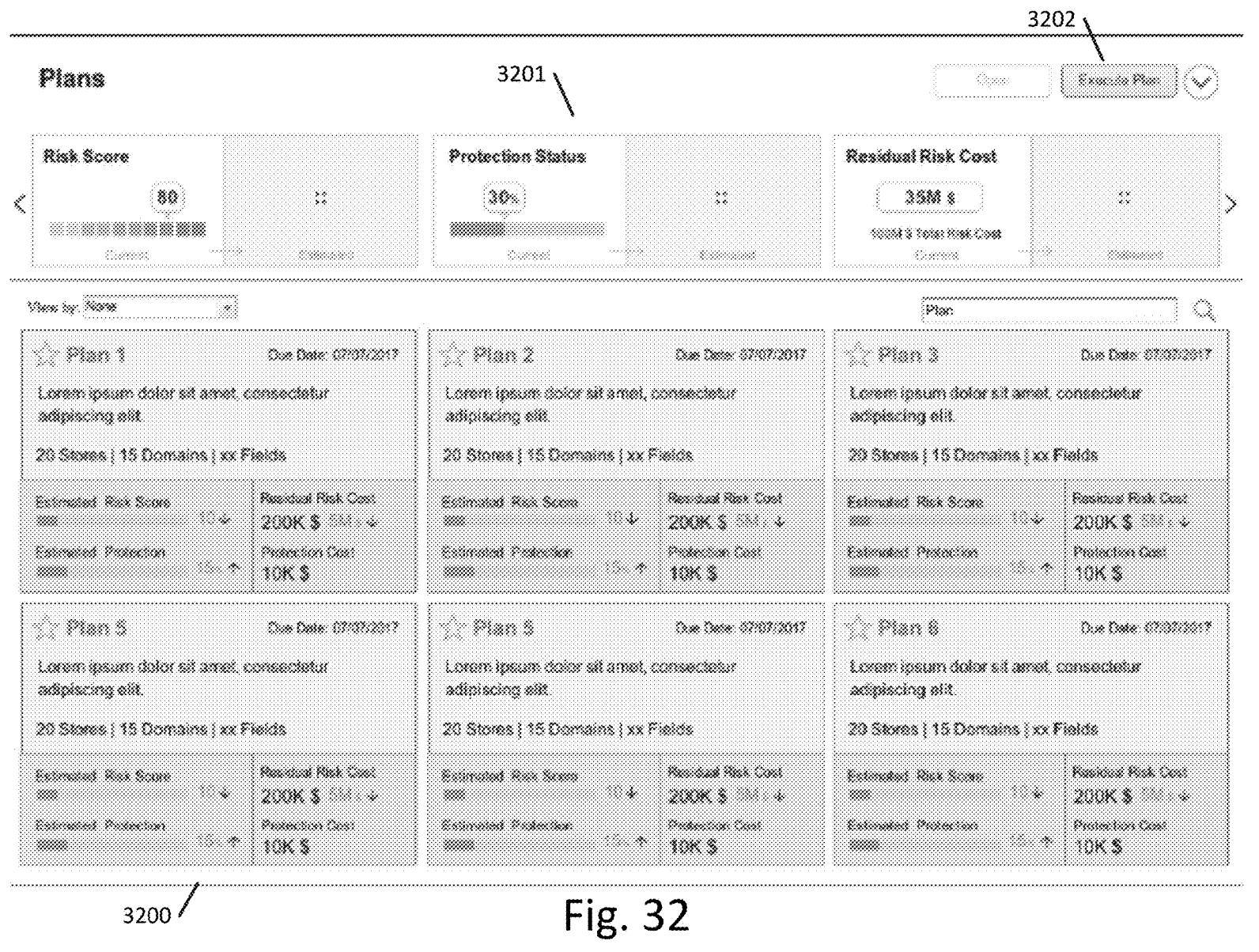

FIG. 32 illustrates a plan selection interface 3200 according to an exemplary embodiment. Plan selection interface 3200 allows users to select between previously generated or automatically generated plans and presents the relevant risk metrics (current and simulated) for any selections in carousel interface 3201. Interface 3200 also includes an execute plan button 3202. Selection of the execute plan button will cause the selected protection mechanisms to be applied to the selected protection groupings.

Figure 33:
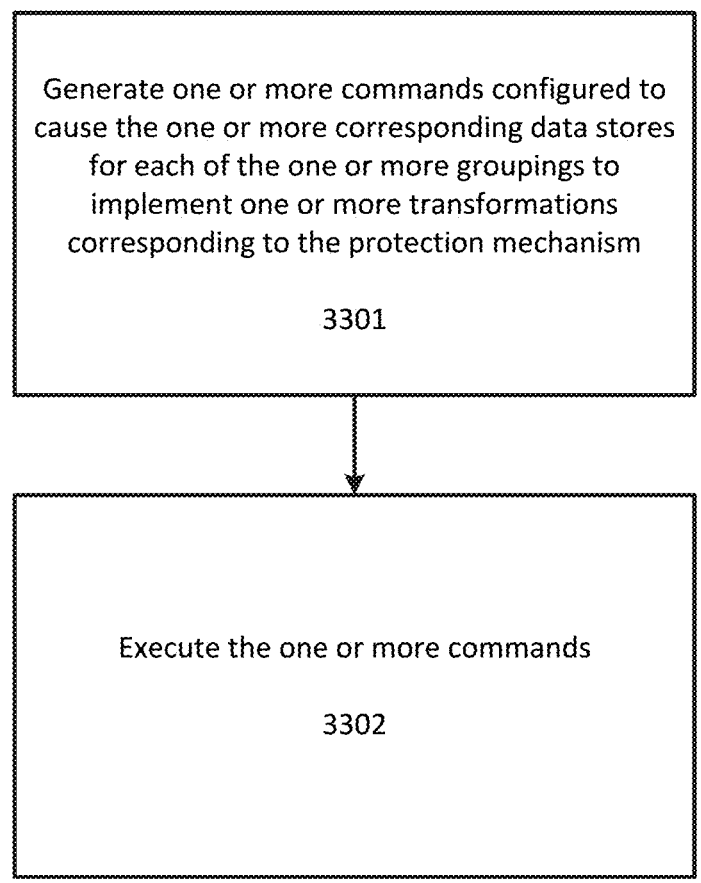
FIG. 33 illustrates a flowchart for applying a protection mechanism to one or more groupings.

FIG. 33 illustrates a flowchart for applying a protection mechanism to one or more groupings. At step 3301 one or more commands are generated that are configured to cause the one or more corresponding data stores for each of the one or more groupings to implement one or more transformations corresponding to the protection mechanism. At step 3302 the one or more commands are executed, to thereby apply the protections to the data stores in the one or more groupings.

The commands can be generated, for example, by translating information corresponding to the protection mechanism and the corresponding data stores in the one or more groupings into one or more workflow commands or business process steps, which can then be used to generate the appropriate lower level commands, that when executed, apply the protections to the actual data in the data stores.

Figure 34A:
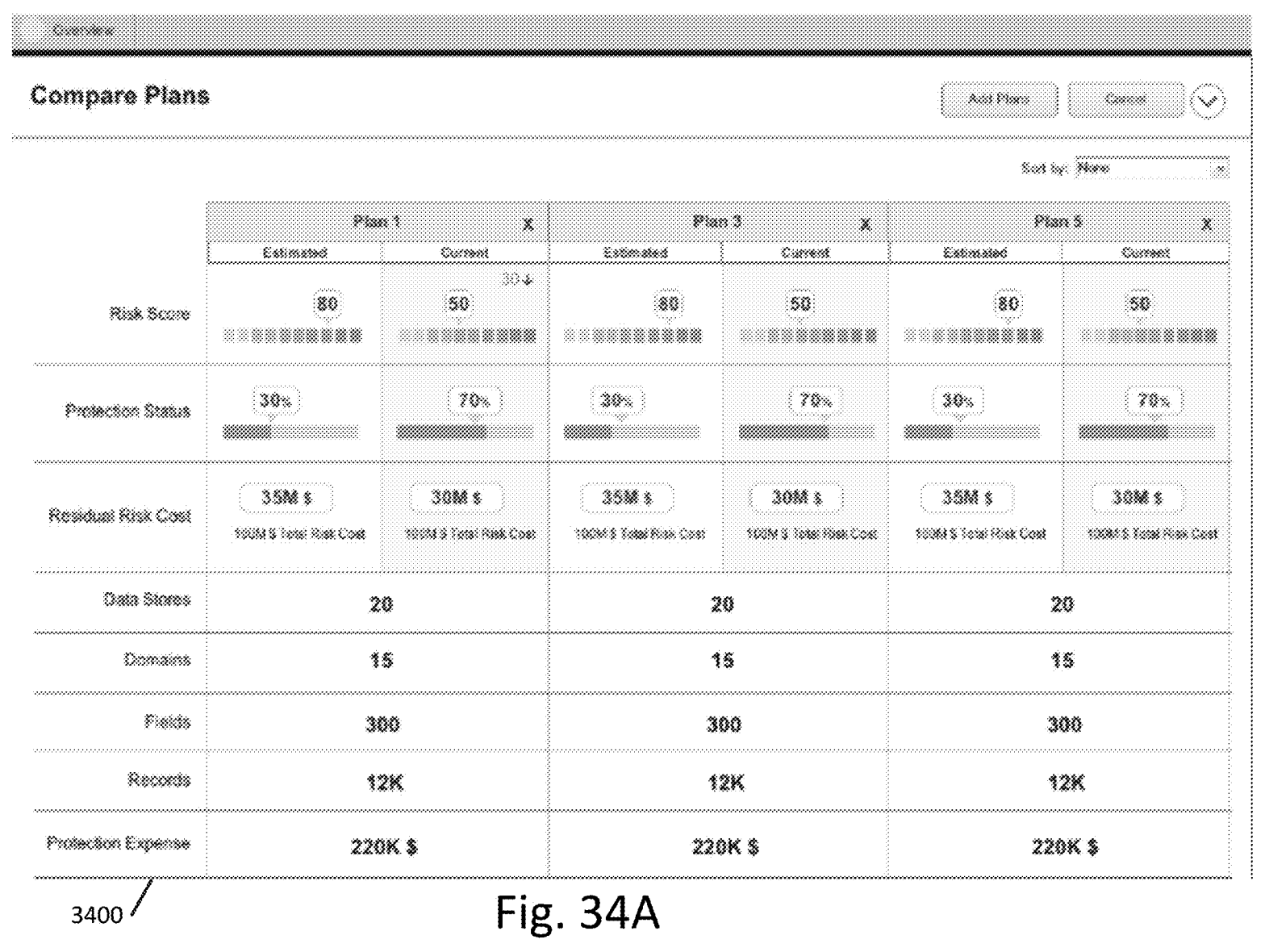

FIG. 34A illustrates a plan comparison interface 3400 according to an exemplary embodiment. This interface 3400 can be displayed in response to a user selecting plans 1, 3, and 5 in interface 3200 of FIG. 32 and selecting a compare plans option. Plans can be ranked, sorted, filtered, grouped, communicated (for plan review and approval), and/or executed.

Figure 34B:
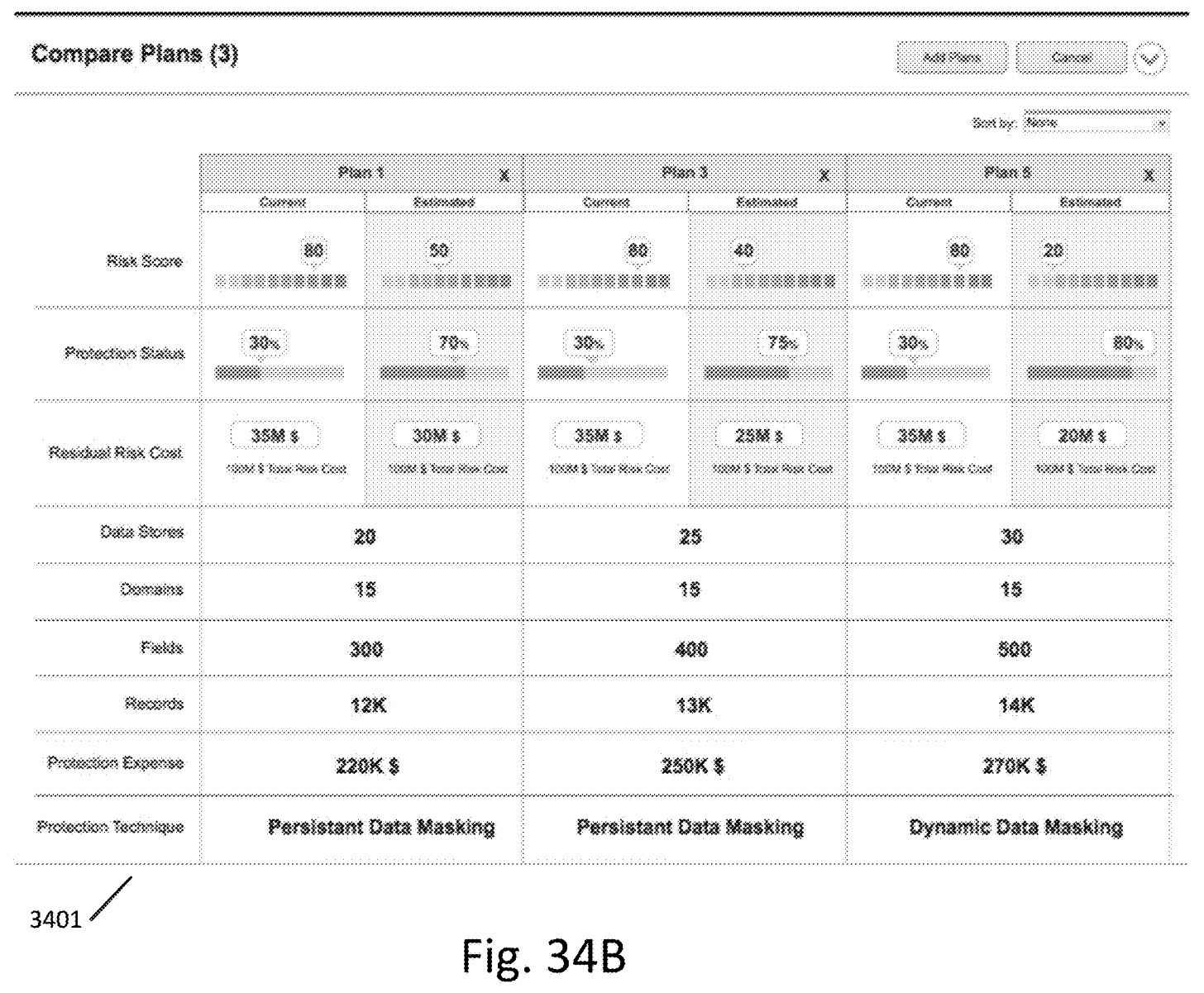

FIG. 34B illustrates another plan comparison interface 3401 according to an exemplary embodiment. Interface 3401 is similar to interface 3400 but additionally includes information regarding the corresponding protection mechanism (i.e., "protection technique") for each plan.

Figure 35:
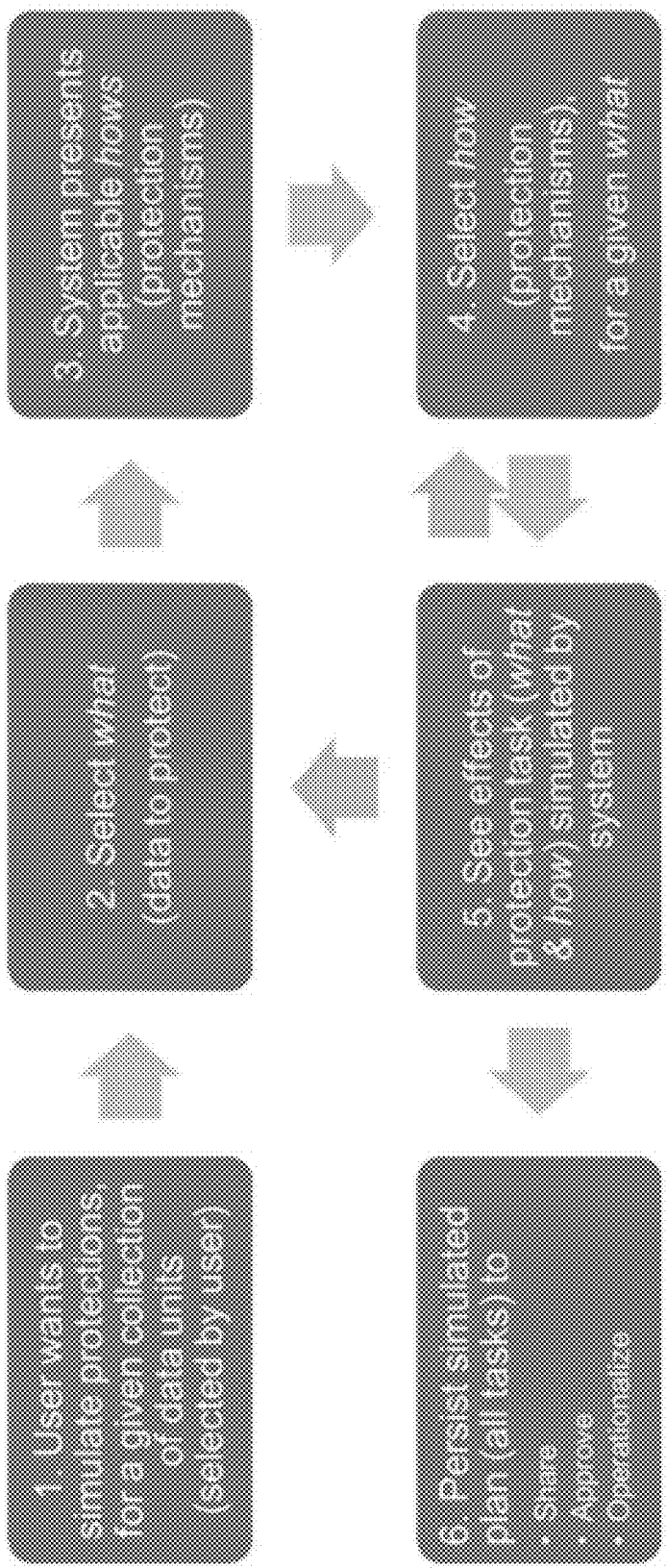
FIGS. 35-36 illustrate high-level use-cases for data protection optimization in a computer network according to an exemplary embodiment.
Figure 36:
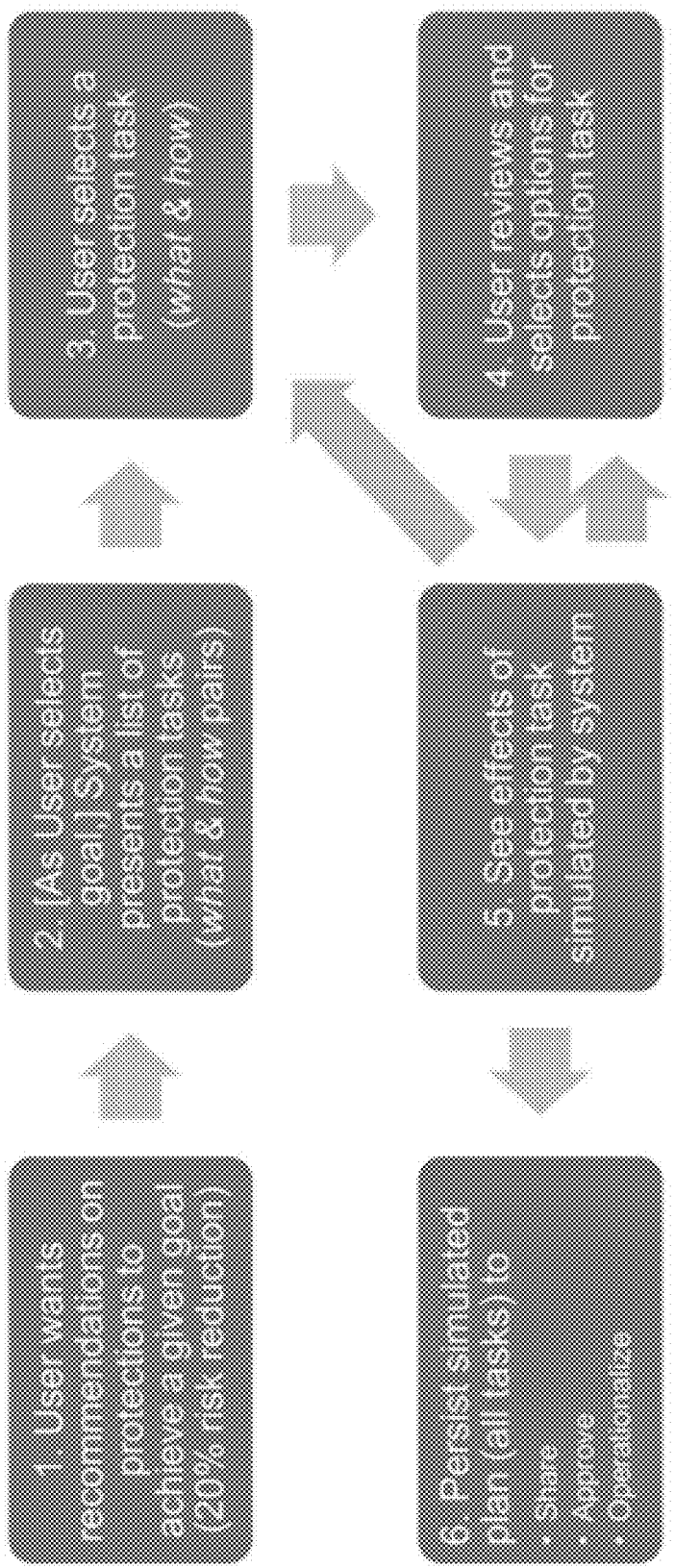
Figure 37:
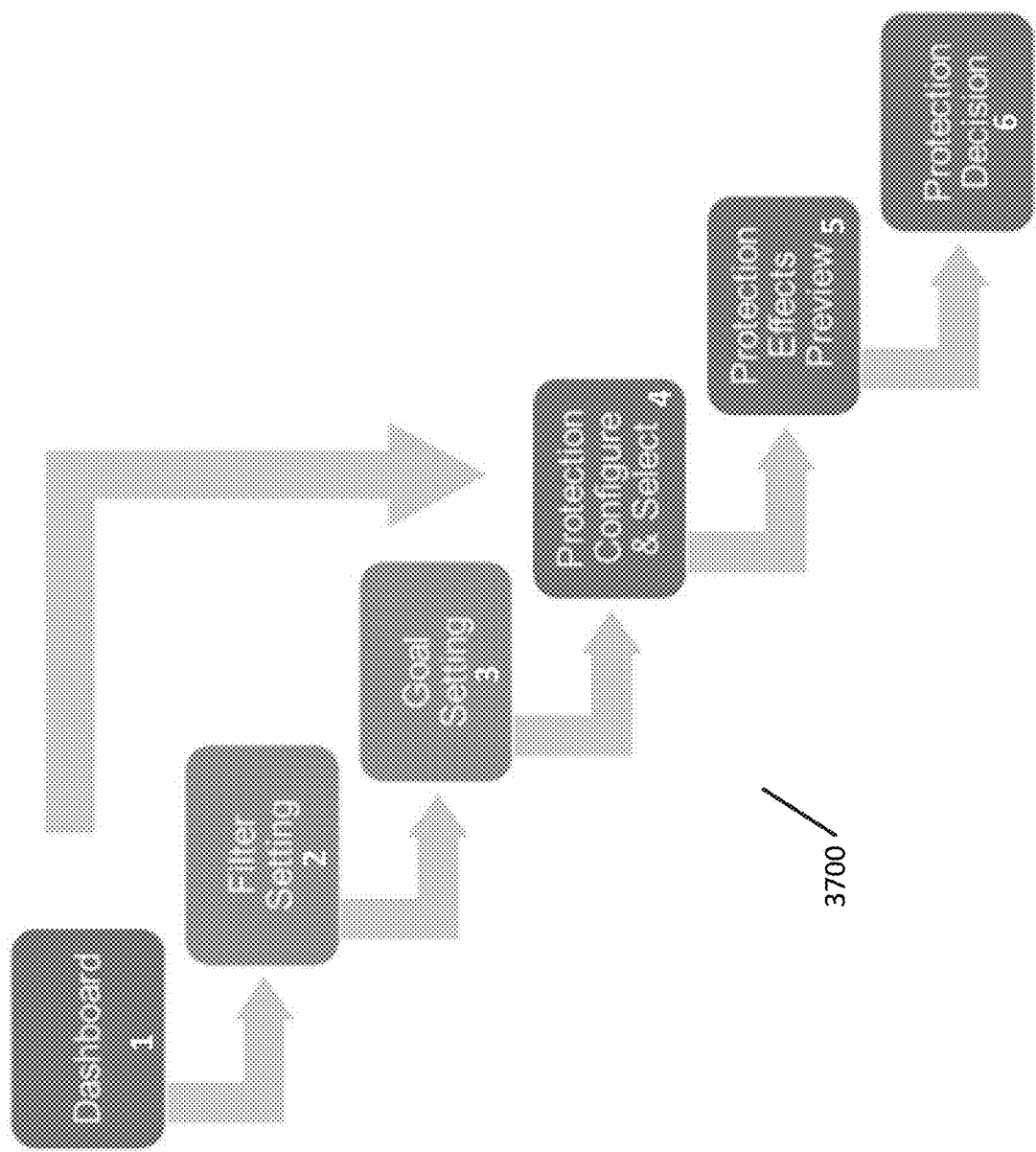
FIG. 37 illustrates a high-level workflow for data protection optimization in a computer network according to an exemplary embodiment.

The data protection optimization system disclosed herein can be utilized in multiple ways. FIGS. 35-36 illustrate high-level use-cases for data protection optimization in a computer network according to an exemplary embodiment. Use-case 3500 in FIG. 35 illustrates user-driven protection recommendations based upon user interaction in the dashboard. Use-case 3600 in FIG. 36 illustrates system-driven protection recommendations based upon user selection of a goal. FIG. 37 illustrates a high-level workflow 3700 for data protection optimization in a computer network according to an exemplary embodiment.

Figure 38:
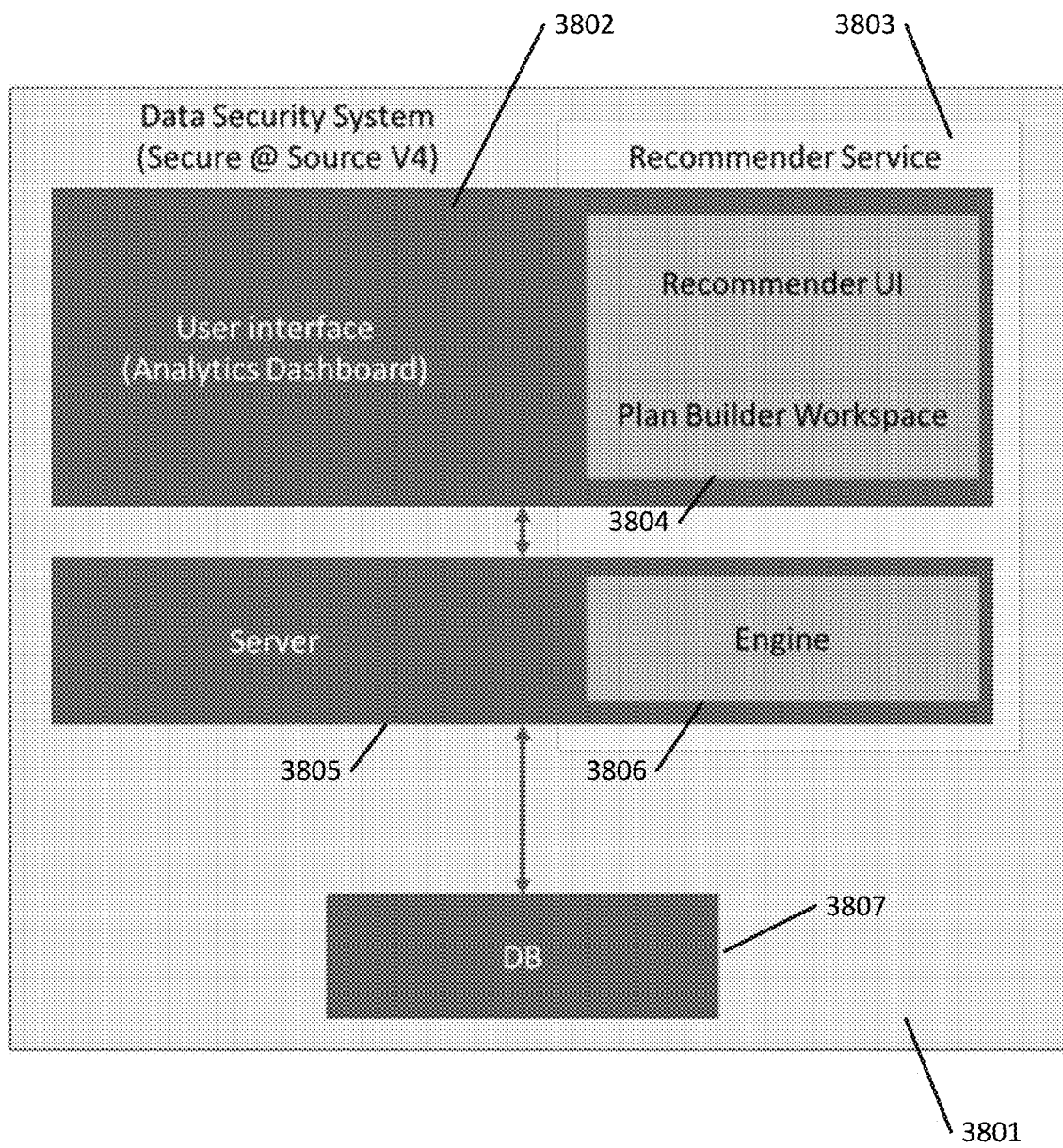
FIG. 38 illustrates a system architecture diagram of the data protection optimization system according to an exemplary embodiment.

FIG. 38 illustrates a system architecture diagram 3800 of the data protection optimization system according to an exemplary embodiment. As shown in FIG. 38, system 3800 can include a data security system 3801, including a database 3807 (for example, a network database distributed over a plurality of data stores), a server 3805 configured to interface with the database 3807, and a user interface 3802 configured to interface with server 3805 (such as through a client terminal). Recommender service 3803 can be part of the security system 3801 and can have two components. First component includes a Recommender UI component and plan builder workspace 3804 that is incorporated into user interface 3802 (and can also be part of a client terminal). Second component includes a recommender service engine 3806 that can execute on the server 3805 configured to interface with the database 3807. Recommender service engine can be responsible for all retrieval of metadata, all simulation of protection mechanisms, or any other tasks that are computationally expensive or that require interfacing with the underlying database 3807. Recommender UI 3804 can receive information from engine 3806 and display information in user interface 3802.

Figure 39:
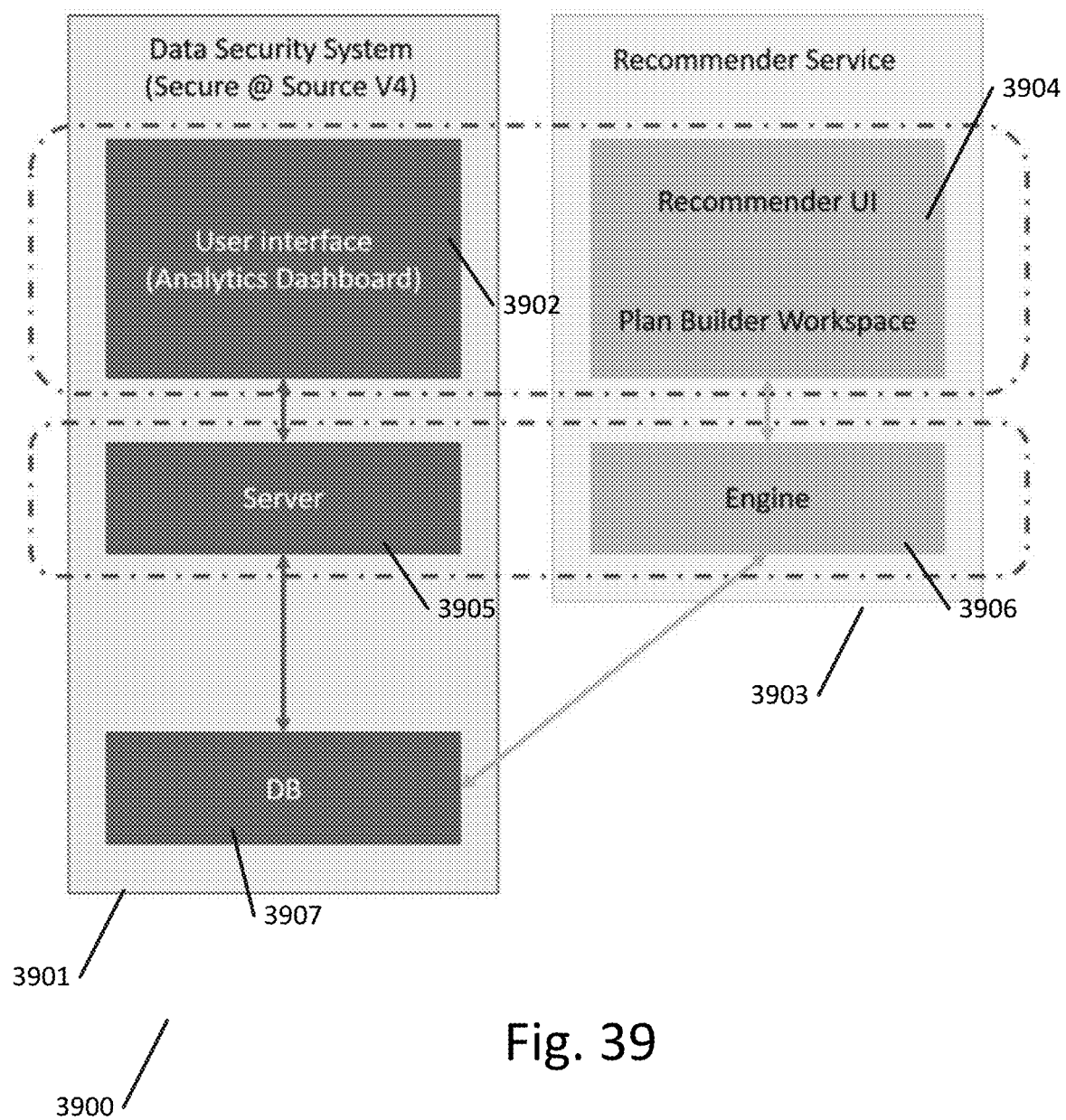
FIG. 39 illustrates another system architecture diagram of the data protection optimization system according to an exemplary embodiment.

FIG. 39 illustrates another system architecture diagram 3900 of the data protection optimization system according to an exemplary embodiment. As shown in FIG. 39, system 3900 can include a data security system 3901, including a database 3907 (for example, a network database distributed over a plurality of data stores), a server 3905 configured to interface with the database 3907, and a user interface 3902 configured to interface with server 3905 (such as through a client terminal). Recommender service 3903 can have two components. First component includes a Recommender UI component and plan builder workspace 3904. Second component includes a recommender service engine 3906 that is configured to interface directly with the database 3907. Recommender service engine can be responsible for all retrieval of metadata, all simulation of protection mechanisms, or any other tasks that are computational expensive or that require interfacing with the underlying database 3907. Recommender UI 3904 can receive information from engine 3806 and display information in user interface 3904.

Figure 40:
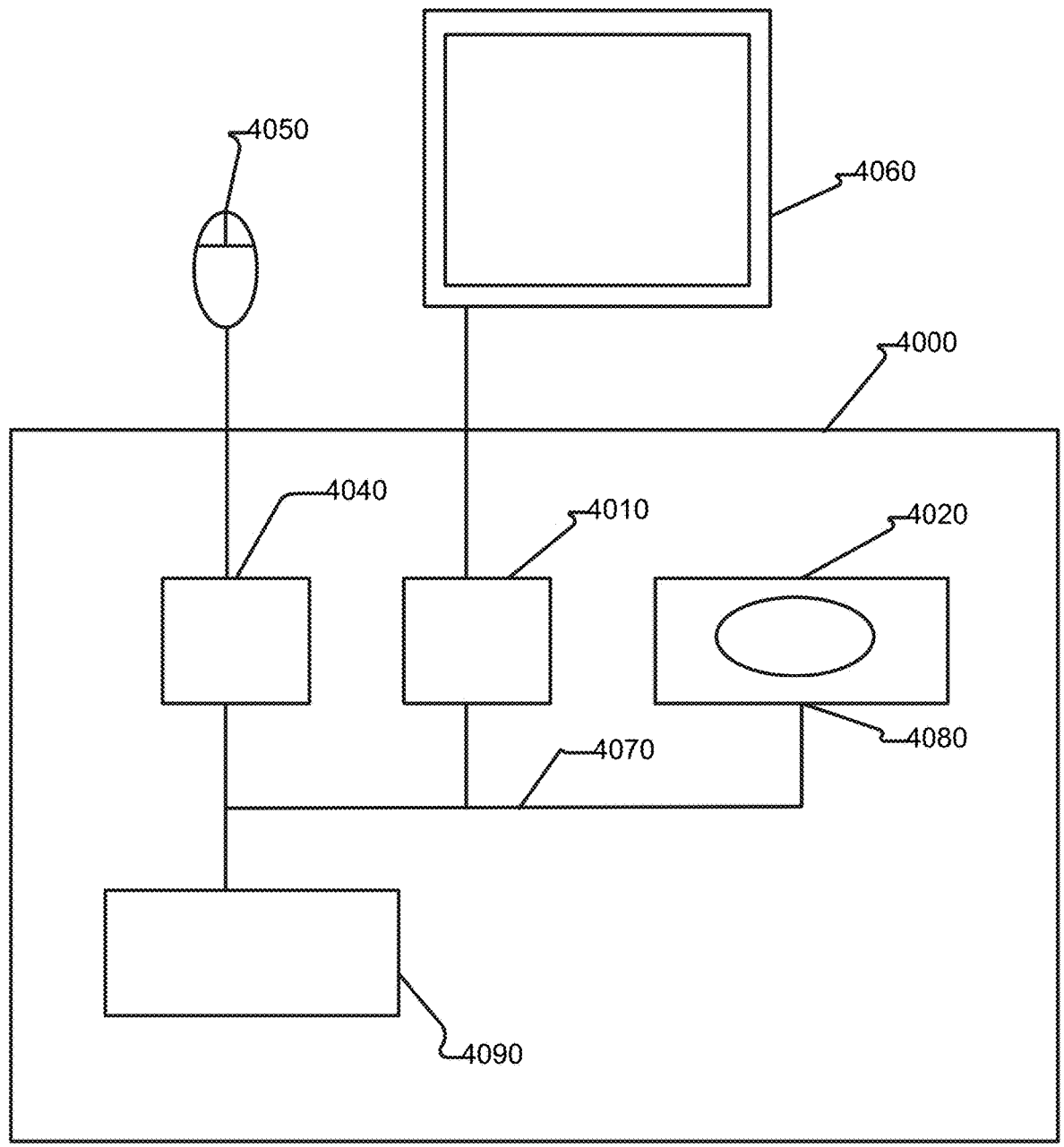
FIG. 40 illustrates an exemplary computing environment that can be used to carry out the methods for data protection optimization in a computer network.

One or more of the above-described techniques can be implemented in or involve one or more special-purpose computer systems having computer-readable instructions loaded thereon that enable the computer system to implement the above-described techniques. FIG. 40 illustrates an example of a computing environment 4000. The computing environment 4000 is not intended to suggest any limitation as to scope of use or functionality of a described embodiment(s).

With reference to FIG. 40, the computing environment 4000 includes at least one processing unit 4010 and memory 4020. The processing unit 4010 executes computer-executable instructions and can be a real or a virtual processor. In a multi-processing system, multiple processing units execute computer-executable instructions to increase processing power. The memory 4020 can be volatile memory (e.g., registers, cache, RAM), non-volatile memory (e.g., ROM, EEPROM, flash memory, etc.), or some combination of the two. The memory 4020 can store software 4080 implementing described techniques.

A computing environment can have additional features. For example, the computing environment 4000 includes storage 4040, one or more input devices 4050, one or more output devices 4060, and one or more communication connections 4090. An interconnection mechanism 4070, such as a bus, controller, or network interconnects the components of the computing environment 4000. Typically, operating system software or firmware (not shown) provides an operating environment for other software executing in the computing environment 4000, and coordinates activities of the components of the computing environment 4000.

The storage 4040 can be removable or non-removable, and includes magnetic disks, magnetic tapes or cassettes, CD-ROMs, CD-RWs, DVDs, or any other medium which can be used to store information and which can be accessed within the computing environment 4000. The storage 4040 can store instructions for the software 4080.

The input device(s) 4050 can be a touch input device such as a keyboard, mouse, pen, trackball, touch screen, or game controller, a voice input device, a scanning device, a digital camera, remote control, or another device that provides input to the computing environment 4000. The output device(s) 4060 can be a display, television, monitor, printer, speaker, or another device that provides output from the computing environment 4000.

The communication connection(s) 4090 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 4000, computer-readable media include memory 4020, storage 4040, communication media, and combinations of any of the above.

Of course, FIG. 40 illustrates computing environment 4000, display device 4060, and input device 4050 as separate devices for ease of identification only. Computing environment 4000, display device 4060, and input device 4050 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 4000 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method for data protection simulation and optimization in a computer network, the method comprising:
   storing, by at least one computing device in the computer network, one or more current values of one or more risk metrics for at least one grouping of data stored in one or more data stores in the computer network and corresponding to one or more domains, each of the one or more risk metrics corresponding to one or more sensitive domains in the one or more domains;
   receiving, by the at least one computing device in the computer network, a risk reduction goal corresponding to at least one risk metric in the one or more risk metrics, the at least one risk metric corresponding to at least one sensitive domain in the one or more sensitive domains;
   determining, by the at least one computing device in the computer network, a plurality of simulated values of the at least one risk metric for the at least one grouping by simulating application of a plurality of protection mechanisms to sensitive data in each corresponding data store, wherein the sensitive data corresponds to the at least one sensitive domain and wherein each simulated value in the plurality of simulated values corresponds to a protection mechanism in the plurality of protection mechanisms; and
   ranking, by the at least computing one device in the computer network, the plurality of protection mechanisms based at least in part on the corresponding plurality of simulated values of the at least one risk metric for the at least one grouping.

2. The method of claim 1,
   wherein the grouping of data is grouped according to one or more of at least one architectural attribute of the data or at least one conceptual attribute of the data;
   wherein the at least one architectural attribute of the data comprises one or more of: a table storing the data, a data store storing the data, a location of data, a department associated with the data, or one or more access rights associated with the data; and
   wherein the at least one least one conceptual attribute of the data comprises one or more of: a domain of the data or a policy applicable to the data.

3. The method of claim 1, wherein the one or more risk metrics corresponding to the at least one grouping comprise one or more of: a risk score corresponding to the one or more corresponding data stores, a protection status corresponding to the one or more corresponding data stores, a data risk cost corresponding to the one or more corresponding data stores, a protection cost corresponding to implementation of a protection mechanism on the one or more corresponding data stores, a policy compliance status indicating compliance of the corresponding one or more data stores with a policy, or a sensitivity level indicating a sensitivity of data stored on the one or more data corresponding stores.

4. The method of claim 1, wherein receiving a risk reduction goal corresponding to at least one risk metric in the one or more risk metrics comprises one or more of:
   receiving a selection of at least one qualitative risk metric in a plurality of qualitative risk metrics;
   receiving a selection of at least one quantitative risk metric in a plurality of quantitative risk metrics; or
   receiving an identification of at least one policy in a plurality of policies, each policy corresponding to one or more of: a qualitative risk metric or a quantitative risk metric.

5. The method of claim 1, wherein determining a plurality of simulated values of the at least one risk metric for the at least one grouping by simulating application of a plurality of protection mechanisms to sensitive data in each corresponding data store comprises, for each protection mechanism in the plurality of protection mechanisms:
   retrieving metadata associated with the one or more corresponding data stores;
   identifying one or more transformations associated with the protection mechanism;
   modifying at least a portion of the metadata associated with the one or more corresponding data stores based at least in part on the one or more transformations; and
   determining the at least one simulated value of the at least one risk metric for the grouping based at least in part on the modified metadata.

6. The method of claim 1, further comprising:
   transmitting, by the at least one computing device in the computer network, a plurality of protection indicators corresponding to the plurality of protection mechanisms and the corresponding plurality of simulated values;

receiving, by the at least one computing device in the computer network, a selection of a protection indicator in the plurality of protection indicators; and generating, by the at least one computing device in the computer network, a protection plan comprising a selected protection mechanism corresponding to the selected protection indicator and the at least one grouping.

7. The method of claim 6, further comprising:

generating, by the at least one computing device in the computer network, one or more commands configured to cause the one or more corresponding data stores for the at least one grouping to implement one or more transformations corresponding to the selected protection mechanism; and executing, by the at least one computing device in the computer network, the one or more commands.

8. An apparatus for data protection simulation and optimization in a computer network, the apparatus comprising:

one or more physical processors; and one or more physical memories operatively coupled to at least one of the one or more physical processors and having instructions stored thereon that, when executed by at least one of the one or more physical processors, cause at least one of the one or more physical processors to:

store one or more current values of one or more risk metrics for at least one grouping of data stored in one or more data stores in the computer network and corresponding to one or more domains, each of the one or more risk metrics corresponding to one or more sensitive domains in the one or more domains;

receive a risk reduction goal corresponding to at least one risk metric in the one or more risk metrics, the at least one risk metric corresponding to at least one sensitive domain in the one or more sensitive domains;

determine a plurality of simulated values of the at least one risk metric for the at least one grouping by simulating application of a plurality of protection mechanisms to sensitive data in each corresponding data store, wherein the sensitive data corresponds to the at least one sensitive domain and wherein each simulated value in the plurality of simulated values corresponds to a protection mechanism in the plurality of protection mechanisms; and rank the plurality of protection mechanisms based at least in part on the corresponding plurality of simulated values of the at least one risk metric for the at least one grouping.

9. The apparatus of claim 8, wherein the grouping of data is grouped according to one or more of at least one architectural attribute of the data or at least one conceptual attribute of the data;

wherein the at least one architectural attribute of the data comprises one or more of: a table storing the data, a data store storing the data, a location of data, a department associated with the data, or one or more access rights associated with the data; and wherein the at least one least one conceptual attribute of the data comprises one or more of: a domain of the data or a policy applicable to the data.

10. The apparatus of claim 8, wherein the one or more risk metrics corresponding to the at least grouping comprise one or more of: a risk score corresponding to the one or more corresponding data stores, a protection status corresponding to the one or more corresponding data stores, a data risk cost corresponding to the one or more corresponding data stores, a protection cost corresponding to implementation of a protection mechanism on the one or more corresponding data stores, a policy compliance status indicating compliance of the corresponding one or more data stores with a policy, or a sensitivity level indicating a sensitivity of data stored on the one or more data corresponding stores.

11. The apparatus of claim 8, wherein the instructions that, when executed by at least one of the one or more physical processors, cause at least one of the one or more physical processors to receive a risk reduction goal corresponding to at least one risk metric in the one or more risk metrics further cause at least one of the one or more physical processors to:

receive a selection of at least one qualitative risk metric in a plurality of qualitative risk metrics;

receive a selection of at least one quantitative risk metric in a plurality of quantitative risk metrics; or receive an identification of at least one policy in a plurality of policies, each policy corresponding to one or more of: a qualitative risk metric or a quantitative risk metric.

12. The apparatus of claim 8, wherein the instructions that, when executed by at least one of the one or more physical processors, cause at least one of the one or more physical processors to determine a plurality of simulated values of the at least one risk metric for the at least one grouping by simulating application of a plurality of protection mechanisms to sensitive data in each corresponding data store further cause at least one of the one or more physical processors to, for each protection mechanism in the plurality of protection mechanisms:

retrieve metadata associated with the one or more corresponding data stores;

identify one or more transformations associated with the protection mechanism;

modify at least a portion of the metadata associated with the one or more corresponding data stores based at least in part on the one or more transformations; and determine the at least one simulated value of the at least one risk metric for the grouping based at least in part on the modified metadata.

13. The apparatus of claim 8, wherein at least one of the one or more physical memories has further instructions stored thereon that, when executed by at least one of the one or more physical processors, cause at least one of the one or more physical processors to:

transmit a plurality of protection indicators corresponding to the plurality of protection mechanisms and the corresponding plurality of simulated values;

receive a selection of a protection indicator in the plurality of protection indicators; and generate a protection plan comprising a selected protection mechanism corresponding to the selected protection indicator and the at least one grouping.

14. The apparatus of claim 13, wherein at least one of the one or more physical memories has further instructions stored thereon that, when executed by at least one of the one or more physical processors, cause at least one of the one or more physical processors to:

generate one or more commands configured to cause the one or more corresponding data stores for the at least one grouping to implement one or more transformations corresponding to the selected protection mechanism; and execute the one or more commands.

15. At least one non-transitory computer-readable medium storing computer-readable instructions that, when executed by one or more computing devices, cause at least one of the one or more computing devices to:
  store one or more current values of one or more risk metrics for at least one grouping of data stored in one or more data stores in the computer network and corresponding to one or more domains, each of the one or more risk metrics corresponding to one or more sensitive domains in the one or more domains;
  receive a risk reduction goal corresponding to at least one risk metric in the one or more risk metrics, the at least one risk metric corresponding to at least one sensitive domain in the one or more sensitive domains;
  determine a plurality of simulated values of the at least one risk metric for the at least one grouping by simulating application of a plurality of protection mechanisms to sensitive data in each corresponding data store, wherein the sensitive data corresponds to the at least one sensitive domain and wherein each simulated value in the plurality of simulated values corresponds to a protection mechanism in the plurality of protection mechanisms; and
  rank the plurality of protection mechanisms based at least in part on the corresponding plurality of simulated values of the at least one risk metric for the at least one grouping.

16. The least one non-transitory computer-readable medium of claim 15, wherein the one or more risk metrics corresponding to the at least grouping comprise one or more of: a risk score corresponding to the one or more corresponding data stores, a protection status corresponding to the one or more corresponding data stores, a data risk cost corresponding to the one or more corresponding data stores, a protection cost corresponding to implementation of a protection mechanism on the one or more corresponding data stores, a policy compliance status indicating compliance of the corresponding one or more data stores with a policy, or a sensitivity level indicating a sensitivity of data stored on the one or more data corresponding stores.

17. The least one non-transitory computer-readable medium of claim 15, wherein the instructions that, when executed by at least one of the one or more computing devices, cause at least one of the one or more computing devices to receive a risk reduction goal corresponding to at least one risk metric in the one or more risk metrics further cause at least one of the one or more computing devices to:
  receive a selection of at least one qualitative risk metric in a plurality of qualitative risk metrics;
  receive a selection of at least one quantitative risk metric in a plurality of quantitative risk metrics; or
  receive an identification of at least one policy in a plurality of policies, each policy corresponding to one or more of: a qualitative risk metric or a quantitative risk metric.

18. The least one non-transitory computer-readable medium of claim 15, wherein the instructions that, when executed by at least one of the one or more computing devices, cause at least one of the one or more computing devices to determine a plurality of simulated values of the at least one risk metric for the at least one grouping by simulating application of a plurality of protection mechanisms to sensitive data in each corresponding data store further cause at least one of the one or more computing devices to, for each protection mechanism in the plurality of protection mechanisms:
  retrieve metadata associated with the one or more corresponding data stores;
  identify one or more transformations associated with the protection mechanism;
  modify at least a portion of the metadata associated with the one or more corresponding data stores based at least in part on the one or more transformations; and
  determine the at least one simulated value of the at least one risk metric for the grouping based at least in part on the modified metadata.

19. The least one non-transitory computer-readable medium of claim 15, further storing computer-readable instructions that, when executed by at least one of the one or more computing devices, cause at least one of the one or more computing devices to:
  transmit a plurality of protection indicators corresponding to the plurality of protection mechanisms and the corresponding plurality of simulated values;
  receive a selection of a protection indicator in the plurality of protection indicators; and
  generate a protection plan comprising a selected protection mechanism corresponding to the selected protection indicator and the at least one grouping.

20. The least one non-transitory computer-readable medium of claim 19, further storing computer-readable instructions that, when executed by at least one of the one or more computing devices, cause at least one of the one or more computing devices to:
  generate one or more commands configured to cause the one or more corresponding data stores for the at least one grouping to implement one or more transformations corresponding to the selected protection mechanism; and
  execute the one or more commands.

* * * * *